United States Patent
Ryu et al.

(10) Patent No.: US 8,187,712 B2
(45) Date of Patent: *May 29, 2012

(54) PLASTIC POLARIZED LENS AND METHOD OF PRODUCING THE SAME

(75) Inventors: Akinori Ryu, Omuta (JP); Seiichi Kobayashi, Omuta (JP); Yoshimitsu Aiiso, Fukui (JP)

(73) Assignees: Mitsui Chemicals, Inc., Minato-Ku, Tokyo (JP); Hopnic Laboratory Co., Ltd., Sabae-Shi, Fukui (JP)

( * ) Notice: Subject to any disclaimer, the term of this patent is extended or adjusted under 35 U.S.C. 154(b) by 521 days.

This patent is subject to a terminal disclaimer.

(21) Appl. No.: 12/366,662

(22) Filed: Feb. 6, 2009

(65) Prior Publication Data

US 2009/0201584 A1    Aug. 13, 2009

Related U.S. Application Data

(60) Provisional application No. 61/193,578, filed on Dec. 8, 2008.

(30) Foreign Application Priority Data

| Feb. 7, 2008 | (JP) | 2008-027939 |
| Feb. 7, 2008 | (JP) | 2008-027942 |

(51) Int. Cl.
*C08G 63/48* (2006.01)
*G02B 5/30* (2006.01)
*B29D 11/00* (2006.01)

(52) U.S. Cl. .......... 428/423.7; 428/423.1; 525/50; 264/1.31; 264/1.32

(58) Field of Classification Search ........... 428/423.7, 428/423.1; 359/486.01, 487.01, 489.14; 351/163, 166; 264/1.31, 1.32; 525/50, 230; 523/105, 106
See application file for complete search history.

(56) References Cited

U.S. PATENT DOCUMENTS

| 7,967,434 B2 * | 6/2011 | Miura et al. | 351/163 |
| 2008/0036964 A1 * | 2/2008 | Miura et al. | 351/163 |

FOREIGN PATENT DOCUMENTS

| JP | 9-258009 A | 10/1997 |
| WO | WO 02/073291 A1 | 9/2002 |
| WO | WO 2004/099859 A1 | 11/2004 |

OTHER PUBLICATIONS

Machine Translation of JP 2002-267841.*

* cited by examiner

*Primary Examiner* — Vasudevan S. Jagannathan
*Assistant Examiner* — Hannah Pak
(74) *Attorney, Agent, or Firm* — Buchanan Ingersoll & Rooney PC

(57) ABSTRACT

To provide a plastic polarized lens which is excellent in processability and the like as well as in adhesion property of the polarized film, and a method of producing the same. In the plastic polarized lens of the present invention, layers comprised of thiourethane-based resins obtained by reacting (A) isocyanate compounds with (B) active hydrogen compounds are stacked on both sides of a polarized film comprised of thermoplastic polyester formed under a predetermined temperature condition.

41 Claims, 2 Drawing Sheets

PLASTIC POLARIZED LENS AND METHOD OF PRODUCING THE SAME

This application claims priority under 35 U.S.C. §119 from U.S. Provisional Application Ser. No. 61/193,578, filed Dec. 8, 2008. This application is based on Japanese patent applications No. 2008-27942 and No. 2008-27939, the contents of which are incorporated hereinto by reference.

BACKGROUND

1. Technical Field

The present invention relates to a plastic polarized lens and a method of producing the same.

2. Related Art

A polarized lens can prevent transmission of reflected light. Therefore, it is used for protecting eyes by intercepting a strong reflected light in outdoor such as in a skiing ground or in fishing, and for securing safety in driving a car by intercepting a reflected light from a car running in the opposite direction.

For a plastic polarized lens, two kinds of polarized lens are proposed, namely, a polarized lens with a polarized film laid on the surface of the lens material, and a sandwich structured polarized lens with a polarized film within the lens. The polarized lens with a polarized film laid on the surface of the lens material (for example, Japanese Patent Application Laid-Open No. H09-258009 (Patent Document 1)) can make the thickness of the lens thin, but has a serious disadvantage that the polarized film is liable to be peeled off from the lens material during a periphery grinding process (a process of grinding periphery of the lens to fit in a predetermined shape).

A resin used for a polarized film composing a polarized lens has been essentially limited so far to polyvinyl alcohol. The polarized film is produced by a uniaxial extension of polyvinyl alcohol film after adding iodine or a dichroic dye to make a film having molecular orientation in uniaxial direction. A method of producing a polarized lens composed of a polarized polyvinyl alcohol film is disclosed, for example, in the WO 04/099859 (Patent Document 2).

However, the polarized lens produced by using a polarized polyvinyl alcohol film has shortcomings of gradual penetration of water from the rim of the lens causing deterioration from the periphery to the center of the lens with time or due to the surrounding environment.

In order to improve above-mentioned shortcomings, the pamphlet of WO 02/073291 (Patent Document 3) proposed a polarized lens using a lens material containing impact-resistant polyurethane resin obtained from diamine and isocyanate-prepolymer, and a polarized film containing polyethylene terephthalate.

However, this polarized lens has a disadvantage that the polarized film contained in the lens is clearly visible from outside which gives an uncomfortable feeling to a person who wears the eyeglasses containing this lens. Furthermore, as the composition of the mixture of diamine and isocyanate prepolymer has a high viscosity and a short pot life, injection of the composition to a lens mold with a fixed polarized film therein is troublesome, and production of a thin lens was particularly difficult.

Therefore, in the conventional plastic polarized lens, there has been a demand for a plastic polarized lens having reduced occurrence of peeling-off of the polarized film during a downstream process of grinding the periphery of the lens and excellent water-resistance, giving less uncomfortable feeling on wearing, and is capable of producing a thin product.

SUMMARY

With respect to the industrial mass production of polarized lenses, there is an increase in demand of a polarized lens which can be prepared industrially with excellent yield while preventing peeling-off of a polarized film from occurring upon polishing the outer circumference of the lens with an edger or the like after a polymerization, and has an excellent adhesiveness between a polarized film and a plastic lens.

The present invention has been made to address the above problems in the conventional art, has an object to provide a plastic polarized lens with excellent processability and excellent adhesiveness between a polarized film and a plastic lens, and a method of producing the same.

According to the present invention, there is provided:

(1) A plastic polarized lens comprising:

a polarized film comprised of thermoplastic polyester which is formed under the condition of temperature $T1$ represented by the following formula:

(Glass Transition Temperature of Thermoplastic Polyester)+5° C.$\leq T1 \leq$(Glass Transition Temperature of Thermoplastic Polyester)+100° C., and layer(s) comprised of a thiourethane-based resin which are stacked on at least one surface of the polarized film, wherein the layer(s) comprised of a thiourethane-based resin are obtained by reacting a polymerizable composition containing:

(A) one kind or two or more kinds of isocyanate compound(s) selected from the group consisting of a polyisocyanate compound, an isocyanate compound having an isothiocyanate group and a polyisothiocyanate compound, with (B) one kind or two or more kinds of active hydrogen compound(s) selected from the group consisting of a thiol compound having a hydroxyl group and a polythiol compound.

(2) The plastic polarized lens according to above (1), wherein (A) the isocyanate compound(s) does not contain aromatic isocyanate.

(3) The plastic polarized lens according to above (1), wherein (A) the isocyanate compound is an aromatic isocyanate, and (B) the active hydrogen compound is one or more kind(s) of polythiol selected from the group consisting of 4-mercaptomethyl-1,8-dimercapto-3,6-dithiaoctane, 4, 8 or 4, 7 or 5,7-dimercaptomethyl-1,11-dimercapto-3,6,9-trithiaundecane, pentaerythritol tetrakismercapto acetate, pentaerythritol tetrakismercapto propionate, 2,5-bis(mercaptomethyl)-1,4-dithian and bis(mercaptoethyl)sulfide, 1,1,3,3-tetrakis(mercaptomethylthio)propane, 4,6-bis(mercaptomethylthio)-1,3-dithian and 2-(2,2-bis(mercaptomethylthio)ethyl)-1,3-dithiethane.

(4) The plastic polarized lens according to above (1) or (3), wherein the layers comprised of a thiourethane-based resin are stacked on both surfaces of the polarized film.

(5) A plastic polarized lens comprising:

a polarized film comprised of thermoplastic polyester, which layer(s) comprised of a urethane-based resin constituted by a polyhydroxy compound-derived structural unit and a polyisocyanate-derived structural unit is stacked on at least one surface of the polarized film, and which is formed under the condition of temperature $T2$ represented by the following formula:

(Glass Transition Temperature of Thermoplastic Polyester)+100° C.$<T2\leq$(Melting Point of Thermoplastic Polyester), and layers comprised of a thiourethane-based resin which are stacked on the surfaces of the layer(s) comprised of a urethane-based resin, wherein the layers comprised of a thiourethane-based resin are obtained by reacting a polymerizable composition:

(A) one kind or two or more kinds of isocyanate compound(s) selected from the group consisting of a polyisocyanate compound, an isocyanate compound having an isothiocyanate group and a polyisothiocyanate compound, with (B) one kind or two or more kinds of active hydrogen compound(s) selected from the group consisting of a thiol compound having a hydroxyl group and a polythiol compound.

(6) The plastic polarized lens according to above (5), wherein (A) the isocyanate compound(s) does not contain aromatic isocyanate.

(7) The plastic polarized lens according to above (5), wherein (A) the isocyanate compound is an aromatic isocyanate, and (B) the active hydrogen compound is one or more kind(s) of polythiol selected from the group consisting of 4-mercaptomethyl-1,8-dimercapto-3,6-dithiaoctane, 4, 8 or 4, 7 or 5,7-dimercaptomethyl-1,11-dimercapto-3,6,9-trithiaundecane, pentaerythritol tetrakismercapto acetate, pentaerythritol tetrakismercapto propionate, 2,5-bis(mercaptomethyl)-1,4-dithian and bis(mercaptoethyl)sulfide, 1,1,3,3-tetrakis(mercaptomethylthio)propane, 4,6-bis(mercaptomethylthio)-1,3-dithian and 2-(2,2-bis(mercaptomethylthio)ethyl)-1,3-dithiethane.

(8) The plastic polarized lens according to any of above (5) to (7), wherein the layers comprised of a thiourethane-based resin are stacked on both surfaces of the polarized film.

(9) The plastic polarized lens according to any of above (1) to (8), wherein layer(s) comprised of a urethane-based resin constituted by a polyhydroxy compound-derived structural unit and a polyisocyanate-derived structural unit is stacked on at least one surface of the polarized film.

(10) The plastic polarized lens according to any of above (5) to (9), wherein the polyhydroxy compound is one or more kind(s) selected from the group consisting of polyester diol, polyether diol, polythioether diol, polylactone diol and polyacetal diol, and the polyisocyanate which constitutes the urethane-based resin is one or more kind(s) selected from the group consisting of 1,4-tetramethylenediisocyanate, 1,6-hexamethylenediisocyanate, 1,8-octamethylenediisocyanate, 1,10-decamethylenediisocyanate, 1,4-cyclohexylenediisocyanate, tolylenediisocyanate, 4,4'-methylenebis(cyclohexyl isocyanate), 4,4'-diphenylmethanediisocyanate, isophoronediisocyanate and triphenylmethanetriisocyanate.

(11) The plastic polarized lens according to above (10), wherein the polyhydroxy compound is polyester diol, and the polyisocyanate which constitutes the urethane-based resin is one or more kind(s) selected from the group consisting of 1,6-hexamethylenediisocyanate, 1,4-cyclohexylene-diisocyanate, tolylenediisocyanate, 4,4'-methylenebis(cyclohexyl isocyanate), 4,4'-diphenylmethanediisocyanate and isophoronediisocyanate.

(12) The plastic polarized lens according to above (11), wherein the polyester diol is polyester diol having a hydroxyl group at the terminal, which is obtained by reacting alkylenediol having a straight or branched chain, unsaturated alkylenediol having a straight or branched chain, or a mixture of diols, with adipic acid, sebacic acid, maleic acid, fumaric acid, isophthalic acid, phthalic acid, terephthalic acid or a mixture thereof.

(13) The plastic polarized lens according to above (11), wherein the polyisocyanate which constitutes the urethane-based resin is isophorone diisocyanate.

(14) The plastic polarized lens according to any of above (1) to (13), wherein the thermoplastic polyester is polyethylene terephthalate.

(15) The plastic polarized lens according to any of above (2), (4), (6), (8) to (14), wherein (A) the isocyanate compound is a diisocyanate compound, and (B) the active hydrogen compound is a polythiol compound.

(16) The plastic polarized lens according to any of above (2), (4), (6), (8) to (14), wherein (A) the isocyanate compound is one or more kind(s) selected from the group consisting of 2,5-bis(isocyanatomethyl)bicyclo-[2.2.1]-heptane, 2,6-bis(isocyanatomethyl)bicyclo-[2.2.1]-heptane and m-xylylene diisocyanates, and (B) the active hydrogen compound is one or more kind(s) selected from the group consisting of pentaerythritol tetrakis (3-mercaptopropionate), 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, 1,1,3,3-tetrakis(mercaptomethylthio)propane, 4,6-bis(mercaptomethylthio)-1,3-dithian and 2-(2,2-bis(mercaptomethylthio)ethyl)-1,3-dithiethane.

(17) The plastic polarized lens according to any of above (2), (4), (6), (7), (9) to (16), wherein the refractive index at e-line of the thiourethane-based resin is in the range of 1.57 to 1.70.

(18) The plastic polarized lens according to any of above (2), (4), (6), (7), (9) to (16), wherein the refractive index at e-line of the thiourethane-based resin is in the range of 1.59 to 1.70.

(19) The plastic polarized lens according to any of above (3), (4), (7) to (14), wherein the polymerizable composition further includes hexamethylenediisocyanate.

(20) The plastic polarized lens according to any of above (3), (4), (7) to (14), (19), wherein the aromatic isocyanate is one or more kind(s) of compound selected from tolylenediisocyanate and diphenylmethanediisocyanate.

(21) A method of producing a plastic polarized lens, comprising:

producing a polarized film by forming a thermoplastic polyester film under the temperature condition of glass transition temperature thereof+5° C. to glass transition temperature thereof+100° C.;

fixing the polarized film in a lens casting mold, in a state that at least one surface of the polarized film is apart from molds;

injecting a polymerizable composition in the spaces between the molds and respective surfaces of the polarized film; and stacking layer(s) comprised of a thiourethane based resin on at least one surface of the polarized film by polymerizing and curing the polymerizable composition, wherein the polymerizable composition contains:

(A) one kind or two or more kinds of isocyanate compound(s) selected from the group consisting of a polyisocyanate compound, an isocyanate compound having an isothiocyanate group and a polyisothiocyanate compound; and (B) one kind or two or more kinds of active hydrogen compound(s) selected from the group consisting of a thiol compound having a hydroxyl group and a polythiol compound.

(22) The method of producing a plastic polarized lens according to above (21), wherein (A) the isocyanate compound does not contain aromatic isocyanate.

(23) The method of producing a plastic polarized lens according to above (21), wherein (A) the isocyanate compound is aromatic isocyanate and (B) the active hydrogen compound is one or more kind(s) of polythiol selected from the group consisting of 4-mercaptomethyl-1,8-dimercapto-3,6-dithiaoctane, 4, 8 or 4, 7 or 5,7-dimercaptomethyl-1,11-dimercapto-3,6,9-trithiaundecane, pentaerythritol tetrakismercapto acetate, pentaerythritol tetrakismercapto propionate, 2,5-bis(mercaptomethyl)-1,4-dithian, bis(mercaptoethyl)sulfide, 1,1,3,3-tetrakis(mercaptomethylthio)propane, 4,6-bis(mercaptomethylthio)-1,3-dithian and 2-(2,2-bis(mercaptomethylthio)ethyl)-1,3-dithiethane.

(24) The method of producing a plastic polarized lens according to any one of above (21) to (23), wherein the fixing the polarized film contains fixing the polarized film in a lens casting mold, in a state that both surfaces of the polarized film is apart from molds and the injecting the polymerizable composition contains injecting the polymerizable composition in the spaces between the molds and both surfaces of the polarized film.

(25) A method of producing a plastic polarized lens comprising:

producing a polarized film having layer(s) comprised of a urethane-based resin constituted by a polyhydroxy compound-derived structural unit and a polyisocyanate-derived structural unit on at least one surface of the polarized film by forming a thermoplastic polyester film under the temperature condition of higher than "the glass transition temperature thereof+100° C." to melting point thereof;

fixing the polarized film in a lens casting mold, in a state that at least one surface of the polarized film is apart from molds;

injecting a polymerizable composition in the spaces between the molds and respective surfaces of the polarized film; and stacking layer(s) comprised of a thiourethane-based resin on at least one surface of the polarized film by polymerizing and curing the polymerizable composition, wherein the polymerizable composition contains:

(A) one kind or two or more kinds of isocyanate compound(s) selected from the group consisting of a polyisocyanate compound, an isocyanate compound having an isothiocyanate group and a polyisothiocyanate compound; and (B) one kind or two or more kinds of active hydrogen compound(s) selected from the group consisting of a thiol compound having a hydroxyl group and a polythiol compound.

(26) The method of producing a plastic polarized lens according to above (25), wherein (A) the isocyanate compound(s) does not contain aromatic isocyanate.

(27) The method of producing a plastic polarized lens according to above (25), wherein (A) the isocyanate compound is aromatic isocyanate and (B) the active hydrogen compound is one or more kind(s) of polythiol selected from the group consisting of 4-mercaptomethyl-1,8-dimercapto-3,6-dithiaoctane, 4, 8 or 4, 7 or 5,7-dimercaptomethyl-1,11-dimercapto-3,6,9-trithiaundecane, pentaerythritol tetrakismercapto acetate, pentaerythritol tetrakismercapto propionate, 2,5-bis(mercaptomethyl)-1,4-dithian, bis(mercaptoethyl)sulfide, 1,1,3,3-tetrakis(mercaptomethylthio)propane, 4,6-bis(mercaptomethylthio)-1,3-dithian and 2-(2,2-bis(mercaptomethylthio)ethyl)-1,3-dithiethane.

(28) The method of producing a plastic polarized lens according to any one of (25) to (27), wherein the fixing the polarized film contains fixing the polarized film in a lens casting mold, in a state that both surfaces of the polarized film is apart from molds and the injecting the polymerizable composition contains injecting the polymerizable composition in the spaces between the molds and both surfaces of the polarized film.

(29) The method of producing a plastic polarized lens according to any one of (21) to (28), further comprising, before the producing the polarized film, stacking layer(s) comprised of a urethane-based resin constituted by a polyhydroxy compound-derived structural unit and a polyisocyanate-derived structural unit, on at least one surface of the thermoplastic polyester film.

(30) The method of producing a plastic polarized lens according to any one of (21) to (24), further comprising, after the producing the polarized film, forming layer(s) comprised of a urethane-based resin constituted by a polyhydroxy compound-derived structural unit and a polyisocyanate-derived structural unit, on at least one surface of the polarized film.

(31) The method of producing a plastic polarized lens according to any one of (21) to (24), wherein the producing the polarized film contains forming layer(s) comprised of a urethane-based resin constituted by a polyhydroxy compound-derived structural unit and a polyisocyanate-derived structural unit, on at least one surface of the thermoplastic polyester film which is formed under the temperature condition of higher than "the glass transition temperature thereof+100° C." to melting point thereof.

(32) The method of producing a plastic polarized lens according to any one of (25) to (31), wherein the polyhydroxy compound is one or more kind(s) selected from the group consisting of polyester diol, polyether diol, polythioether diol, polylactone diol and polyacetal diol, and the polyisocyanate which constitutes the urethane-based resin is one or more kind(s) selected from the group consisting of 1,4-tetramethylene diisocyanate, 1,6-hexamethylene diisocyanate, 1,8-octamethylene diisocyanate, 1,10-decamethylene diisocyanate, 1,4-cyclohexylene diisocyanate, tolylene diisocyanate, 4,4'-methylene bis(cyclohexyl isocyanate), 4,4'-diphenylmethane diisocyanate, isophorone diisocyanate and triphenylmethane triisocyanate.

(33) The method of producing a plastic polarized lens according to above (32), wherein the polyhydroxy compound is polyester diol, and the polyisocyanate which constitutes the urethane-based resin is one or more kind(s) selected from the group consisting of 1,6-hexamethylene diisocyanate, 1,4-cyclohexylene diisocyanate, tolylene diisocyanate, 4,4'-methylene bis(cyclohexyl isocyanate), 4,4'-diphenylmethane diisocyanate and isophorone diisocyanate.

(34) The method of producing a plastic polarized lens according to above (33), wherein the polyester diol is polyester diol having a hydroxyl group at the terminal, which is obtained by reacting alkylenediol having a straight or branched chain, unsaturated alkylenediol having a straight or branched chain, or a mixture thereof, with adipic acid, sebacic acid, maleic acid, fumaric acid, isophthalic acid, phthalic acid, terephthalic acid or a mixture thereof.

(35) The method of producing a plastic polarized lens according to above (33), wherein the polyisocyanate which constitutes the urethane-based resin is isophorone diisocyanate.

(36) The method of producing a plastic polarized lens according to any one of (21) to (35), wherein the thermoplastic polyester is polyethylene terephthalate.

(37) The method of producing a plastic polarized lens according to any one of above (22), (24), (26), (28) to (36), wherein (A) the isocyanate compound is a diisocyanate compound, and (B) the active hydrogen compound is a polythiol compound.

(38) The method of producing a plastic polarized lens according to any one of above (22), (24), (26), (28) to (36), wherein (A) the isocyanate compound is one kind or two or more kinds selected from the group consisting of 2,5-bis(isocyanatomethyl)bicyclo-[2.2.1]-heptane, 2,6-bis(isocyanatomethyl)bicyclo-[2.2.1]-heptane and m-xylylene diisocyanate, and (B) the active hydrogen compound is a polythiol compound of one kind or two or more kinds selected from the group consisting of pentaerythritol tetrakis(3-mercaptopropionate), 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 1,1,3,3-tetrakis(mercaptomethylthio)propane, 4,6-bis(mercaptomethylthio)-1,3-dithian and 2-(2,2-bis(mercaptomethylthio)ethyl)-1,3-dithiethane.

(39) The method of producing a plastic polarized lens according to any one of above (22), (24), (26), (28) to (38), wherein, in the injecting the polymerizable composition, the viscosity of the polymerizable composition containing (A) the isocyanate compound and (B) the active hydrogen compound at 20° C. is 200 mPa·s or less.

(40) The method of producing a plastic polarized lens according to any one of above (23), (24), (27) to (36), wherein the polymerizable composition further contains hexamethylenediisocyanate.

(41) The method of producing a plastic polarized lens according to any one of above (23), (24), (27) to (36), (40), wherein the aromatic isocyanate is one or more kind(s) of compound selected from tolylenediisocyanate and diphenylmethanediisocyanate.

(42) A polarized film comprised of thermoplastic polyester which is formed under the condition of temperature $T1$ represented by the following formula:

(Glass Transition Temperature of Thermoplastic Polyester)+5° C.$\leq T1 \leq$(Glass Transition Temperature of Thermoplastic Polyester)+100° C.

(43) A polarized film comprised of thermoplastic polyester, which layer(s) comprised of a urethane-based resin constituted by a polyhydroxy compound-derived structural unit and a polyisocyanate-derived structural unit is stacked on at least one surface of the polarized film, and which is formed under the condition of temperature $T2$ represented by the following formula:

(Glass Transition Temperature of Thermoplastic Polyester)+100° C.$< T2 \leq$(Melting Point of Thermoplastic Polyester).

(44) The polarized film comprised of thermoplastic polyester according to above (42), wherein layer(s) comprised of a urethane-based resin constituted by a polyhydroxy compound-derived structural unit and a polyisocyanate-derived structural unit is stacked on at least one surface of the polarized film.

(45) The polarized film comprised of thermoplastic polyester according to above (43) or (44), wherein the polyhydroxy compound is one or more kind(s) selected from the group consisting of polyester diol, polyether diol, polythioether diol, polylactone diol and polyacetal diol, and the polyisocyanate which constitutes the urethane-based resin is one or more kind(s) selected from the group consisting of 1,4-tetramethylenediisocyanate, 1,6-hexamethylenediisocyanate, 1,8-octamethylenediisocyanate, 1,10-decamethylenediisocyanate, 1,4-cyclohexylenediisocyanate, tolylenediisocyanate, 4,4'-methylenebis(cyclohexyl isocyanate), 4,4'-diphenylmethanediisocyanate, isophoronediisocyanate and triphenylmethanetriisocyanate.

In addition, in present invention, the thiourethane-based resin does not include the urethane-based resin which comprises layer(s) formed on at least one surface of the polarized film.

The plastic polarized lens of the present invention is excellent processability and excellent adhesiveness between the polarized film and the plastic lens. Thus, the plastic polarized lens is excellent productivity, and is appropriate for mass production. As the plastic polarized lens possesses these characteristics, it is particularly useful as a polarized lens for eyeglasses.

BRIEF DESCRIPTION OF THE DRAWINGS

The above and other objects, advantages and features of the present invention will be more apparent from the following description taken in conjunction with the accompanying drawings, in which.

DETAILED DESCRIPTION

Figure 1:
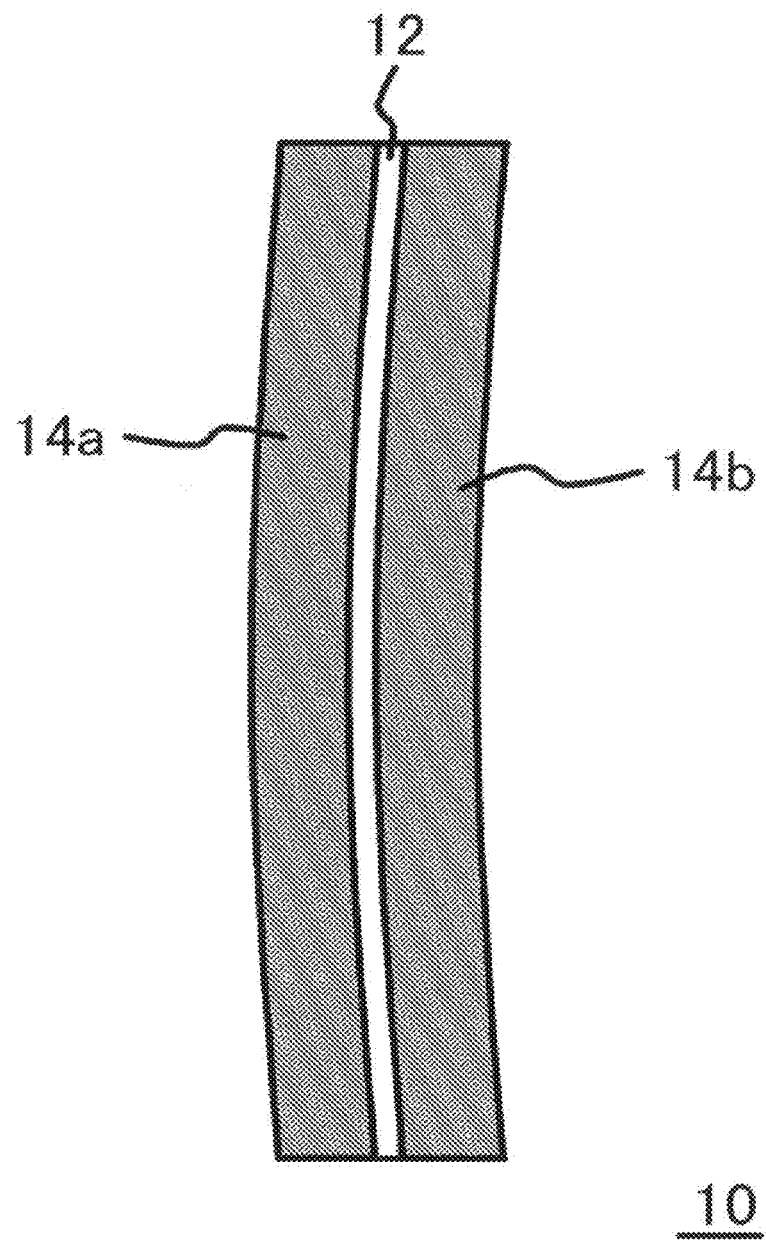
FIG. 1 shows a cross-sectional view schematically showing a plastic polarized lens related to the embodiment.

The invention will be now described herein with reference to illustrative embodiments. Those skilled in the art will recognize that many alternative embodiment can be accomplished using the teachings of the present invention and that the invention is not limited to the embodiments illustrated for explanatory purposed.

In the following, the embodiments of the present invention will be described using drawings. In all the drawings, the same mark will be applied to the same composing unit, and the explanation will be abbreviated as appropriate.

A plastic polarized lens of the present embodiments comprising: a polarized film comprised of thermoplastic polyester which is formed under the condition of temperature $T1$ represented by the following formula:

(Glass Transition Temperature of Thermoplastic Polyester)+5° C.$\leq T1 \leq$(Glass Transition Temperature of Thermoplastic Polyester)+100° C., and layer(s) comprised of a thiourethane-based resin which are stacked on at least one surface of the polarized film.

The layers comprised of a thiourethane-based resin are obtained by reacting:

(A) one kind or two or more kinds of isocyanate compound(s) selected from the group consisting of a polyisocyanate compound, an isocyanate compound having an isothiocyanate group and a polyisothiocyanate compound, with (B) one kind or two or more kinds of active hydrogen compound(s) selected from the group consisting of a thiol compound having a hydroxyl group and a polythiol compound.

A plastic polarized lens of the present embodiments comprising: a polarized film comprised of thermoplastic polyester that layer(s) comprised of a urethane-based resin constituted by a polyhydroxy compound-derived structural unit and a polyisocyanate-derived structural unit is stacked on at least one surface of the polarized film, which is formed under the condition of temperature T2 represented by the following formula:

$$\text{Glass Transition Temperature of Thermoplastic Polyester}+100°\text{ C.}<T2\leq(\text{Melting Point of Thermoplastic Polyester), and}$$

layer(s) comprised of a thiourethane-based resin which are stacked on at least one surface of the polarized film.

The layers comprised of a thiourethane-based resin are obtained by reacting:

(A) one kind or two or more kinds of isocyanate compound(s) selected from the group consisting of a polyisocyanate compound, an isocyanate compound having an isothiocyanate group and a polyisothiocyanate compound, with (B) one kind or two or more kinds of active hydrogen compound(s) selected from the group consisting of a thiol compound having a hydroxyl group and a polythiol compound.

In the present embodiments, the case that "(A) the isocyanate compound(s)" does not contain an aromatic isocyanate is described as "Embodiment No. A". Furthermore, two above embodiments having characteristics of "Embodiment No. A" are described as "Embodiment No. A1 and No. A2" in order.

In the present embodiments, the following case is described as "Embodiment No. B".

(A) the isocyanate compound: an aromatic isocyanate, and
(B) the active hydrogen compounds: one or more kind(s) of polythiol selected from 4-mercaptomethyl-1,8-dimercapto-3,6-dithiaoctane, 4, 8 or 4, 7 or 5,7-dimercaptomethyl-1,11-dimercapto-3,6,9-trithiaundecane, pentaerythritol tetrakismercapto acetate, pentaerythritol tetrakismercapto propionate, 2,5-bis(mercaptomethyl)-1,4-dithian and bis (mercaptoethyl)sulfide, 1,1,3,3-tetrakis(mercaptomethylthio)propane, 4,6-bis(mercaptomethylthio)-1,3-dithian and 2-(2,2-bis(mercaptomethylthio)ethyl)-1,3-dithiethane.

Furthermore, two above embodiments having characteristics of "Embodiment No. B" are described as "Embodiment No. B1 and No. B2" in order.

First of all, "Embodiment No. A1 and No. A2" in Embodiment No. A are described.

Embodiment No. A1

As shown in FIG. 1, the plastic polarized lens 10 of the present embodiment has thiourethane-based resin layers (plastic lens) 14a, 14b on both surfaces of a polarized film 12 containing a thermoplastic polyester. In addition, in the present embodiment, the resin layers 14a, 14b are stacked on both surfaces of a polarized film 12. However, the resin layer 14b may be formed on only one surface of a polarized film 12.

For the thermoplastic polyester, polyethylene terephthalate, polyethylene naphthalate, polybutylene terephthalate and the like may be specifically used, of which polyethylene terephthalate is preferable from view points of water resistance, heat resistance and mold processability. A polyester modified by addition of a copolymerization component and the like is also included.

The polarized film 12 comprised of thermoplastic polyester is formed under the condition of temperature T1 represented by the following formula:

$$\text{(Glass Transition Temperature of Thermoplastic Polyester)}+5°\text{ C.}\leq T1\leq(\text{Glass Transition Temperature of Thermoplastic Polyester)}+100°\text{ C.}$$

The polarized film 12 is formed (curved) in a desired curvature formed under this temperature condition, and thus it has excellent adhesion property to the plastic lenses 14a and 14b. Therefore, the plastic polarized lens of the present embodiment has excellent productivity and is appropriate for mass production.

A plastic polarized lens of the present embodiment in which thiourethane-based resin layers 14a and 14b are stacked on both surfaces of a polarized film 12 comprised of thermoplastic polyester, has excellent water resistance, suppressed uncomfortable feeling on wearing, capability of thinning of lens, and furthermore suppressed peeling-off of the polarized film during a downstream process of grinding the periphery. Namely, it is excellent in the balance of these characteristics.

In addition, the polarized film 12 may have a layer(s) comprised of a urethane-based resin constituted by a polyhydroxy compound-derived structural unit and a polyisocyanate-derived structural unit, on at least one surface.

The method of producing the plastic polarized lens will be described below.

The method of producing the plastic polarized lens includes the following steps:

(a) producing a polarized film by forming a thermoplastic polyester film under the temperature condition of glass transition temperature thereof+5° C. to glass transition temperature thereof+100° C.;

(b) fixing the polarized film in a lens casting mold, in a state that at least one surface of the polarized film is apart from molds;

(c) injecting a polymerizable composition (mixture) in the spaces between the molds and respective surfaces of the polarized film; and (d) stacking layer(s) comprised of a thiourethane-based resin on at least one surface of the polarized film by polymerizing and curing the polymerizable composition.

Each step will be described in the order.

(a) Step of Producing a Polarized Film by Forming a Thermoplastic Polyester Film Under the Temperature Condition of Glass Transition Temperature Thereof+5° C. to Glass Transition Temperature Thereof+100° C.

The polarized film comprised of a thermoplastic polyester of the present embodiment is disclosed, for example, in Japanese Laid-open patent publication No. 2002-267841. Specifically, it is a polarized film having a matrix of a thermoplastic polyester, wherein the polarized film may be obtained by blending a dichroic dye in the thermoplastic polyester, molding it to a film, followed by uniaxial extension of the film obtained by molding, and subsequent heat treatment at a prescribed temperature. The thickness is normally in the range of 10 to 500 μm.

As the dichroic dye used in the present invention, publicly-known dyes may be used. Examples include those disclosed in Japanese Laid-open patent publication No. S61-087757, Japanese Laid-open patent publication No. S61-285259, Japanese Laid-open patent publication No. S62-270664, Japanese Laid-open patent publication No. S62-275163 and Japanese Laid-open patent publication No. H1-103667. Specifically, the dyes include an anthraquinone-based dye, a quinophthalone-based dye and an azo-based dye and the like. Those having heat resistance at molding of the thermoplastic polyester are preferable.

The forming of the thermoplastic polyester film can be performed under a temperature condition of glass transition temperature thereof+5° C. to glass transition temperature thereof+100° C., more preferably under a temperature condition of glass transition temperature thereof+5° C. to glass transition temperature thereof+80° C., and most preferably under a temperature condition of glass transition temperature thereof+5° C. to glass transition temperature thereof+70° C. As for the forming method of the thermoplastic polyester film, a typical method can be used as long as the film is heated in the above-mentioned temperature and can be given in a desired curvature shape.

In the above-mentioned forming temperature, the adhesiveness between the polarized film comprised of the thermoplastic polyester and the layer comprised of the thiourethane-based resin is excellent, regardless of the existence of the coated layer containing a urethane-based resin. Furthermore, in the forming temperature of "glass transition temperature of the thermoplastic polyester+70° C. to glass transition temperature thereof+100° C.", and especially, of "glass transition temperature of the thermoplastic polyester+80° C. to glass transition temperature thereof+100° C.", the adhesiveness between the polarized film and the layer comprised of thiourethane-based resin is excellent, regardless of the existence of the coated layer containing a urethane-based resin, but when the polarized film has a coated layer containing a urethane-based resin, the adhesiveness between the polarized film comprised of a thermoplastic polyester and the layer comprised of a thiourethane-based resin tends to be excellent.

When the thermoplastic polyester is, for example, polyethylene terephthalate, since the glass transition temperature thereof is 74° C., forming can be performed under a temperature condition of 79° C. to 174° C., preferably 79° C. to 154° C., and more preferably 79° C. to 144° C.

The glass transition temperature of the thermoplastic polyester can be generally measured by DSC (differential scanning calorimeter) and the like.

As the forming method, there are vacuum forming, pressure forming, vacuum-pressure forming, press forming and the like. In these forming methods, by adjusting the temperature of the thermoplastic polyester film to enter the above-mentioned temperature range, and by forming it into a desired curvature shape, the adhesiveness between the polarized film comprised of the thermoplastic polyester film and the plastic lens can be improved.

In the forming of the thermoplastic polyester film, conditions such as the forming pressure and the forming time and the like are appropriately adjusted in correspondence to the forming method, forming temperature, production apparatus and the like. In addition, the thermoplastic polyester film may be heated to the above-mentioned temperature before forming with a die and the like.

In the present embodiment, there may be a step which forms layer(s) comprised of a urethane-based resin constituted by a polyhydroxy compound-derived structural unit and a polyisocyanate-derived structural unit, on at least one surface of the thermoplastic polyester film or the polarized film.

The step of forming a layer containing urethane-based resin (urethane-based coating treatment) on both surfaces of the polarized film will be described below as an example.

Before coating treatment with the urethane-based resin on the polarized film surface, one kind or two or more kinds of pretreatments selected from those such as treatment with chemicals (gas or chemical solution), treatment with corona discharge, treatment with plasma, treatment with ultra violet irradiation, treatment with electron beam irradiation, treatment with surface roughening, and treatment with burning may be performed on the polarized film in advance.

In the present embodiment, when the coating agent containing the urethane-based resin is coated on the polarized film comprised of the thermoplastic polyester, the coating can be performed without any solvent. However, typically it is preferable to select an appropriate solvent and coat by using the coating solution in which the coating agent has been dissolved or dispersed.

As the solvent, alcohol compounds such as methanol, ethanol, isopropanol and the like, aromatic compounds such as toluene, xylene and the like, ester compounds such as ethylacetate and the like, ketone compounds such as acetone, methylethylketone, methylisobutylketone and the like, and halogen compounds such as dichloromethane and the like may be selected, and may be used singularly or in combinations of two or more kinds.

The concentration of the urethane-based resin conversion of the coating solution should be 0.1 to 50 wt %, preferably 1 to 50 wt %, and most preferably 3 to 30 wt %. When it exceeds 50 wt %, the temporal stability of the coating solution becomes deficient, the existence of the coated layer becomes visible because the coated layer thickens due to too much urethane resin being coated, or a decrease in adhesiveness may occur due to peel-offs within the coated layer. On the other hand, when it is less than 1 wt %, the effect of adhesiveness improvement between the film and the urethane resin base material cannot be fully obtained.

The thickness of the coated layer should be 30 to 0.001 μm, preferably 10 to 0.01 μm, and more preferably 5 to 0.05 μm.

In the present embodiment, the coating solution is coated as necessary on both surfaces of the polarized film comprised of the thermoplastic polyester, and the coating solution portion which is fluid on the polarized film is removed from the film as necessary and dried. There is no particular limit on the drying temperature, but typically it should be 5 to 100° C., preferably 20 to 100° C., more preferably 20 to 80° C., and most preferably 20 to 60° C., or these temperatures may be combined and heated in steps.

The drying time is set depending on the solvent used, the drying temperature, the blowing conditions and the like, and there is no particular limit, although it is typically 1 minute to 48 hours, and more preferably in the range of 10 minutes to 24 hours.

Although, in the present embodiment, there is no particular limit on the method of coating of the coating solution on both surfaces of the polarized film comprised of thermoplastic polyester, it is largely classified into a method of treating the polarized film with a coating agent containing urethane-based resin and then forming a curvature, a method of treating with a coating agent containing urethane-based resin after forming a curvature, or a method of employing both of above methods in combination. Any of the above methods may be employed, and depending on each condition, conventionally known methods such as a roll-coating method, a spin-coating method, a spray-coating method, a bar-coating method, a dipping method and the like may be used. After drying, the coating can be performed once or more, and the coating solution used for each time may be the same or of different kinds. Typically, the object of the present embodiment can be achieved by one-time coating and drying without repeated coating.

After coating the polarized film with the urethane-based resin used for the above-mentioned primer coating treatment as necessary, drying and/or heat treatment is performed as necessary. As long as the applied temperature of the drying and/or heat treatment does not actually deteriorate the function of the polarized film, there is no particular limit. After coating the resin on the polarized film, an active energy line may be irradiated on it. As the active energy line, there is an ultraviolet ray or an electron beam.

The urethane-based resin for use in the primer coating treatment is a polymer comprised of a polyhydroxy compound-derived structural unit and a polyisocyanate-derived structural unit. As the polyhydroxy compound, polyesterdiol, polyetherdiol, polythioetherdiol, polylactonediol, polyacetaldiol and the like can be mentioned. Among them, polyesterdiol and polyetherdiol are preferable, and polyesterdiol is particularly preferable.

As the polyester diol, there are polyesters which have a hydroxyl group at the terminal, which can be obtained by reacting diols or polyhydric alcohols, such as saturated polyhydric alcohols as exemplified by ethylene glycol, propylene glycol, butylene glycol, diethylene glycol, neopentyl glycol, hexamethylene glycol, trimethylol propane, 3-methyl1,5-pentanediol and the like or unsaturated polyhydric alcohols as exemplified by butanediol and the like, or their mixture, with organic dicarboxylic acid like saturated aliphatic acids such as adipic acid and sebacic acid, unsaturated aliphatic acids such as maleic acid and fumaric acid, aromatic carboxylic acids such as isophthalic acid, phthalic acid and terephthalic acid, or their anhydrides, or their mixture; polyesters obtained by ring-opening polymerization of lactones such as caprolactam or methylcaprolactone with diols; or the like.

Specific examples of the polyetherdiol include a polymer or a copolymer having a hydroxyl group at the terminal, which is obtained by ring-opening polymerization or ring-opening copolymerization of ethylene oxide, propylene oxide, epichlorohydrin, oxacyclobutane, substituted oxacyclobutane, tetrahydrofuran or the like; their mixtures or the like.

Examples of polyisocyanate as a monomer of the above-mentioned urethane-based resin include 1,4-tetramethylenediisocyanate, 1,6-hexamethylenediisocyanate, 1,8-octamethylenediisocyanate, 1,10-decamethylenediisocyanate, 1,4-cyclohexylenediisocyanate, tolylenediisocyanate, 4,4'-methylenebis(cyclohexyl isocyanate), 4,4'-diphenylmethanediisocyanate, isophoronediisocyanate, triphenylmethanetriisocyanate and the like, and one kind or two or more kinds may be selected and employed.

Among them, 1,6-hexamethylenediisocyanate, 1,4-cyclohexylenediisocyanate, tolylenediisocyanate, 4,4'-methylenebis(cyclohexyl isocyanate), 4,4'-diphenylmethanediisocyanate, and isophoronediisocyanate are particularly preferable.

The polyhydroxy compound and polyisocyanate which constitute the urethane-based resin can be suitably selected from those examples and combined together. Among them, the polyhydroxy compound is preferably polyesterdiol, more preferably polyesterdiol composed of adipic acid and butyleneglycol and 3-methyl1,5-pentanediol. Meanwhile, the isocyanate component is preferably isophoronediisocyanate. In view of adhesiveness between the film and the material resin, this combination is particularly preferable.

As specific examples of the chemical treatment mentioned above, there are gas treatments using ozone, halogen gas, chlorine dioxide and the like, or chemical solution treatments using oxidizing agents or reducing agents such as sodium hypochlorite, alkaline metal hydroxides, alkaline earth metal hydroxides, sodium metals, sulfuric acid, nitric acid and the like, or acid radicals and bases. In the chemical solution treatment, the oxidizing agents and reducing agents, or the acid radicals and bases are typically dissolved in water, alcohol, liquid ammonia and the like and employed in a liquid state.

When the treatment chemical is alkaline metal hydroxide and/or alkaline earth metal hydroxides, as the alkaline metal hydroxide, there are lithium hydroxide, sodium hydroxide, potassium hydroxide and the like; as alkaline earth metal hydroxides, there are magnesium hydroxide, calcium hydroxide, barium hydroxide and the like, and one kind or two or more kinds may be selected and employed. Among them, sodium hydroxide and potassium hydroxide are preferable, and sodium hydroxide is particularly preferable.

It is preferable that the alkaline metal hydroxides and/or alkaline earth metal hydroxides are employed as solutions; as solvents for the solutions, there are water and/or organic solvents, and examples of organic solvents include methanol, ethanol, isopropanol and the like.

The concentration of the solution mentioned above should be in a range of 5 to 55 weight %, and preferably 10 to 45 weight %; and the temperature of the solution should be in a range of 0 to 95° C., preferably 20 to 90° C., and more preferably 30 to 80° C.

The pretreatment by alkaline metal hydroxides and/or alkaline earth metal hydroxides with respect to the present embodiment can be performed by bringing into contact the solution, which is within the above-mentioned solution concentration and temperature range, with one side or both sides of the polarized film for a predetermined period of time. As the method of contact, there are no particular limits, and for example, a method of immersing of the polarized film into the solution, or contacting with the polarized film by showering or surface-flowing can be suggested. Among them, the method of immersing the polarized film into the solution is preferable. During this time, in order to uniformize the concentration and the temperature of the solution, methods such as stirring, convection current flowing, and jet flowing can be adopted. Although there is no particular limit on the time period of contact, it should be within a time period range of 1 minute to 24 hours, preferably 5 minutes to 10 hours, and more preferably 5 minutes to 5 hours.

In order to bring into contact the alkaline metal hydroxides and/or alkaline earth metal hydroxides with the polarized film, a physical stimulation such as an ultrasound sonification or vibration may be co-opted.

In order to improve the wetting of the polarized film with the solution, the alkaline metal hydroxides and/or alkaline earth metal hydroxides may contain anionic, nonionic surfactants and the like.

During the contact between the alkaline metal hydroxides and/or alkaline earth metal hydroxides with the polarized film, the solution concentration, the solution temperature and the contact time period can be selected suitably within a range that the optical characteristics of the polarized film does not actually deteriorate.

After a solution of alkaline metal hydroxides and/or alkaline earth metal hydroxides is brought in contact with the polarized film, the polarized film is pulled out of the solution, and when necessary, the cleaning and drying of the polarized film may be performed with water and/or organic solvents such as methanol, ethanol, isopropanol, acetone, methylethyl ketone and the like.

The corona discharge treatment mentioned above is a kind of gas discharge, in which the gas molecules ionize to exhibit conductivity and uses the phenomenon in which the film surface is activated by the ions, which is a surface treatment technique employed widely. As the gas of discharge treatment, there is air, but the gas may be nitrogen gas, carbon dioxide gas, ammonia gas and the like. The corona discharge treatment can be achieved, for example, by a method of treating the polarized film surface using the corona generated by supplying voltage to electrodes of a known high frequency generation apparatus. The corona discharge treatment strength should be preferably 1 to 500 W·min/m$^2$, and more preferably 5 to 400 W·min/m$^2$.

Examples of the plasma treatment mentioned above are a normal pressure plasma treatment and a vacuum plasma treatment (low temperature plasma treatment).

In the normal pressure plasma treatment, discharge treatment is performed within a single or mixed gas atmosphere of gas such as air, water vapor, argon, nitrogen, helium, carbon dioxide, carbon monoxide and the like.

The vacuum plasma treatment can be performed within a reduced pressure, for example, by placing the polarized film inside a discharge treatment apparatus of an internal electrode type which has counter electrodes composed of a drum-shaped electrode and plural rod-shaped electrodes, and under a treatment gas atmosphere of 0.001 to 50 Torr, preferably 0.01 to 10 Torr, and more preferably 0.02 to 1 Torr, a high voltage of direct current or alternating current is supplied between the electrodes and discharged, generating plasma of the treatment gas, exposing the polarized film surface thereto. Although the treatment conditions of the vacuum plasma treatment depends on the treatment apparatus, the type of treatment gas, the pressure, the frequency of the power source and the like, the preferable conditions may be set suitably. As the treatment gas, for example, argon, nitrogen, helium, carbon dioxide, carbon monoxide, air, water vapor and the like may be used singularly or in mixture.

Figure 2:
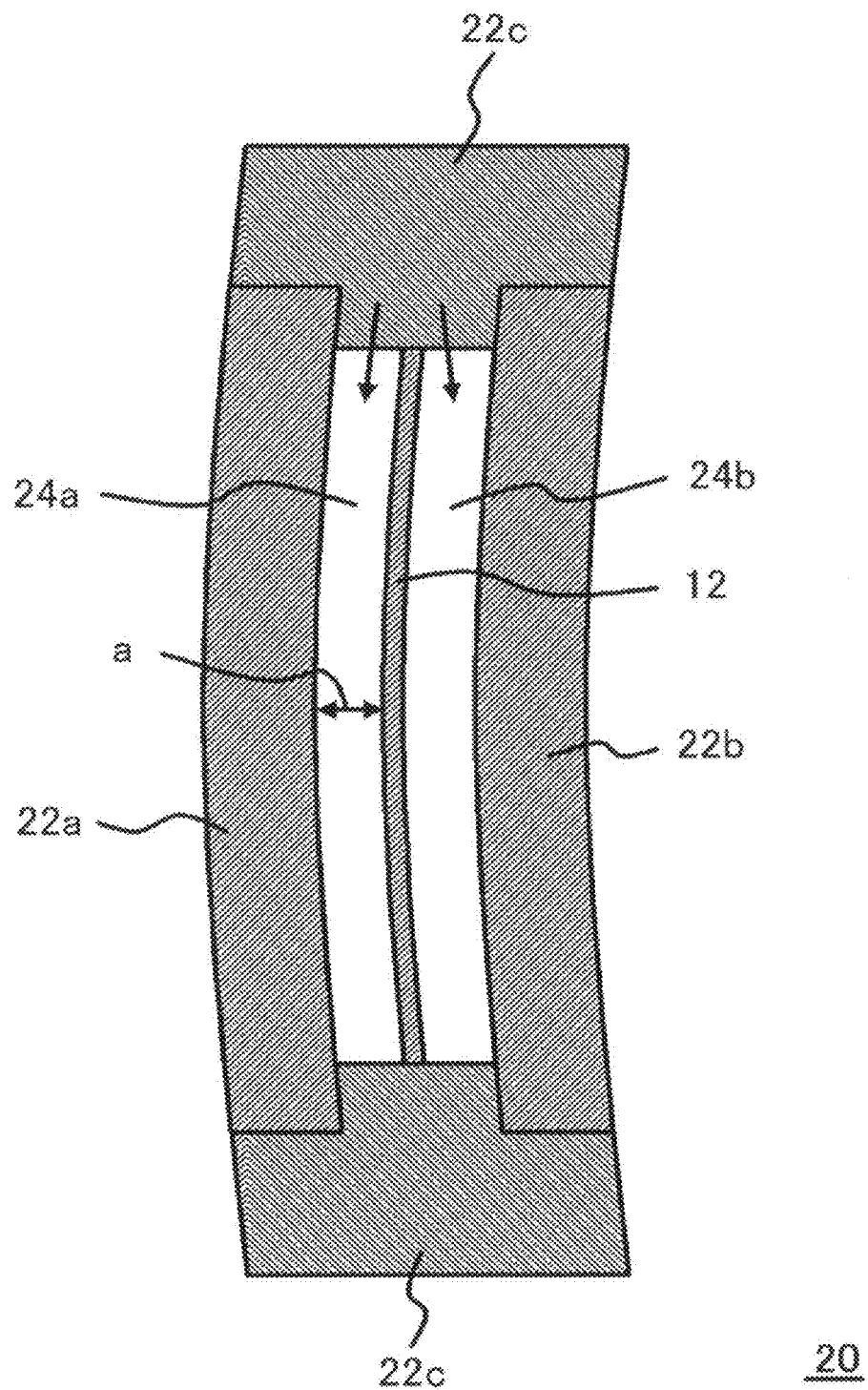
FIG. 2 shows a cross-sectional view schematically showing a lens casting mold related to the embodiment.

(b) Step of Fixing the Polarized Film in a Lens Casting Mold, in a State that at Least One Surface of the Polarized Film is Apart from Molds As shown in FIG. 2, the plastic polarized lens of the present embodiment can be obtained by injecting a polymerizable composition containing a certain isocyanate compound and a certain active hydrogen compound into a lens casting mold 20 where the polarized film 12 which is comprised of thermoplastic polyester and is performing a urethane-based coating treatment thereon is fixed thereto, and performing polymerization and curing. In addition, in the present embodiment, the Example which the polymerizable composition is injected in the spaces 24a, 24b is described as above. However, the lens casting mold 20 which the spaces 24a is not existed can be employed. In the above case, a layer comprised of a urethane-based resin is formed on the polarized film 12 exposed in the spaces 24b.

The lens casting mold 20 is generally comprised of two molds 22a and 22b maintained by a gasket 22c.

As the material of the gasket 22c, polyvinyl chloride, vinyl ethylene-acetate copolymer, ethylene-ethylacrylate copolymer, ethylene-propylene copolymer, ethylene-propylene-diene copolymer, polyurethane elastomer, fluorine rubber, or soft elastic resins in which fluorine rubber and polypropylene are blended can be employed. A material which does not swell or elute with respect to a polymerizable composition containing a certain isocyanate compound and a certain active hydrogen compound employed in the present embodiment is preferred.

As the material of the mold 22a and 22b, there are glass, metal and the like, and typically glass is employed. A mold releasing agent may be coated on molds 22a and 22b in advance in order to improve the mold-releasing property of the obtained lens. In addition, a coating solution which bestows a hard coating ability to the lens material may be coated on the molds in advance.

Inside the space of the lens casting mold 20, the polarized film 12 comprised of thermoplastic polyester is installed so that the film surface is parallel to the inner surface of the front side mold 22a which it faces. Between the polarized film 12 and the molds 22a and 22b, spaces 24a and 24b are formed, respectively. The separated distance of the spaces 24a and 24b where the space is the narrowest is about 0.2 to 2.0 mm.

Since the polymerizable composition containing (A) isocyanate compound and (B) active hydrogen compound having a thiol group are employed in the present embodiment, viscosity is low during injection and thus, the mixture can be injected easily even into the above-mentioned spaces of intervals.

(c) Step of Injecting a Polymerizable Composition in the Spaces Between the Molds and Respective Surfaces of the Polarized Film.

Subsequently, inside the space of the lens casting mold 20, at the two spaces 24a and 24b between the molds 22a and 22b and the polarized film 12, the mixture of (A) a certain isocyanate compound and (B) a certain active hydrogen compound is injected by a predetermined injection means.

The (A) isocyanate compound employed in the present embodiment includes compounds having an isothiocyanate group, and to be specific, is a compound of one kind or two or more kinds selected from polyisocyanate compounds, isocyanate compounds having an isothiocyanate group, or polyisothiocyanate compounds.

Examples of the polyisocyanate compounds include:

aliphatic polyisocyanate compounds such as hexamethylenediisocyanate, 2,2,4-trimethylhexanediisocyanate, 2,4,4-trimethylhexamethylenediisocyanate, lysine diisocyanatomethylester, lysine triisocyanate, m-xylenediisocyanate, α,α,α',α'-tetramethylxylylenediisocyanate bis(isocyanatomethyl)naphthalene, mesitylylenetriisocyanate, bis(isocyanatomethyl)sulfide, bis(isocyanatoethyl)sulfide, bis(isocyanatomethyl)disulfide, bis(isocyanatoethyl)disulfide, bis(isocyanatomethylthio)methane, bis(isocyanatoethylthio)methane, bis(isocyanatoethylthio)ethane, bis(isocyanatomethylthio)ethane and the like;

alicyclic polyisocyanate compounds such as isophoronediisocyanate, bis(isocyanatomethyl)cyclohexane, dicyclohexylmethanediisocyanate, cyclohexanediisocyanate, methylcyclohexanediisocyanate, dicyclohexyldimethylmethaneisocyanate, 2,5-bis(isocyanatomethyl)bicyclo-[2.2.1]-heptane, 2,6-bis(isocyanatomethyl)bicyclo-[2.2.1]-heptane, 3,8-bis(isocyanatomethyl)tricyclodecane, 3,9-bis(isocyanatomethyl)tricyclodecane, 4,8-bis(isocyanatomethyl)tricyclodecane, 4,9-bis(isocyanatomethyl)tricyclodecane and the like;

aromatic polyisocyanate compounds such as diphenylsulfide-4,4-diisocyanate and the like; and heterocyclic polyisocyanate compounds such as 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiorane, 4,5-bis(isocyanatomethyl)-1,3-dithiorane and the like, but they are not limited to the example compounds.

As isocyanate compounds having an isothiocyanate group, for example, there are the exemplified polyisocyanate compounds mentioned above which have a part of the isocyanate group replaced with the isothiocyanate group, but they are not limited to these.

Examples of the polyisothiocyanate compounds include:

aliphatic polyisothiocyanate compounds such as hexamethylenediisothiocyanate, lysine diisothiocyanatomethylester, lysine triisothiocyanate, m-xylylenediisothiocyanate, bis(isothiocyanatomethyl)sulfide, bis(isothiocyanatomethyl) sulfide, bis(isothiocyanatoethyl)disulfide and the like;

alicyclic polyisothiocyanate compounds such as isophorone diisothiocyanate, bis(isothiocyanatomethyl)cyclohexane, dicyclohexylmethanediisothiocyanate, cyclohexanediisothiocyanate, methylcyclohexanediisothiocyanate, 2,5-bis(isothiocyanatomethyl)bicyclo-[2.2.1]-heptane, 2,6-bis(isothiocyanatomethyl)bicyclo-[2.2.1]-heptane, 3,8-bis(isothiocyanatomethyl)tricyclodecane, 3,9-bis(isothiocyanatomethyl)tricyclodecane, 4,8-bis(isothiocyanatomethyl)tricyclodecane, 4,9-bis(isothiocyanatomethyl)tricyclodecane and the like;

aromatic polyisothiocyanate compounds such as diphenyldisulfide-4,4-diisothiocyanate and the like; and sulfur-containing heterocyclic polyisothiocyanate compounds such as 2,5-diisothiocyanatothiophene, 2,5-bis(isothiocyanatomethyl)thiophene, 2,5-diisothiocyanatotetrahydrothiophene, 2,5-bis(isothiocyanatomethyl)tetrahydrothiophene, 3,4-bis(isothiocyanatomethyl)tetrahydrothiophene, 2,5-diisothiocyanato-1,4-dithiane, 2,5-bis(isothiocyanatomethyl)-1,4-dithiane, 4,5-diisothiocyanato-1,3-dithiorane, 4,5-bis(isothiocyanatomethyl)-1,3-dithiorane and the like, but they are not limited to the example compounds.

Furthermore, the above isocyanate compounds substituted with halogen such as chlorine, bromine and the like, with an alkyl group, an alkoxy group, a nitro group, or modified with polyhydric alcohol prepolymer, carbodiimide, urea, biuret, or a dimerization or trimerization reaction product of the isocyanate compounds may be used. Such isocyanate compounds may be used alone or in a combination of two or more.

Among these isocyanate compounds, in view of availability, cost, performance of the obtainable resin and the like, diisocyanate compounds are preferably employed. For example, hexamethylene diisocyanate, isophorone diisocyanate, bis(isocyanatomethyl)cyclohexane, dicyclohexylmethane diisocyanate, 2,5-bis(isocyanatomethyl)bicyclo-[2.2.1]-heptane, 2,6-bis(isocyanatomethyl)bicyclo-[2.2.1]-heptane, m-xylene diisocyanate, and 2,5-bis(isocyanatomethyl)-1,4-dithiane are preferably employed, and 2,5-bis(isocyanatomethyl)bicyclo-[2.2.1]-heptane, 2,6-bis(isocyanatomethyl)bicyclo-[2.2.1]-heptane, and m-xylene diisocyanate are preferably employed in particular.

The (B) active hydrogen compound employed in the present embodiment is an active hydrogen compound of one kind or two or more kinds selected from thiol compounds or polythiol compounds having a hydroxyl group.

Examples of the thiol compounds having a hydroxyl group include:

2-mercaptoethanol, 3-mercapto-1,2-propandiol, glycerin bis(mercaptoacetate), 4-mercaptophenol, 2,3-dimercapto-1-propanol, pentaerythritol tris(3-mercaptopropionate), pentaerythritol tris(thioglycolate) and the like, but they are not limited to the example compounds.

Example of the polythiol compounds include:

aliphatic polythiol compounds such as methanedithiol, 1,2-ethanedithiol, 1,2,3-propanetrithiol, 1,2-cyclohexanedithiol, bis(2-mercaptoethyl)ether, tetrakis(mercaptomethyl)methane, diethyleneglycol bis(2-mercaptoacetate), diethyleneglycol bis(3-mercaptopropionate), ethyleneglycol bis(2-mercaptoacetate), ethyleneglycol bis(3-mercaptopropionate) trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), bis(mercaptomethyl)sulfide, bis(mercaptomethyl)disulfide, bis(mercaptoethyl)sulfide, bis(mercaptoethyl)disulfide, bis(mercaptopropyl)sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropylthio)ethane, 1,2,3-tris(mercaptomethylthio)propane, 1,2,3-tris(2-mercaptoethylthio)propane, 1,2,3-tris(3-mercaptopropylthio)propane, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercaptomethyl-1,4-dithiane, 2,5-dimercapto-1,4-dithiane, 2,5-dimercaptomethyl-2,5-dimethyl-1,4-dithiane and esters of their thioglycolic acid and mercaptopropionic acid, hydroxymethylsulfide bis(2-mercaptoacetate), hydroxymethylsulfide bis(3-mercaptopropionate), hydroxyethylsulfide bis(2-mercaptoacetate), hydroxyethylsulfide bis(3-mercaptopropionate), hydroxymethyldisulfide bis(2-mercaptoacetate), hydroxymethyldisulfide bis(3-mercaptopropionate), hydroxyethyldisulfide bis(2-mercaptoacetate), hydroxyethyldisulfide bis(3-mercaptopropionate), 2-mercaptoethylether bis(2-mercaptoacetate), 2-mercaptoethylether bis(3-mercaptopropionate), thiodiglycolate bis(2-mercaptoethylester), thiodipropionate bis(2-mercaptoethylester), dithiodiglycolate bis(2-mercaptoethylester), dithiodipropionate bis(2-mercaptoethylester), 1,1,3,3-tetrakis(mercaptomethylthio)propane, 1,1,2,2-tetrakis(mercaptomethylthio)ethane, 4,6-bis(mercaptomethylthio)-1,3-dithian, tris(mercaptomethylthio)methane, tris(mercaptoethylthio)methane and the like;

aromatic polythiol compounds such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,3,5-trimercaptobenzene, 1,3,5-tris(mercaptomethyl)benzene, 1,3,5-tris(mercaptomethyleneoxy)benzene, 1,3,5-tris(mercaptoethyleneoxy)benzene, 2,5-toluenedithiol, 3,4-toluenedithiol, 1,5-naphthalenedithiol, 2,6-naphthalenedithiol and the like; and heterocyclic polythiol compounds such as 2-methylamino-4,6-dithiol-sym-triazine, 3,4-thiophenedithiol, bismuthiol, 4,6-bis(mercaptomethylthio)-1,3-dithiane, 2-(2,2-bis(mercaptomethylthio)ethyl)-1,3-dithiethane and the like, but they are not limited to the example compounds.

Furthermore, an oligomer of the above active hydrogen compounds or those substituted with halogen such as chlorine, bromine and the like may be used. These active hydrogen compounds may be used alone or in a combination of two or more.

Among these active hydrogen compounds, in view of availability, cost, performance of the obtainable resin and the like, polythiol compounds are preferably employed. For example, pentaerythritol tetrakis(2-mercaptoacetate), pentaerythritol tetrakis(3-mercaptopropionate), bis(mercaptoethyl)sulfide, 4-mercaptomethyl-1,8-dimercapto-3,6-dithiaoctane, 5,7- dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 2,5-dimercaptomethyl-1,4-dithiane, 1,1,3,3-tetrakis(mercaptomethylthio)propane, 4,6-bis(mercaptomethylthio)-1,3-dithiane and 2-(2,2-bis(mercaptomethylthio)ethyl)-1,3-dithiethane are preferably employed, and pentaerythritol tetrakis(3-mercaptopropionate), 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane are preferably employed in particular.

Furthermore, the (A) isocyanate compound employed in the present embodiment may be partially reacted with the (B) active hydrogen compound in advance preliminarily. Additionally, the (B) active hydrogen compound employed in the present embodiment may be partially reacted with the (A) isocyanate compound in advance preliminarily.

In addition to the (A) isocyanate compound and (B) active hydrogen compound, in order to modify the resin, a resin modifier such as a hydroxy compound, an epoxy compound, an episulfide compound, an organic acid and its anhydride, an olefin compound including (meth) acrylate compound or the like may be added. Herein, the resin modifier is a compound which adjusts or improves physical properties such as refractive index, Abbe's number, heat resistance, specific gravity, and mechanical strength such as impact strength of thiourethane-based resin.

Examples of the hydroxy compound used as the resin modifier include:

diethylene glycol, triethylene glycol, dipropylene glycol, tripropylene glycol, 1,4-butanediol, thiodiethanol, dithiodiethanol, glycerin, trimethylol propane, pentaerythritol, and an oligomer of these compounds, although it is not limited to these compounds.

Examples of the epoxy compound which can be added as the resin modifier include:

phenol-based epoxy compounds which can be obtained by condensation reactions between polyhydric phenol compounds such as bisphenol A glycidylether and the like and epihalohydrin compounds;

alcohol-based epoxy compounds which can be obtained by condensation between polyhydric alcohol compounds such as hydrogenated bisphenol A glycidylether and the like and epihalohydrin compounds;

glycidylester-based epoxy compounds which can be obtained by condensation between multivalent organic acid compounds such as 3,4-epoxycyclohexylmethyl-3',4'-epoxycyclohexanecarboxylate and the like and epihalohydrin compounds;

amine-based epoxy compounds which can be obtained by condensation between primary and secondary diamine compounds and epihalohydrin compounds; and aliphatic multivalent epoxy compounds such as vinylcyclohexenediepoxide and the like, but they are not limited to the example compounds.

Examples of the episulfide compound which can be added as the resin modifier include:

2,3-epithiopropylthio compounds of the chain aliphatic compounds such as bis(2,3-epithiopropylthio)sulfide, bis(2,3-epithiopropylthio)disulfide, bis(2,3-epithiopropylthio)methane, 1,2-bis(2,3-epithiopropylthio)ethane, 1,5-bis(2,3-epithiopropylthio)-3-thiapentane and the like;

2,3-epithiopropylthio compounds having alicyclic compounds and heterocyclic rings such as 1,3-bis(2,3-epithiopropylthio)cyclohexane, 2,5-bis(2,3-epithiopropylthiomethyl)-1,4-dithiane and the like; and aromatic 2,3-epithiopropylthio compounds such as 1,3-bis(2,3-epithiopropylthio)benzene, 1,4-bis(2,3-epithiopropylthio)benzene and the like, but they are not limited to the example compounds.

Examples of the organic acid and anhydride thereof which can be added as the resin modifier include:

thiodiglycolic acid, thiodipropionic acid, dithiodipropionic acid, anhydrous phthalic acid, hexahydro anhydrous phthalic acid, methylhexahydro anhydrous phthalic acid, methyltetrahydro anhydrous phthalic acid, anhydrous maleic acid, anhydrous trimellitic acid, anhydrous pyromellitic acid and the like, but they are not limited to the example compounds.

Examples of the olefin compound which can be added as the resin modifier include:

(meth)acrylate compounds such as benzylacrylate, benzylmethacrylate, cyclohexylacrylate, cyclohexylmethacrylate, 2-hydroxyethylacrylate, 2-hydroxymethylmethacrylate, glycidylacrylate, glycidylmethacrylate, phenoxyethylacrylate, phenoxyethylmethacrylate, phenylmethacrylate, ethyleneglycoldiacrylate, ethyleneglycoldimethacrylate, diethyleneglycoldiacrylate, diethyleneglycoldimethacrylate, triethyleneglycoldiacrylate, triethyleneglycoldimethacrylate, neopentylglycoldiacrylate, neopentylglycoldimethacrylate, ethyleneglycolbisglycidylacrylate, ethyleneglycolbisglycidylmethacrylate, bisphenol A diacrylate, bisphenol A dimethacrylate, bisphenol F diacrylate, bisphenol F dimethacrylate, trimethylolpropanetriacrylate, trimethylolpropanetrimethacrylate, glyceroldiacrylate, glyceroldimethacrylate, pentaerythritoltriacrylate, pentaerythritoltetracrylate, pentaerythritoltetramethacrylate, xylylenedithioldiacrylate, xylylenedithioldimethacrylate, mercaptoethylsulfidediacrylate, mercaptoethylsulfidedimethacrylate and the like;

allyl compounds such as allylglycidylether, diallylphthalate, diallylterephthalate, diallylisophthalate, diethyleneglycolbisallylcarbonate and the like; and vinyl compounds such as styrene, chlorostyrene, methylstyrene, bromostyrene, dibromostyrene, divinylbenzene, 3,9-divinylspirobi(m-dioxane) and the like, but they are not limited to the example compounds.

These resin modifiers may be used singularly, or by mixing two or more kinds thereof.

The ratio of the (A) isocyanate compound and the (B) active hydrogen compound (including the hydroxy compounds which are the resin modifiers) to be used in the present embodiment, in terms of the molar ratio of functional groups (NCO+NCS)/(SH+OH), is normally in the range of 0.8 to 1.5, and preferably in the range of 0.9 to 1.2.

The (A) isocyanate compound and the (B) active hydrogen compound employed in the present embodiment are selected after considering the availability, cost, handleability, performance of the obtainable resin and the like.

The important factor in the convenience of handling is the viscosity of the polymerizable composition during injection. The viscosity during injection is decided by the combination of the (A) isocyanate compound and the (B) active hydrogen compound (When employing the resin modifier, this includes the type and amount of the resin modifier. Furthermore, when employing a catalyst, this includes the type and amount of the catalyst.), but when the viscosity is too high, the production of the polarized lens becomes very difficult since it is very difficult to inject into the narrow spaces 24a and 24b located between the glass molds 22a and 22b and the polarized film 12 inside the space of the lens casting mold 20. Typically, the viscosity during injection should be preferably a measurement of 200 mPa·s or less at 20° C., and for producing a lens with very thin central thickness, an even lower viscosity of, for example, 100 mPa·s or less is preferable. The viscosity of the polymerizable composition is measured by using a B type viscometer at a solution temperature of 20° C.

As for the performance of the resin to be considered, the refractive index is important, and those with high refractive index can be used appropriately. For example, a combination of the (A) isocyanate compound and the (B) active hydrogen compound (when employing the resin modifier, this includes the type and amount of the resin modifier), which can obtain a resin having a refractive index typically in a range of 1.57 to 1.70, preferably in a range of 1.59 to 1.70, and most preferably in a range of 1.65 to 1.68 when its refractive index is measured by an e-beam is preferable. If the refractive index is too small, the film inside the polarized lens becomes obvious, and the outward appearance becomes poor.

The same polymerizable composition containing the (A) isocyanate compound and the (B) active hydrogen compound employed in the present embodiment is typically used on both sides of the polarized film, but there is no problem in using different mixtures.

When curing and forming the mixture of the (A) isocyanate compound and the (B) active hydrogen compound, as in the known forming method, materials such as catalysts such as dibutyl tin dichloride and the like, ultraviolet ray absorbing agents such as benzotriazole-based agents, internal mold releasing agents such as acidic phosphate ester and the like, photostabilizers, antioxidants, reaction initiators such as radical reaction initiator and the like, chain elongators, cross-linking agents, anticoloring agents, oil-soluble dyes, fillers and the like may be added as necessary.

When producing an injection solution by mixing a reaction catalyst, mold releasing agents or other additives to the (A) isocyanate compound and the (B) active hydrogen compound, the adding of the catalyst, the mold releasing agents and other additives are dependent on the solubility of the (A) isocyanate compound and the (B) active hydrogen compound, but the additives may be added and dissolved in the (A) isocyanate compound in advance, added and dissolved in the (B) active hydrogen compound in advance, or added and dissolved in the polymerizable composition containing the (A) isocyanate compound and the (B) active hydrogen compound. In addition, there is no problem in dissolving it in a part of the (A) isocyanate compound or the (B) active hydrogen compound to produce a master solution and then adding it to the mixture. The adding order is not limited by the exemplary methods, and is suitably selected on the basis of operability, safety and convenience.

Mixing is generally performed at a temperature of 30° C. and lower. From the viewpoint concerning the pot life of the mixture, sometimes it is more preferable when the temperature is even lower. Additionally, when additives such as catalysts or mold releasing agents do not exhibit solubility to the (A) isocyanate compound or the (B) active hydrogen compound, it can be heated in advance and then dissolved in the (A) isocyanate compound, the (B) active hydrogen compound or their mixture.

Furthermore, depending on the property of matter required of the plastic lens which can be obtained, performing degassing treatment under reduced pressure or filtration treatment under increased pressure and reduced pressure and the like as necessary may be preferable.

(d) Step of Stacking Layer(s) Comprised of a Thiourethane-Based Resin on at Least One Surface of the Polarized Film by Polymerizing and Curing the Polymerizable Composition Subsequently, the lens casting mold wherein the polarized film is fixed, into which the polymerizable composition containing the (A) isocyanate compound and the (B) active hydrogen compound has been injected, is cured and formed inside a heating apparatus, such as an oven or under water and the like, by a predetermined temperature program for several hours to several tens of hours.

The polymerizing and curing temperature cannot be limited since the conditions differ depending on the composition of the polymerizable composition, type of catalyst, shape of the mold and the like, but it is performed at a temperature of about −50 to 200° C. for 1 to 100 hours.

Typically, initializing at a temperature range of 5° C. to 40° C., slowly raising the temperature to a range of 80° C. to 130° C., and then heating at that temperature for 1 hour to 4 hours is general.

After the completion of the curing and forming, the plastic polarized lens of the present embodiment, as shown in FIG. 1, can be obtained by taking it out of the lens casting mold. In this plastic polarized lens 10, the resin layer 14a, the polarized film 12 and the resin layer 14b are stacked, respectively. Due to this structure, the peel-off of the polarized film 12 from the lens material during the outer circumference polishing process can be suppressed, and the polarized lens can be mass-produced industrially.

In the plastic polarized lens of the present embodiment, it is preferable to heat the released lens for an annealing treatment in order to lessen the distortion caused by the polymerization. The annealing temperature should typically be in a range of 80 to 150° C., preferably in a range of 100 to 130° C., and most preferably in a range of 110 to 130° C. The annealing time should typically be in a range of 0.5 to 5 hours, and preferably in a range of 1 to 4 hours.

The plastic polarized lens of the present embodiment is used having coated layer(s) formed on one surface or both surfaces as necessary. As the coated layers, there are primer layers, hard coated layers, antireflection film layers, antifog coated layers, antipollutant layers, water-repellent layers and the like. These coated layers can be each employed singularly, or they may be employed as multi-layers with plural coated layers. When forming the coated layers on both surfaces, the same coated layer may be formed on each surface, or different coated layers may be formed thereon.

Along with these coated layers, ultraviolet ray absorbing agents for protecting the lens or the eyes from ultraviolet rays, infrared absorbing agents for protecting the eyes from infrared rays, photostabilizers or antioxidants for improving the weathering resistance of the lens, dye or pigment for improving the fashionability of the lens, and photochromic dyes or photochromic pigments, antistatic agents, and other known additives for improving the performance of the lens may be co-opted. Various leveling agents may be employed for improving the coating characteristic.

The primer layer is typically formed between the polarized lens material (thiourethane-based resin) and the hard coated layer in order to improve the adhesiveness of the hard coated layer or the impact resistance of the polarized lens, and its layer thickness is typically 0.1 to 10 μm.

The primer layer is, for example, formed by a coating method or a dry method. In the coating method, the primer composition is coated by a coating method such as spin coating, dip coating and the like, and then it is solidified to form a primer layer. In the dry method, it is formed by a known dry method such as the CVD method or a vacuum plating method. When forming the primer layer, a preprocessing of the lens surface such as alkali treatment, plasma treatment, ultraviolet ray treatment and the like in order to improve the adhesiveness may be performed as necessary.

As the primer composition, materials which enable high adhesiveness between the solidified primer layer and the lens material (thiourethane-based resin) are preferred, and typically, primer compositions having urethane-based resins, epoxy-based resins, polyester-based resins, melanin-based resins, and polyvinylacetals as main ingredients are employed. The primer composition can be employed without a solvent, but it may employ appropriate solvents which do not affect the lens in order to adjust the viscosity of the composition and the like.

The hard coated layer is a coated layer which aims to provide functions such as abrasion resistance, wear resistance, moisture resistance, hot water resistance, heat resistance, weathering resistance and the like, and its layer thickness is typically 0.3 to 30 µm.

The hard coated layer is typically formed by curing after coating the hard coating composition by the known coating methods such as a spin coating method, dip coating method and the like. As the curing method, there are heat curing methods and curing methods by irradiation of energy lines such as ultraviolet rays, visible light and the like. When forming the hard coated layer, a preprocessing of the coating surface (the lens material or the primer layer) such as alkali treatment, plasma treatment, ultraviolet ray treatment and the like in order to improve the adhesiveness may be performed as necessary.

As hard coating compositions, the mixture of organic silicone compounds having curability and fine oxide particles (including complex fine oxide particles) of Si, Al, Sn, Sb, Ta, Ce, La, Fe, Zn, W, Zr, In, Ti and the like are frequently employed. Besides these, amines, amino acids, metal acetylacetonate complexes, organic acid metal salts, perchloric acids, salts of perchloric acids, acids, metal chlorides, multifunctional epoxy compounds and the like may be employed. The hard coating composition can be employed without a solvent, but it may be employed with appropriate solvents which do not affect the lens.

The antireflection layer is typically formed on the hard coated layer as necessary. The antireflection layer may be inorganic-based or organic-based. Generally, the inorganic-based antireflection layer is frequently formed by dry methods such as vacuum plating method, sputtering method, ion plating method, ion beam assisting method, CVD method and the like, which employ inorganic oxides such as $SiO_2$, $TiO_2$ and the like. Generally, the organic-based antireflection layer is frequently formed by a wet method which employs organic silicone compounds and compositions including silica-based fine particles having internal cavities.

The antireflection layer may be a single layered or multi-layered, but when employed as a single layer, it is preferable for its refractive index to be lower than the refractive index of the hard coated layer by 0.1 or more. The multi-layered anti-refractive layer is preferable in order to effectively realize the antireflection function, and in this case, a low refractive index layer and a high refractive index layer are typically stacked alternatively. In this case, it is also preferable that the refractive index difference between the low refractive index layer and the high refractive index layer be 0.1 or more. As the high refractive index layer, there are, for example, ZnO, $TiO_2$, $CeO_2$, $Sb_2O_5$, $SnO_2$, $ZrO_2$, $Ta_2O_5$ and the like, and as for the low refractive index layer, there is $SiO_2$ and the like. The thickness of the layer is typically 50 to 150 nm.

Furthermore, in the plastic polarized lens of the present invention, rear side polishing, antistatic treatment, dye treatment, light modulation treatment and the like may be performed as necessary.

This plastic polarized lens is useful as polarized lenses of eyeglasses, and in particular, as the lens for correcting visual acuity due to the fact that thin-shaping is possible.

Embodiment No. A2

In the embodiment No. A2, points identical with the embodiment No. A1 will be appropriately omitted.

As shown in FIG. 1, in the plastic polarized lens 10 of the present embodiment, resin layers (plastic lenses) 14a and 14b comprised of thiourethane-based resins are formed on both surfaces of the polarized film 12 comprised of thermoplastic polyester.

The polarized film 12 has layer(s) comprised of a urethane-based resin constituted by a polyhydroxy compound-derived structural unit and a polyisocyanate-derived structural unit, on at least one surface. In addition, in the present embodiment, the resin layers 14a, 14b are stacked on both surfaces of a polarized film 12. However, the resin layer 14b may be formed on only one surface of a polarized film 12.

The polarized film 12 is a film comprised of thermoplastic polyester formed under a condition of temperature T2 represented by the following formula. Furthermore, when forming the thermoplastic polyester film, a layer containing urethane-based resins may be stacked on the polarized film 12, or may be stacked on the polarized film 12 the layer containing urethane-based resins after the forming.

(Glass Transition Temperature of Thermoplastic Polyester)+100° C.<$T2$≦Melting Point of Thermoplastic Polyester Since polarized film 12 is formed (curved) in a desired curvature shape under this temperature condition and has layer(s) comprised of a urethane-based resin on at least one surface, it has excellent adhesion property to the plastic lenses 14a and 14b. Therefore, the plastic polarized lens of the present embodiment has excellent productivity and is appropriate for mass production.

Furthermore, since the plastic polarized lens of the present embodiment has the resin layers 14a and 14b, which are comprised of thiourethane-based resins, stacked on both surfaces of the polarized film 12 which is comprised of the thermoplastic polyester, it has excellent water resistance, the discomfort when equipping it can be suppressed, thin-shaping can be enabled, and the peel-off of polarized film during an outer circumference polishing process of a post-process can be suppressed. In other words, the balance of these characteristics is superb.

The method of producing the plastic polarized lens will be described below.

The method of producing the plastic polarized lens includes the following steps.

(a) producing a polarized film having layer(s) comprised of a urethane-based resin constituted by a polyhydroxy compound-derived structural unit and a polyisocyanate-derived structural unit on at least one surface of the polarized film by forming a thermoplastic polyester film under the temperature condition of higher than "the glass transition temperature thereof+100° C." to melting point thereof (b) fixing the polarized film in a lens casting mold, in a state that at least one surface of the polarized film is apart from molds (c) injecting a polymerizable composition (mixture) in the spaces between the molds and respective surfaces of the polarized film (d) stacking layer(s) comprised of a thiourethane-based resin on at least one surfaces of the polarized film by polymerizing and curing the polymerizable composition Each step will be described in the order.

(a) Step of producing a polarized film having layer(s) comprised of a urethane-based resin constituted by a polyhydroxy compound-derived structural unit and a polyisocyanate-derived structural unit on at least one surface of the polarized film by forming a thermoplastic polyester film under the temperature condition of higher than "the glass transition temperature thereof+100° C." to melting point thereof.

In the present embodiment, the forming of the thermoplastic polyester film is performed under a temperature condition of higher than "the glass transition temperature thereof+100° C." to melting point of the thermoplastic polyester, and preferably, under a temperature condition of up to the temperature of the initial decline of the peak which represents the melting point in the DSC measurement chart. As the forming method of the thermoplastic polyester film, if the film can be heated to the temperature mentioned above and formed into a desired curvature shape, then a typical method may be used.

When the thermoplastic polyester is, for example, polyethylene terephthalate, since the glass transition temperature is 74° C. and the melting point is 259° C., the forming can be performed under a temperature condition of higher then 174° C. to 259° C., and preferably less than 200° C.

In the present embodiment, there is provided a step that layer(s) comprised of a urethane-based resin constituted by a polyhydroxy compound-derived structural unit and a polyisocyanate-derived structural unit is formed, on at least one surface of the thermoplastic polyester film or the polarized film.

The step of forming a layer containing urethane-based resin (urethane-based resin coating treatment) on both surfaces of the polarized film will be described below as an example. In addition, a layer comprised of a urethane-based resin may be formed on only surface exposed in the space 24b, and a layer comprised of a thiourethane-based resin may be formed on the layer comprised of a urethane-based resin.

Before performing the coating treatment of the urethane-based resin on the polarized film surface, one kind or two or more kinds of pretreatments selected from those such as gas or chemical solution treatment, corona discharge treatment, plasma treatment, ultraviolet ray irradiation treatment, electron beam irradiation treatment, surface roughening treatment, flame treatment and the like may be performed in advance.

Although, in the present embodiment, the coating of the polarized film comprised of the thermoplastic polyester with the coating agent containing urethane-based resin can be coated without any solvent, typically it is preferable to select an appropriate solvent and coat by using the coating solution in which the coating agent has been dissolved or dispersed.

Although, in the present embodiment, there is no particular limit on the method of coating the coating solution on both surfaces of the polarized film comprised of thermoplastic polyester, there are different methods, such as a method of treating the polarized film with coating agent containing urethane-based resin and then curve processing it, a method of curve processing and then treating with coating agent containing urethane-based resin, and a method of co-opting both processes, and any kind of method may be adopted depending on each situation, such as adopting a roll coating method, a spin coating method, a spray coating method, a bar coating method, a dipping method and the like which are conventionally known methods. After drying, the coating can be performed once or more times, and the coating solution used for each time may be the same or of different kinds. Typically, the object of the present embodiment can be achieved with a single coating and drying, without overlapping coatings.

After coating the polarized film with the urethane-based resin used for the above-mentioned primer coating treatment as necessary, drying and/or heat treatment is performed as necessary. As long as the applied temperature of the drying and/or heat treatment does not actually deteriorate the function of the polarized film, there is no particular limit. After coating the resin on the polarized film, an active energy line may be irradiated on it. As the active energy line, there is an ultraviolet ray or an electron beam.

Furthermore, the steps (b) to (d) can be performed identically to the steps in the embodiment No. A1.

After the completion of the curing and forming in the step (d), the plastic polarized lens of the present embodiment, as shown in FIG. 1, can be obtained by taking it out of the lens casting mold. In this plastic polarized lens 10, the resin layer 14a, the polarized film 12 and the resin layer 14b are stacked, respectively. Furthermore, on at least one surface of the polarized film 12, there is layer(s) (illustration omitted) comprised of a urethane-based resin, and the polarized film 12 and the resin layer 14a (or resin layer 14b) are adhered thereto, with the layer in between them. Due to this structure, the peel-off of the polarized film 12 from the lens material during the outer circumference polishing can be suppressed, and the polarized lens can be mass-produced industrially.

Furthermore, identical treatments as those in the embodiment No. A1 may be performed on the plastic polarized lens of the present embodiment as necessary.

Since such a plastic polarized lens may be formed in a small thickness, it is useful as a polarized lens for eyeglasses, particularly as the lens for correcting visual acuity.

Next, "Embodiment No. B1 and No. B2" in Embodiment No. B are described.

Embodiment No. B1

As shown in FIG. 1, the plastic polarized lens 10 of the present invention has thiourethane-based resin layers (plastic lens) 14a, 14b on both surfaces of a polarized film 12 containing a thermoplastic polyester. In addition, in the present embodiment, the resin layers 14a, 14b are stacked on both surfaces of a polarized film 12. However, the resin layer 14b may be formed on only one surface of a polarized film 12.

For the thermoplastic polyester, polyethylene terephthalate, polyethylene naphthalate, polybutylene terephthalate and the like may be specifically used, of which polyethylene terephthalate is preferable from view points of water resistance, heat resistance and mold processability. A polyester modified by addition of a copolymerization component and the like is also included.

The polarized film 12 comprised of thermoplastic polyester is formed under the condition of temperature T1 represented by the following formula:

(Glass Transition Temperature of Thermoplastic Polyester)+5° C.$\leq T1 \leq$(Glass Transition Temperature of Thermoplastic Polyester)+100° C.

The polarized film 12 is formed (curved) in a desired curvature shape under this temperature condition, and thus it has excellent adhesion property to the plastic lenses 14a and 14b. Therefore, the plastic polarized lens of the present embodiment has excellent productivity and is appropriate for mass production.

A plastic polarized lens of the present embodiment in which thiourethane-based resin layers 14a and 14b are stacked on both surfaces of a polarized film 12 comprised of thermoplastic polyester, has excellent water resistance, suppressed uncomfortable feeling on wearing, capability of thinning of lens, and furthermore suppressed peeling-off of the polarized film during a downstream process of grinding the periphery. Namely, it is excellent in the balance of these characteristics.

In addition, the polarized film 12 may have a layer(s) comprised of a urethane-based resin constituted by a polyhydroxy compound-derived structural unit and a polyisocyanate-derived structural unit, on at least one surface.

The method of producing the plastic polarized lens will be described below.

The method of producing the plastic polarized lens includes the following steps:

(a) producing a polarized film by forming a thermoplastic polyester film under the temperature condition of glass transition temperature thereof+5° C. to glass transition temperature thereof+100° C.;

(b) fixing the polarized film in a lens casting mold, in a state that at least one surface of the polarized film is apart from molds;

(c) injecting a polymerizable composition in the spaces between the molds and respective surfaces of the polarized film; and (d) stacking layer(s) comprised of a thiourethane-based resin on at least one surface of the polarized film by polymerizing and curing the polymerizable composition.

Each step will be described in the order.

(a) Step of producing a polarized film by forming a thermoplastic polyester film under the temperature condition of glass transition temperature thereof+5° C. to glass transition temperature thereof+100° C.

The polarized film comprised of a thermoplastic polyester of the present embodiment is disclosed, for example, in Japanese Laid-open patent publication No. 2002-267841. Specifically, it is a polarized film having a matrix of a thermoplastic polyester, wherein the polarized film may be obtained by blending a dichroic dye in the thermoplastic polyester, molding it to a film, followed by uniaxial extension of the film obtained by molding, and subsequent heat treatment at a prescribed temperature. The thickness is normally in the range of 10 to 500 µm.

As the dichroic dye used in the present invention, publicly-known dyes may be used. Examples include those disclosed in Japanese Laid-open patent publication No. S61-087757, Japanese Laid-open patent publication No. S61-285259, Japanese Laid-open patent publication No. S62-270664, Japanese Laid-open patent publication No. S62-275163 and Japanese Laid-open patent publication No. H1-103667. Specifically, the dyes include an anthraquinone-based dye, a quinophthalone-based dye and an azo-based dye and the like. Those having heat resistance at molding of the thermoplastic polyester are preferable.

The forming of the thermoplastic polyester film can be performed under a temperature condition of glass transition temperature thereof+5° C. to glass transition temperature thereof+100° C., more preferably under a temperature condition of glass transition temperature thereof+5° C. to glass transition temperature thereof+80° C., and most preferably under a temperature condition of glass transition temperature thereof+5° C. to glass transition temperature thereof+70° C.

As for the forming method of the thermoplastic polyester film, a typical method can be used as long as the film is heated in the above-mentioned temperature and can be given in a desired curvature shape.

In the above-mentioned forming temperature, the adhesiveness between the polarized film comprised of the thermoplastic polyester and the layer comprised of the thiourethane-based resin is excellent, regardless of the existence of the coated layer containing a urethane-based resin. Furthermore, in the forming temperature of "glass transition temperature of the thermoplastic polyester+70° C. to glass transition temperature thereof+100° C.", and especially, of "glass transition temperature of the thermoplastic polyester+80° C. to glass transition temperature thereof+100° C.", the adhesiveness between the polarized film and the layer comprised of thiourethane-based resin is excellent, regardless of the existence of the coated layer containing a urethane-based resin, but when the polarized film has a coated layer containing a urethane-based resin, the adhesiveness between the polarized film comprised of a thermoplastic polyester and the layer comprised of a thiourethane-based resin tends to be excellent.

When the thermoplastic polyester is, for example, polyethylene terephthalate, since the glass transition temperature thereof is 74° C., forming can be performed under a temperature condition of 79° C. to 174° C., preferably 79° C. to 154° C., and more preferably 79° C. to 144° C.

The glass transition temperature of the thermoplastic polyester can be generally measured by DSC (differential scanning calorimeter) and the like.

As the forming method, there are vacuum forming, pressure forming, vacuum-pressure forming, press forming and the like. In these forming methods, by adjusting the temperature of the thermoplastic polyester film to enter the above-mentioned temperature range, and by forming it into a desired curvature shape, the adhesiveness between the polarized film comprised of the thermoplastic polyester film and the plastic lens can be improved.

In the forming of the thermoplastic polyester film, conditions such as the forming pressure and the forming time and the like are appropriately adjusted in correspondence to the forming method, forming temperature, production apparatus and the like. In addition, the thermoplastic polyester film may be heated to the above-mentioned temperature before forming with a die and the like.

In the present embodiment, there may be a step which forms layer(s) comprised of a urethane-based resin constituted by a polyhydroxy compound-derived structural unit and a polyisocyanate-derived structural unit, on at least one surface of the thermoplastic polyester film or the polarized film.

The step of forming a layer containing urethane-based resin (urethane-based coating treatment) on both surfaces of the polarized film will be described below as an example.

Before coating treatment with the urethane-based resin on the polarized film surface, one kind or two or more kinds of pretreatments selected from those such as treatment with chemicals (gas or chemical solution), treatment with corona discharge, treatment with plasma, treatment with ultra violet irradiation, treatment with electron beam irradiation, treatment with surface roughening, and treatment with burning may be performed on the polarized film in advance.

In the present embodiment, when the coating agent containing the urethane-based resin is coated on the polarized film comprised of the thermoplastic polyester, the coating can be performed without any solvent. However, typically it is preferable to select an appropriate solvent and coat by using the coating solution in which the coating agent has been dissolved or dispersed.

As the solvent, alcohol compounds such as methanol, ethanol, isopropanol and the like, aromatic compounds such as toluene, xylene and the like, ester compounds such as ethylacetate and the like, ketone compounds such as acetone, methylethylketone, methylisobutylketone and the like, and halogen compounds such as dichloromethane and the like may be selected, and may be used singularly or in combinations of two or more kinds.

The concentration of the urethane-based resin conversion of the coating solution should be 0.1 to 50 wt %, preferably 1 to 50 wt %, and most preferably 3 to 30 wt %. When it exceeds 50 wt %, the temporal stability of the coating solution becomes deficient, the existence of the coated layer becomes visible because the coated layer thickens due to too much urethane resin being coated, or a decrease in adhesiveness may occur due to peel-offs within the coated layer. On the other hand, when it is less than 0.1 wt %, the effect of adhesiveness improvement between the film and the urethane resin base material cannot be fully obtained.

The thickness of the coated layer should be 30 to 0.001 μm, preferably 10 to 0.01 μm, and more preferably 5 to 0.05 μm.

In the present embodiment, the coating solution is coated as necessary on both surfaces of the polarized film comprised of the thermoplastic polyester, and the coating solution portion which is fluid on the polarized film is removed from the film as necessary and dried. There is no particular limit on the drying temperature, but typically it should be 5 to 100° C., preferably 20 to 100° C., more preferably 20 to 80° C., and most preferably 20 to 60° C., or these temperatures may be combined and heated in steps.

The drying time is set depending on the solvent used, the drying temperature, the blowing conditions and the like, and there is no particular limit, although it is typically 1 minute to 48 hours, and more preferably in the range of 10 minutes to 24 hours.

Although, in the present embodiment, there is no particular limit on the method of coating of the coating solution on both surfaces of the polarized film comprised of thermoplastic polyester, it is largely classified into a method of treating the polarized film with a coating agent containing urethane-based resin and then forming a curvature, a method of treating with a coating agent containing urethane-based resin after forming a curvature, or a method of employing both of above methods in combination. Any of the above methods may be employed, and depending on each condition, conventionally known methods such as a roll-coating method, a spin-coating method, a spray-coating method, a bar-coating method, a dipping method and the like may be used. After drying, the coating can be performed once or more, and the coating solution used for each time may be the same or of different kinds. Typically, the object of the present embodiment can be achieved by one-time coating and drying without repeated coating.

After coating the polarized film with the urethane-based resin used for the above-mentioned primer coating treatment as necessary, drying and/or heat treatment is performed as necessary. As long as the applied temperature of the drying and/or heat treatment does not actually deteriorate the function of the polarized film, there is no particular limit. After coating the resin on the polarized film, an active energy line may be irradiated on it. As the active energy line, there is an ultraviolet ray or an electron beam.

The urethane-based resin for use in the primer coating treatment is a polymer comprised of a polyhydroxy compound-derived structural unit and a polyisocyanate-derived structural unit. As the polyhydroxy compound, polyesterdiol, polyetherdiol, polythioetherdiol, polylactonediol, polyacetaldiol and the like can be mentioned. Among them, polyesterdiol and polyetherdiol are preferable, and polyesterdiol is particularly preferable.

As the polyester diol, there are polyesters which have a hydroxyl group at the terminal, which can be obtained by reacting diols or polyhydric alcohols, such as saturated polyhydric alcohols as exemplified by ethylene glycol, propylene glycol, butylene glycol, diethylene glycol, neopentyl glycol, hexamethylene glycol, trimethylol propane, 3-methyl1,5-pentanediol and the like or unsaturated polyhydric alcohols as exemplified by butanediol and the like, or their mixture, with organic dicarboxylic acid like saturated aliphatic acids such as adipic acid and sebacic acid, unsaturated aliphatic acids such as maleic acid and fumaric acid, aromatic carboxylic acids such as isophthalic acid, phthalic acid and terephthalic acid, or their anhydrides, or their mixture; polyesters obtained by ring-opening polymerization of lactones such as caprolactam or methylcaprolactone with diols; or the like.

Specific examples of the polyetherdiol include a polymer or a copolymer having a hydroxyl group at the terminal, which is obtained by ring-opening polymerization or ring-opening copolymerization of ethylene oxide, propylene oxide, epichlorohydrin, oxacyclobutane, substituted oxacyclobutane, tetrahydrofuran or the like; their mixtures or the like.

Examples of polyisocyanate as a monomer of the above-mentioned urethane-based resin include 1,4-tetramethylenediisocyanate, 1,6-hexamethylenediisocyanate, 1,8-octamethylenediisocyanate, 1,10-decamethylenediisocyanate, 1,4-cyclohexylenediisocyanate, tolylenediisocyanate, 4,4'-methylenebis(cyclohexyl isocyanate), 4,4'-diphenylmethanediisocyanate, isophoronediisocyanate, triphenylmethanetriisocyanate and the like, and one kind or two or more kinds may be selected and employed.

Among them, 1,6-hexamethylenediisocyanate, 1,4-cyclohexylenediisocyanate, tolylenediisocyanate, 4,4'-methylenebis(cyclohexyl isocyanate), 4,4'-diphenylmethanediisocyanate, and isophoronediisocyanate are particularly preferable.

The polyhydroxy compound and polyisocyanate which constitute the urethane-based resin can be suitably selected from those examples and combined together. Among them, the polyhydroxy compound is preferably polyesterdiol, more preferably polyesterdiol composed of adipic acid and butyleneglycol and 3-methyl1,5-pentanediol. Meanwhile, the isocyanate component is preferably isophoronediisocyanate. In view of adhesiveness between the film and the material resin, this combination is particularly preferable.

As specific examples of the chemical treatment mentioned above, there are gas treatments using ozone, halogen gas, chlorine dioxide and the like, or chemical solution treatments using oxidizing agents or reducing agents such as sodium hypochlorite, alkaline metal hydroxides, alkaline earth metal hydroxides, sodium metals, sulfuric acid, nitric acid and the like, or acid radicals and bases. In the chemical solution treatment, the oxidizing agents and reducing agents, or the acid radicals and bases are typically dissolved in water, alcohol, liquid ammonia and the like and employed in a liquid state.

When the treatment chemical is alkaline metal hydroxide and/or alkaline earth metal hydroxides, as the alkaline metal hydroxide, there are lithium hydroxide, sodium hydroxide, potassium hydroxide and the like; as alkaline earth metal hydroxides, there are magnesium hydroxide, calcium hydroxide, barium hydroxide and the like, and one kind or two or more kinds may be selected and employed. Among them, sodium hydroxide and potassium hydroxide are preferable, and sodium hydroxide is particularly preferable.

It is preferable that the alkaline metal hydroxides and/or alkaline earth metal hydroxides are employed as solutions; as solvents for the solutions, there are water and/or organic solvents, and examples of organic solvents include methanol, ethanol, isopropanol and the like.

The concentration of the solution mentioned above should be in a range of 5 to 55 weight %, and preferably 10 to 45 weight %; and the temperature of the solution should be in a range of 0 to 95° C., preferably 20 to 90° C., and more preferably 30 to 80° C.

The pretreatment by alkaline metal hydroxides and/or alkaline earth metal hydroxides with respect to the present embodiment can be performed by bringing into contact the solution, which is within the above-mentioned solution concentration and temperature range, with one side or both sides of the polarized film for a predetermined period of time. As the method of contact, there are no particular limits, and for example, a method of immersing of the polarized film into the solution, or contacting with the polarized film by showering or surface-flowing can be suggested. Among them, the method of immersing the polarized film into the solution is preferable. During this time, in order to uniformize the concentration and the temperature of the solution, methods such as stirring, convection current flowing, and jet flowing can be adopted. Although there is no particular limit on the time period of contact, it should be within a time period range of 1 minute to 24 hours, preferably 5 minutes to 10 hours, and more preferably 5 minutes to 5 hours.

In order to bring into contact the alkaline metal hydroxides and/or alkaline earth metal hydroxides with the polarized film, a physical stimulation such as an ultrasound sonification or vibration may be co-opted.

In order to improve the wetting of the polarized film with the solution, the alkaline metal hydroxides and/or alkaline earth metal hydroxides may contain anionic, nonionic surfactants and the like.

During the contact between the alkaline metal hydroxides and/or alkaline earth metal hydroxides with the polarized film, the solution concentration, the solution temperature and the contact time period can be selected suitably within a range that the optical characteristics of the polarized film does not actually deteriorate.

After a solution of alkaline metal hydroxides and/or alkaline earth metal hydroxides is brought in contact with the polarized film, the polarized film is pulled out of the solution, and when necessary, the cleaning and drying of the polarized film may be performed with water and/or organic solvents such as methanol, ethanol, isopropanol, acetone, methylethyl ketone and the like.

The corona discharge treatment mentioned above is a kind of gas discharge, in which the gas molecules ionize to exhibit conductivity and uses the phenomenon in which the film surface is activated by the ions, which is a surface treatment technique employed widely. As the gas of discharge treatment, there is air, but the gas may be nitrogen gas, carbon dioxide gas, ammonia gas and the like. The corona discharge treatment can be achieved, for example, by a method of treating the polarized film surface using the corona generated by supplying voltage to electrodes of a known high frequency generation apparatus. The corona discharge treatment strength should be preferably 1 to 500 W·min/m$^2$, and more preferably 5 to 400 W·min/m$^2$.

Examples of the plasma treatment mentioned above are a normal pressure plasma treatment and a vacuum plasma treatment (low temperature plasma treatment).

In the normal pressure plasma treatment, discharge treatment is performed within a single or mixed gas atmosphere of gas such as air, water vapor, argon, nitrogen, helium, carbon dioxide, carbon monoxide and the like.

The vacuum plasma treatment can be performed within a reduced pressure, for example, by placing the polarized film inside a discharge treatment apparatus of an internal electrode type which has counter electrodes composed of a drum-shaped electrode and plural rod-shaped electrodes, and under a treatment gas atmosphere of 0.001 to 50 Torr, preferably 0.01 to 10 Torr, and more preferably 0.02 to 1 Torr, a high voltage of direct current or alternating current is supplied between the electrodes and discharged, generating plasma of the treatment gas, exposing the polarized film surface thereto. Although the treatment conditions of the vacuum plasma treatment depends on the treatment apparatus, the type of treatment gas, the pressure, the frequency of the power source and the like, the preferable conditions may be set suitably. As the treatment gas, for example, argon, nitrogen, helium, carbon dioxide, carbon monoxide, air, water vapor and the like may be used singularly or in mixture.

(b) Step of Fixing the Polarized Film in a Lens Casting Mold, in a State that at Least One Surface of the Polarized Film is Apart from Molds As shown in FIG. 2, the plastic polarized lens of the present embodiment can be obtained by injecting a polymerizable composition containing a certain isocyanate compound and a certain active hydrogen compound into a lens casting mold 20 where the polarized film 12, which is comprised of thermoplastic polyester and is performing a urethane-based coating treatment thereon, is fixed thereto, and performing polymerization and curing. In addition, in the present embodiment, the Example which the polymerizable composition is injected in the spaces 24*a*, 24*b* is described as above. However, the lens casting mold 20 which the spaces 24*a* is not existed can be employed. In the above case, a layer comprised of a urethane-based resin is formed on the polarized film 12 exposed in the spaces 24*b*.

The lens casting mold 20 is generally comprised of two molds 22*a* and 22*b* maintained by a gasket 22*c*.

As the material of the gasket 22*c*, polyvinyl chloride, vinyl ethylene-acetate copolymer, ethylene-ethylacrylate copolymer, ethylene-propylene copolymer, ethylene-propylene-diene copolymer, polyurethane elastomer, fluorine rubber, or soft elastic resins in which fluorine rubber and polypropylene are blended can be employed. A material which does not swell or elute with respect to a polymerizable composition employed in the present embodiment is preferred.

As the material of the mold 22*a* and 22*b*, there are glass, metal and the like, and typically glass is employed. A mold releasing agent may be coated on molds 22*a* and 22*b* in advance in order to improve the mold-releasing property of the obtained lens. In addition, a coating solution which bestows a hard coating ability to the lens material may be coated on the molds in advance.

Inside the space of the lens casting mold 20, the polarized film 12 comprised of thermoplastic polyester is installed so that the film surface is parallel to the inner surface of the front side mold 22*a* which it faces. Between the polarized film 12 and the molds 22*a* and 22*b*, spaces 24*a* and 24*b* are formed, respectively. The separated distance of the spaces 24*a* and 24*b* where the space is the narrowest is about 0.2 to 2.0 mm.

Since of the polymerizable composition employed in the present embodiment can be adjusted viscosity to low during injection, the polymerizable composition can be injected easily even into the above-mentioned spaces of intervals.

(c) Step of Injecting a Polymerizable Composition in the Spaces Between the Molds and Respective Surfaces of the Polarized Film.

Subsequently, inside the space of the lens casting mold 20, at the two spaces 24a and 24b between the molds 22a and 22b and the polarized film 12, the polymerizable composition is injected by a predetermined injection means.

The polymerizable composition employed in the present embodiment includes aromatic isocyanate and one or more kind(s) of polythiol selected from 4-mercaptomethyl-1,8-dimercapto-3,6-dithiaoctane, 4,8 or 4, 7 or 5,7-dimercaptomethyl-1,11-dimercapto-3,6,9-trithiaundecane, pentaerythritol tetrakismercapto acetate, pentaerythritol tetrakismercapto propionate, 2,5-bis(mercaptomethyl)-1,4-dithian and bis(mercaptoethyl)sulfide.

The aromatic isocyanate employed in the present embodiment is one or more kind(s) of compound selected from tolylene diisocyanate and diphenylmethane diisocyanate, while preferred is tolylenediisocyanate.

Further, in addition to an aromatic isocyanate and hexamethylenediisocyanate, other isocyanate compounds may be used including:

aliphatic polyisocyanate compounds such as 2,2,4-trimethylhexanediisocyanate, 2,4,4-trimethylhexamethylenediisocyanate, lysine diisocyanatomethylester, lysine triisocyanate, m-xylenediisocyanate, α,α,α',α'-tetramethylxylylenediisocyanate, bis(isocyanatomethyl)naphthalene, mesitylylenetriisocyanate, bis(isocyanatomethyl)sulfide, bis(isocyanatoethyl)sulfide, bis(isocyanatomethyl)disulfide, bis(isocyanatoethyl)disulfide, bis(isocyanatomethylthio)methane, bis(isocyanatoethylthio)methane, bis(isocyanatoethylthio)ethane, bis(isocyanatomethylthio)ethane and the like;

alicyclic polyisocyanate compounds such as isophoronediisocyanate, bis(isocyanatomethyl)cyclohexane, dicyclohexylmethanediisocyanate, cyclohexanediisocyanate, methylcyclohexanediisocyanate, dicyclohexyldimethylmethaneisocyanate, 2,5-bis(isocyanatomethyl)bicyclo-[2.2.1]-heptane, 2,6-bis(isocyanatomethyl)bicyclo-[2.2.1]-heptane, 3,8-bis(isocyanatomethyl)tricyclodecane, 3,9-bis(isocyanatomethyl)tricyclodecane, 4,8-bis(isocyanatomethyl)tricyclodecane, 4,9-bis(isocyanatomethyl)tricyclodecane and the like;

aromatic polyisocyanate compounds such as diphenylsulfide-4,4-diisocyanate and the like; and heterocyclic polyisocyanate compounds such as 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiorane, 4,5-bis(isocyanatomethyl)-1,3-dithiorane and the like, but they are not limited to the example compounds.

Further, compounds that a part of the isocyanate group in the above-mentioned exemplified isocyanate compounds is replaced with an isothiocyanate group can also be exemplified, but not limited to these.

Examples of the isothiocyanate compounds include:

aliphatic polyisothiocyanate compounds such as hexamethylenediisothiocyanate, lysine diisothiocyanatomethylester, lysine triisothiocyanate, m-xylilenediisothiocyanate, bis(isothiacyanatomethyl)sulfide, bis(isothiacyanatoethyl)sulfide, bis(isothiacyanatoethyl)disulfide and the like;

alicyclic polyisothiocyanate compounds such as isophorone diisothiocyanate, bis(isothiacyanatomethyl)cyclohexane, dicyclohexylmethanediisothiocyanate, cyclohexanediisothiocyanate, methylcyclohexanediisothiocyanate, 2,5-bis(isothiacyanatomethyl)bicyclo-[2.2.1]-heptane, 2,6-bis(isothiacyanatomethyl)bicyclo-[2.2.1]-heptane, 3,8-bis(isothiacyanatomethyl)tricyclodecane, 3,9-bis(isothiacyanatomethyl)tricyclodecane, 4,8-bis(isothiacyanatomethyl)tricyclodecane, 4,9-bis(isothiacyanatomethyl)tricyclodecane and the like;

aromatic polyisothiocyanate compounds such as tolylenediisocyanate, 4,4'-diphenylmethane diisothiocyanate, diphenyldisulfide-4,4-diisothiocyanate and the like; and sulfur-containing heterocyclic polyisothiocyanate compounds such as 2,5-diisothiacyanatothiophene, 2,5-bis(isothiacyanatomethyl)thiophene, 2,5-diisothiacyanatotetrahydrothiophene, 2,5-bis(isothiacyanatomethyl)tetrahydrothiophene, 3,4-bis(isothiacyanatomethyl)tetrahydrothiophene, 2,5-diisothiacyanato-1,4-dithiane, 2,5-bis(isothiacyanatomethyl)-1,4-dithiane, 4,5-diisothiacyanato-1,3-dithiorane, 4,5-bis(isothiacyanatomethyl)-1,3-dithiorane and the like, but they are not limited to the example compounds.

Furthermore, the above isocyanate compounds substituted with halogen such as chlorine, bromine and the like, with an alkyl group, an alkoxy group, a nitro group, or modified with polyhydric alcohol prepolymer, carbodiimide, urea, biuret, or a dimerization reaction product of the isocyanate compounds may be used. Such isocyanate compounds may be used alone or in a combination of two or more.

In addition to the polythiol, other thiol compounds as described below may also be used, and examples include:

2-mercaptoethanol, 3-mercapto-1,2-propandiol, glycerine bis(mercaptoacetate), 4-mercaptophenol, 2,3-dimercapto-1-propanol, pentaerythritol tris(3-mercaptopropionate), pentaerythritol tris(thioglycolate) and the like, but not limited to these exemplified compounds.

Further, other polythiol compounds as described below may also be used, and examples include:

aliphatic polythiol compounds such as methanedithiol, 1,2-ethanedithiol, 1,2,3-propanetrithiol, 1,2-cyclohexanedithiol, bis(2-mercaptoethyl)ether, tetrakis(mercaptomethyl)methane, diethyleneglycol bis(2-mercaptoacetate), diethyleneglycol bis(3-mercaptopropionate), ethyleneglycol bis(2-mercaptoacetate), ethyleneglycol bis(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), bis(mercaptomethyl)sulfide, bis(mercaptomethyl)disulfide, bis(mercaptoethyl)disulfide, bis(mercaptopropyl)sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropylthio)ethane, 1,2,3-tris(mercaptomethylthio)propane, 1,2,3-tris(2-mercaptoethylthio)propane, 1,2,3-tris(3-mercaptopropylthio)propane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercapto-1,4-dithiane, 2,5-dimercaptomethyl-2,5-dimethyl-1,4-dithiane and esters of their thioglycolic acid and mercaptopropionic acid, hydroxymethylsulfide bis(2-mercaptoacetate), hydroxymethylsulfide bis(3-mercaptopropionate), hydroxyethylsulfide bis(2-mercaptoacetate), hydroxyethylsulfide bis(3-mercaptopropionate), hydroxymethyldisulfide bis(2-mercaptoacetate), hydroxymethyldisulfide bis(3-mercaptopropionate), hydroxyethyldisulfide bis(2-mercaptoacetate), hydroxyethyldisulfide bis(3-mercaptopropionate), 2-mercaptoethylether bis(2-mercaptoacetate), 2-mercaptoethylether bis(3-mercaptopropionate), thiodiglycolate bis(2-mercaptoethylester), thiodipropionate bis(2-mercaptoethylester), dithiodiglycolate bis(2-mercaptoethylester), dithiodipropionate bis(2-mercaptoethylester), 1,1,3,3-tetrakis(mercaptomethylthio)propane, 1,1,2,2-tetrakis(mercaptomethylthio)ethane, 4,6-bis(mercaptomethylthio)-1,3-dithian, tris(mercaptomethylthio)methane, tris(mercaptoethylthio)methane and the like;

aromatic polythiol compounds such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,3,5-trimercaptobenzene, 1,3,5-tris(mercaptomethyl)benzene, 1,3,5-tris(mercaptomethyleneoxy)benzene, 1,3,5-tris(mercaptoethyleneoxy)benzene, 2,5-toluenedithiol, 3,4-toluenedithiol, 1,5-naphthalenedithiol, 2,6-naphthalenedithiol and the like; and heterocyclic polythiol compounds such as 2-methylamino-4,6-dithiol-sym-triazine, 3,4-thiophenedithiol, bismuthiol, 4,6-bis(mercaptomethylthio)-1,3-dithiane, 2-(2,2-bis(mercaptomethylthio)ethyl)-1,3-dithiethane and the like, but not limited to the exemplified compounds.

Furthermore, an oligomer of these polythiols, other thiol compounds, and other polythiol compounds or those substituted with halogen such as chlorine, bromine and the like may be used as other thiol compounds or other polythiol compounds. These active hydrogen compounds may be used alone or in a combination of two or more.

Furthermore, the aromatic isocyanate employed in the present embodiment, as well as hexamethylenediisocyanate and other isocyanate compounds (hereinafter, referred to as "isocyanate compounds") used further depending on necessity may be partially reacted in advance preliminarily with the polythiol, other thiol compounds or other polythiol compounds (hereinafter referred to as "thiols"). In addition, the thiols to be used in the invention may be partially reacted in advance preliminarily with the isocyanate compounds.

In order to modify the resin, a resin modifier such as a hydroxy compound, an epoxy compound, an episulfide compound, an organic acid and its anhydride, an olefin compound including (meth)acrylate compound or the like may be added. Herein, the resin modifier is a compound which adjusts or improves physical properties such as refractive index, Abbe's number, heat resistance, specific gravity, and mechanical strength such as impact strength of thiourethane-based resin.

Examples of the hydroxy compound used as the resin modifier include: diethylene glycol, triethylene glycol, dipropylene glycol, tripropylene glycol, 1,4-butanediol, thiodiethanol, dithiodiethanol, glycerin, trimethylol propane, pentaerythritol, and an oligomer of these compounds, although it is not limited to these compounds.

Examples of the epoxy compound which can be added as the resin modifier include:

phenol-based epoxy compounds which can be obtained by condensation reactions between polyhydric phenol compounds such as bisphenol A glycidylether and the like and epihalohydrin compounds;

alcohol-based epoxy compounds which can be obtained by condensation between polyhydric alcohol compounds such as hydrogenated bisphenol A glycidylether and the like and epihalohydrin compounds;

glycidylester-based epoxy compounds which can be obtained by condensation between multivalent organic acid compounds such as 3,4-epoxycyclohexylmethyl-3',4'-epoxy-cyclohenxanecarboxylate and the like and epihalohydrin compounds;

amine-based epoxy compounds which can be obtained by condensation between primary and secondary diamine compounds and epihalohydrin compounds; and aliphatic multivalent epoxy compounds such as vinylcyclohexenediepoxide and the like, but they are not limited to the example compounds.

Examples of the episulfide compound which can be added as the resin modifier include:

2,3-epithiopropylthio compounds of the chain aliphatic compounds such as bis(2,3-epithiopropylthio)sulfide, bis(2,3-epithiopropylthio)disulfide, bis(2,3-epithiopropylthio)methane, 1,2-bis(2,3-epithiopropylthio)ethane, 1,5-bis(2,3-epithiopropylthio)-3-thiapentane and the like;

2,3-epithiopropylthio compounds having alicyclic compounds and heterocyclic rings such as 1,3-bis(2,3-epithiopropylthio)cyclohexane, 2,5-bis(2,3-epithiopropylthiomethyl)-1,4-dithiane and the like; and aromatic 2,3-epithiopropylthio compounds such as 1,3-bis(2,3-epithiopropylthio)benzene, 1,4-bis(2,3-epithiopropylthio)benzene and the like, but they are not limited to the example compounds.

Examples of the organic acid and anhydride thereof which can be added as the resin modifier include:

thiodiglycolic acid, thiodipropionic acid, dithiodipropionic acid, anhydrous phthalic acid, hexahydro anhydrous phthalic acid, methylhexahydro anhydrous phthalic acid, methyltetrahydro anhydrous phthalic acid, anhydrous maleic acid, anhydrous trimellitic acid, anhydrous pyromellitic acid and the like, but they are not limited to the example compounds.

Examples of the olefin compound which can be added as the resin modifier include:

(meth)acrylate compounds such as benzylacrylate, benzylmethacrylate, cyclohexylacrylate, cyclohexylmethacrylate, 2-hydroxyethylacrylate, 2-hydroxymethylmethacrylate, glycidylacrylate, glycidylmethacrylate, phenoxyethylacrylate, phenoxyethylmethacrylate, phenylmethacrylate, ethyleneglycoldiacrylate, ethyleneglycoldimethacrylate, diethyleneglycoldiacrylate, diethyleneglycoldimethacrylate, triethyleneglycoldiacrylate, triethyleneglycoldimethacrylate, neopentylglycoldiacrylate, neopentylglycoldimethacrylate, ethyleneglycolbisglycidylacrylate, ethyleneglycolbisglycidylmethacrylate, bisphenol A diacrylate, bisphenol A dimethacrylate, bisphenol F diacrylate, bisphenol F dimethacrylate, trimethylolpropanetriacrylate, trimethylolpropanetrimethacrylate, glyceroldiacrylate, glyceroldimethacrylate, pentaerythritoltriacrylate, pentaerythritoltetracrylate, pentaerythritoltetramethacrylate, xylylenedithioldiacrylate, xylylenedithioldimethacrylate, mercaptoethylsulfidediacrylate, mercaptoethylsulfidedimethacrylate and the like;

allyl compounds such as allylglycidylether, diallylphthalate, diallylterephthalate, diallylisophthalate, diethyleneglycolbisallylcarbonate and the like; and vinyl compounds such as styrene, chlorostyrene, methylstyrene, bromostyrene, dibromostyrene, divinylbenzene, 3,9-divinylspirobi(m-dioxane) and the like, but they are not limited to the example compounds.

These resin modifiers may be used singularly, or by mixing two or more kinds thereof.

The ratio of the hydroxy compounds (hereinafter, referred to as "active hydrogen compounds") when the isocyanate compounds for use in the present embodiment, thiols and the resin modifier are used, is in terms of the molar ratio of functional groups (NCO+NCS)/(SH+OH), normally in the range of 0.8 to 1.5, and preferably in the range of 0.9 to 1.2.

The isocyanate compounds and the active hydrogen compounds employed in the present embodiment are selected after considering the availability, cost, handleability, performance of the obtainable resin and the like.

The important factor in the convenience of handling is the viscosity of the polymerizable composition during injection. The viscosity during injection is decided by the combination of the isocyanate compounds and the active hydrogen compounds (When employing the resin modifier, this includes the type and amount of the resin modifier. Furthermore, when employing a catalyst, this includes the type and amount of the catalyst.), but when the viscosity is too high, the production of the polarized lens becomes very difficult since it is very difficult to inject into the narrow spaces 24a and 24b located between the glass molds 22a and 22b and the polarized film 12 inside the space of the lens casting mold 20. Typically, the viscosity during injection should be preferably a measurement of 200 mPa·s or less at 20° C., and for producing a lens with very thin central thickness, an even lower viscosity of, for example, 100 mPa·s or less is preferable. The viscosity of the polymerizable composition is measured by using a B type viscometer at a solution temperature of 20° C.

Furthermore, the invention provides an optical material obtained by curing the polymerizable composition mentioned above.

Such optical material is excellent in durability from the viewpoint of little temporal changes in color by light irradiation. Here, the color can be evaluated by a measurement value of the change (hereinafter referred to as "ΔYI") in yellowness (hereinafter referred to as "YI") measured by the QUV testing machine after, for example, a 48-hour light irradiation. It is preferable that the ΔYI value of an optical material be as small as possible from the viewpoint of excellent durability.

Here, the refractive index of the optical material may be adjusted by the type and the relative proportions of the isocyanate compounds and the active hydrogen compounds in polymerizable composition as needed. In particular, the refractive index of the optical material of the present embodiment needs to be high. From this point, a combination of isocyanate compounds and active hydrogen compounds or a composition ratio, for obtaining a resin having the refractive index typically 1.55 or more, preferably 1.59 or more, and more preferably 1.65 or more is preferable when the refractive index is measured by an e-beam.

When curing and molding the polymerizable composition containing the isocyanate compounds and the active hydrogen compounds, which are above-mentioned polymerizable composition, as in the known molding method, materials such as catalysts such as dibutyl tin dichloride and the like, ultraviolet ray absorbing agents such as benzotriazole-based agents, internal mold releasing agents such as acidic phosphate ester and the like, photostabilizers, antioxidants, reaction initiators such as radical reaction initiator and the like, chain elongators, cross-linking agents, anticoloring agents, oil-soluble dyes, fillers and the like may be added as necessary.

When producing an injection solution by mixing a reaction catalyst, mold releasing agents or other additives to the isocyanate compounds and the active hydrogen compounds, the adding of the catalyst, the mold releasing agents and other additives are dependent on the solubility of the isocyanate compounds and the active hydrogen compounds, but the additives may be added and dissolved in the isocyanate compounds in advance, added and dissolved in the active hydrogen compounds in advance, or added and dissolved in the polymerizable composition containing the isocyanate compounds and the active hydrogen compounds. In addition, there is no problem in dissolving it in a part of the isocyanate compounds or the active hydrogen compounds to produce a master solution and then adding it to the mixture. The adding order is not limited by the exemplary methods, and is suitably selected on the basis of operability, safety and convenience.

Mixing is generally performed at a temperature of 30° C. and lower. From the viewpoint concerning the pot life of the polymerizable composition, sometimes it is more preferable when the temperature is even lower. Additionally, when additives such as catalysts or mold releasing agents do not exhibit solubility to the isocyanate compounds or the active hydrogen compounds, it can be heated in advance and then dissolved in the isocyanate compounds, the active hydrogen compounds or their mixture.

Furthermore, depending on the property of matter required of the plastic lens which can be obtained, performing degassing treatment under reduced pressure or filtration treatment under increased pressure and reduced pressure and the like as necessary may be preferable.

(d) Step of Stacking Layer(s) Comprised of a Thiourethane-Based Resin on at Least One Surface of the Polarized Film by Polymerizing and Curing the Polymerizable Composition Subsequently, the lens casting mold wherein the polarized film is fixed, into which the polymerizable composition has been injected, is cured and formed inside a heating apparatus, such as an oven or under water and the like, by a predetermined temperature program for several hours to several tens of hours.

The polymerizing and curing temperature cannot be limited since the conditions differ depending on the composition of the polymerizable composition, type of catalyst, shape of the mold and the like, but it is performed at a temperature of about −50 to 200° C. for 1 to 100 hours.

Typically, initializing at a temperature range of 5° C. to 40° C., slowly raising the temperature to a range of 80° C. to 130° C., and then heating at that temperature for 1 hour to 4 hours is general.

After the completion of the curing and forming, the plastic polarized lens of the present embodiment, as shown in FIG. 1, can be obtained by taking it out of the lens casting mold. In this plastic polarized lens 10, the resin layer 14a, the polarized film 12 and the resin layer 14b are stacked, respectively. Due to this structure, the peel-off of the polarized film 12 from the lens material during the outer circumference polishing process can be suppressed, and the polarized lens can be mass-produced industrially.

In the plastic polarized lens of the present embodiment, it is preferable to heat the released lens for an annealing treatment in order to lessen the distortion caused by the polymerization. The annealing temperature should typically be in a range of 80 to 150° C., preferably in a range of 100 to 130° C., and most preferably in a range of 110 to 130° C. The annealing time should typically be in a range of 0.5 to 5 hours, and preferably in a range of 1 to 4 hours.

The plastic polarized lens of the present embodiment is used having coated layer(s) formed on one surface or both surfaces as necessary. As the coated layers, there are primer layers, hard coated layers, antireflection film layers, antifog coated layers, antipollutant layers, water-repellent layers and the like. These coated layers can be each employed singularly, or they may be employed as multi-layers with plural coated layers. When forming the coated layers on both surfaces, the same coated layer may be formed on each surface, or different coated layers may be formed thereon.

Along with these coated layers, ultraviolet ray absorbing agents for protecting the lens or the eyes from ultraviolet rays, infrared absorbing agents for protecting the eyes from infrared rays, photostabilizers or antioxidants for improving the weathering resistance of the lens, dye or pigment for improving the fashionability of the lens, and photochromic dyes or photochromic pigments, antistatic agents, and other known additives for improving the performance of the lens may be co-opted. Various leveling agents may be employed for improving the coating characteristic.

The primer layer is typically formed between the polarized lens material (thiourethane-based resin) and the hard coated layer in order to improve the adhesiveness of the hard coated layer or the impact resistance of the polarized lens, and its layer thickness is typically 0.1 to 10 μm.

The primer layer is, for example, formed by a coating method or a dry method. In the coating method, the primer composition is coated by a coating method such as spin coating, dip coating and the like, and then it is solidified to form a primer layer. In the dry method, it is formed by a known dry method such as the CVD method or a vacuum plating method. When forming the primer layer, a preprocessing of the lens surface such as alkali treatment, plasma treatment, ultraviolet ray treatment and the like in order to improve the adhesiveness may be performed as necessary.

As the primer composition, materials which enable high adhesiveness between the solidified primer layer and the lens material (thiourethane-based resin) are preferred, and typically, primer compositions having urethane-based resins, epoxy-based resins, polyester-based resins, melanin-based resins, and polyvinylacetals as main ingredients are employed. The primer composition can be employed without a solvent, but it may employ appropriate solvents which do not affect the lens in order to adjust the viscosity of the composition and the like.

The hard coated layer is a coated layer which aims to provide functions such as abrasion resistance, wear resistance, moisture resistance, hot water resistance, heat resistance, weathering resistance and the like, and its layer thickness is typically 0.3 to 30 μm.

The hard coated layer is typically formed by curing after coating the hard coating composition by the known coating methods such as a spin coating method, dip coating method and the like. As the curing method, there are heat curing methods and curing methods by irradiation of energy lines such as ultraviolet rays, visible light and the like. When forming the hard coated layer, a preprocessing of the coating surface (the lens material or the primer layer) such as alkali treatment, plasma treatment, ultraviolet ray treatment and the like in order to improve the adhesiveness may be performed as necessary.

As hard coating compositions, the mixture of organic silicone compounds having curability and fine oxide particles (including complex fine oxide particles) of Si, Al, Sn, Sb, Ta, Ce, La, Fe, Zn, W, Zr, In, Ti and the like are frequently employed. Besides these, amines, amino acids, metal acetylacetonate complexes, organic acid metal salts, perchloric acids, salts of perchloric acids, acids, metal chlorides, multifunctional epoxy compounds and the like may be employed. The hard coating composition can be employed without a solvent, but it may be employed with appropriate solvents which do not affect the lens.

The antireflection layer is typically formed on the hard coated layer as necessary. The antireflection layer may be inorganic-based or organic-based. Generally, the inorganic-based antireflection layer is frequently formed by dry methods such as vacuum plating method, sputtering method, ion plating method, ion beam assisting method, CVD method and the like, which employ inorganic oxides such as $SiO_2$, $TiO_2$ and the like. Generally, the organic-based antireflection layer is frequently formed by a wet method which employs organic silicone compounds and compositions including silica-based fine particles having internal cavities.

The antireflection layer may be a single layered or multi-layered, but when employed as a single layer, it is preferable for its refractive index to be lower than the refractive index of the hard coated layer by 0.1 or more. The multi-layered anti-refractive layer is preferable in order to effectively realize the antireflection function, and in this case, a low refractive index layer and a high refractive index layer are typically stacked alternatively. In this case, it is also preferable that the refractive index difference between the low refractive index layer and the high refractive index layer be 0.1 or more. As the high refractive index layer, there are, for example, ZnO, $TiO_2$, $CeO_2$, $Sb_2O_5$, $SnO_2$, $ZrO_2$, $Ta_2O_5$ and the like, and as for the low refractive index layer, there is $SiO_2$ and the like. The thickness of the layer is typically 50 to 150 nm.

Furthermore, in the plastic polarized lens of the present invention, rear side polishing, antistatic treatment, dye treatment, light modulation treatment and the like may be performed as necessary.

This plastic polarized lens is useful as polarized lenses of eyeglasses, and in particular, as the lens for correcting visual acuity due to the fact that thin-forming is possible.

Embodiment No. B2

In the embodiment No. B2, points identical with the embodiment No. B1 will be appropriately omitted.

As shown in FIG. 1, in the plastic polarized lens 10 of the present embodiment, resin layers (plastic lenses) 14a and 14b comprised of thiourethane-based resins are formed on both surfaces of the polarized film 12 comprised of thermoplastic polyester.

The polarized film 12 has layer(s) comprised of a urethane-based resin constituted by a polyhydroxy compound-derived structural unit and a polyisocyanate-derived structural unit, on at least one surface.

The polarized film 12 is a film comprised of thermoplastic polyester formed under a condition of temperature T2 represented by the following formula. Furthermore, when forming the thermoplastic polyester film, a layer containing urethane-based resins may be stacked on the polarized film 12, or may be stacked on the polarized film 12 the layer containing urethane-based resins after the forming.

(Glass Transition Temperature of Thermoplastic Polyester)+100° C.<$T2$≦Melting Point of Thermoplastic Polyester Since polarized film 12 is formed (curved) in a desired curvature shape under this temperature condition and has layer(s) comprised of a urethane-based resin on at least one surface, it has excellent adhesion property to the plastic lenses 14a and 14b. Therefore, the plastic polarized lens of the present embodiment has excellent productivity and is appropriate for mass production. In addition, in the present embodiment, the resin layers 14a, 14b are stacked on both surfaces of a polarized film 12. However, the resin layer 14b may be formed on only one surface of a polarized film 12.

Furthermore, since the plastic polarized lens of the present embodiment has the resin layers 14a and 14b, which are comprised of thiourethane-based resins, stacked on both surfaces of the polarized film 12 which is comprised of the thermoplastic polyester, it has excellent water resistance, the discomfort when equipping it can be suppressed, thin-shaping can be enabled, and the peel-off of polarized film during an outer circumference polishing process of a post-process can be suppressed. In other words, the balance of these characteristics is superb.

The method of producing the plastic polarized lens will be described below.

The method of producing the plastic polarized lens includes the following steps.

(a) producing a polarized film having layer(s) comprised of a urethane-based resin constituted by a polyhydroxy compound-derived structural unit and a polyisocyanate-derived structural unit on at least one surface of the polarized film by forming a thermoplastic polyester film under the temperature condition of higher than "the glass transition temperature thereof+100° C." to melting point thereof (b) fixing the polarized film in a lens casting mold, in a state that at least one surface of the polarized film is apart from molds (c) injecting the polymerizable composition in the spaces between the molds and respective surfaces of the polarized film (d) stacking layer(s) comprised of a thiourethane-based resin on at least one surfaces of the polarized film by polymerizing and curing the polymerizable composition Each step will be described in the order.

(a) Step of producing a polarized film having layer(s) comprised of a urethane-based resin constituted by a polyhydroxy compound-derived structural unit and a polyisocyanate-derived structural unit on at least one surface of the polarized film by forming a thermoplastic polyester film under the temperature condition of higher than "the glass transition temperature thereof+100° C." to melting point thereof.

In the present embodiment, the forming of the thermoplastic polyester film is performed under a temperature condition of higher than "the glass transition temperature thereof+100° C." to melting point of the thermoplastic polyester, and preferably, under a temperature condition of up to the temperature of the initial decline of the peak which represents the melting point in the DSC measurement chart. As the forming method of the thermoplastic polyester film, if the film can be heated to the temperature mentioned above and formed into a desired curvature shape, then a typical method may be used.

When the thermoplastic polyester is, for example, polyethylene terephthalate, since the glass transition temperature is 74° C. and the melting point is 259° C., the forming can be performed under a temperature condition of higher then 174° C. to 259° C., and preferably less than 200° C.

In the present embodiment, there is provided a step that layer(s) comprised of a urethane-based resin constituted by a polyhydroxy compound-derived structural unit and a polyisocyanate-derived structural unit is formed, on at least one surface of the thermoplastic polyester film or the polarized film.

The step of forming a layer containing urethane-based resin (urethane-based coating treatment) on both surfaces of the polarized film will be described below as an example. In addition, a layer comprised of a urethane-based resin may be formed on only surface exposed in the space 24b, and a layer comprised of a thiourethane-based resin may be formed on the layer comprised of a urethane-based resin.

Before performing the urethane-based coating treatment on the polarized film surface, one kind or two or more kinds of pretreatments selected from those such as gas or chemical solution treatment, corona discharge treatment, plasma treatment, ultraviolet ray irradiation treatment, electron beam irradiation treatment, surface roughening treatment, flame treatment and the like may be performed in advance.

Although, in the present embodiment, the coating of the polarized film comprised of the thermoplastic polyester with the coating agent containing urethane-based resin can be coated without any solvent, typically it is preferable to select an appropriate solvent and coat by using the coating solution in which the coating agent has been dissolved or dispersed.

Although, in the present embodiment, there is no particular limit on the method of coating the coating solution on both surfaces of the polarized film comprised of thermoplastic polyester, there are different methods, such as a method of treating the polarized film with coating agent containing urethane-based resin and then curve processing it, a method of curve processing and then treating with coating agent containing urethane-based resin, and a method of co-opting both processes, and any kind of method may be adopted depending on each situation, such as adopting a roll coating method, a spin coating method, a spray coating method, a bar coating method, a dipping method and the like which are conventionally known methods. After drying, the coating can be performed once or more times, and the coating solution used for each time may be the same or of different kinds. Typically, the object of the present embodiment can be achieved with a single coating and drying, without overlapping coatings.

After coating the polarized film with the urethane-based resin used for the above-mentioned primer coating treatment as necessary, drying and/or heat treatment is performed as necessary. As long as the applied temperature of the drying and/or heat treatment does not actually deteriorate the function of the polarized film, there is no particular limit. After coating the resin on the polarized film, an active energy line may be irradiated on it. As the active energy line, there is an ultraviolet ray or an electron beam.

Furthermore, the steps (b) to (d) can be performed identically to the processes in the embodiment No. B1.

After the completion of the curing and forming in the step (d), the plastic polarized lens of the present embodiment, as shown in FIG. 1, can be obtained by taking it out of the lens casting mold. In this plastic polarized lens 10, the resin layer 14a, the polarized film 12 and the resin layer 14b are stacked, respectively. Furthermore, on at least one surface of the polarized film 12, there is layer(s) (illustration omitted) comprised of a urethane-based resin, and the polarized film 12 and the resin layer 14a (or resin layer 14b) are adhered thereto, with the layer in between them. Due to this structure, the peel-off of the polarized film 12 from the lens material during the outer circumference polishing can be suppressed, and the polarized lens can be mass-produced industrially.

Furthermore, identical treatments as those in the embodiment No. B1 may be performed on the plastic polarized lens of the present embodiment as necessary.

Since such a plastic polarized lens may be formed in a small thickness, it is useful as a polarized lens for eyeglasses, particularly as the lens for correcting visual acuity.

It is apparent that the present invention is not limited to the above embodiment, and may be modified and changed without departing from the scope and spirit of the invention.

EXAMPLES

The present invention will be described in further detail below by examples, but the present invention is limited by the following.

The performance test of the polarized lens was carried out as below.

(A) Adhesiveness of the Polarized Film:

This is an evaluation item which determines whether the adhesiveness between the cured lens material and the polarized film is excellent or not in the polarized lens after the forming.

The test is carried out by striking the obtained lens with a hammer. At this time, if the adhesiveness between the polarized film and the cured lens material is insufficient, a peel-off of the polarized film occurs. In other words, by observing the peel-off state of the stacked portion between the cured lens material of the destroyed lens and the polarized film, and the existence/nonexistence of the peeled-off layer in the destroyed portion, the adhesive state was evaluated by the following criteria.

A: Among the destroyed portions, there are no confirmed positions where the layers are peeled off.

B: Among the destroyed portions, most points are confirmed as not having any peel-offs of the layers, but some positions are confirmed as having minute peel-offs of the layers.

C: Among the destroyed portions, there are numerous confirmed positions where the layers are peeled off.

(B) Visibility of a Polarized Film in the Lens

Although visibility may be evaluated under the light in normal life environment, in order to simplify the environmental light factor as much as possible, the evaluation was made according to the following method. In a dark room where other light source may be neglected, the polarized lens to be tested was placed just 150 cm below a lighted 37 watt fluorescent lamp of 120 cm length set above, the image of the fluorescent lamp is observed by looking at the concave surface of the lens from the direction as vertical as possible to the surface, at approximately 30 cm above the lens, having the lens in the horizontal position turning the concave face of the lens toward the lamp, while supporting side face of the lens by hand so that no hindrance exists on both side face of the lens. In addition, the image is observed while slightly changing the angle of the lens from a horizontal position. Two kinds of clear, large and small images are observed in common. When the polarized film is conspicuous, another vague image may be observed. Visibility of the polarized film was rated in terms of the following criteria:

a: Almost no vague image is seen, b: A vague image is slightly seen but not expanded, c: A vague image fluctuates, expanded and conspicuous.

(C) Water Resistance

The lens to be tested was dipped in a constant temperature water bath kept at 60° C., and at every preset interval, 3 kinds of lenses were taken out and changes were observed. When water-resistance is not sufficient, whitening or decoloration-like deterioration was observed progressing from the periphery to the center of the lens with time of dipping (data obtained after 4 hours, 3 days and 7 days). The length of the deteriorated part from the periphery to the center of the lens was measured using a vernier caliper.

(D) Refractive Index of the Lens Material

The refractive index of a piece of a resin (the lens material) molded without the polarized film was measured for the e-line at 20° C. using a Pulfrich refractometer.

(E) Viscosity

The viscosity of a monomer mixture for injection w as measured using a B-type viscometer at 20° C.

EXAMPLES NO. A

Example No. A is described below.

Reference Example A1

The glass transition temperature of the polarized film made from polyethylene terephthalate [produced by Mitsui Chemicals, Inc.: "POLASOLA (registered trademark)"] was measured by the method below.

4.30 mg of POLASOLA was cut out and used as a measurement sample. The glass transition temperature was measured by using the differential scanning calorimeter DSC-60 produced by Shimadzu Corporation, and the temperature was raised by a temperature raising speed of a heating speed of 10° C./min. The glass transition temperature of the POLASOLA from the point of inflection of the chart was 74° C. (intersection point method). Furthermore, the melting point was 259° C. (peak top).

Example A1

As the coating agent containing a urethane-based resin, 100 parts by weight of SANPLENE IB-422 (polyester-based polyurethane resin solution, produced by Sanyo Chemical Industries, Ltd.) was dissolved in 330 parts by weight of a mixture solvent with a weight ratio of 2:1 of methyl ethyl ketone and isopropanol, and the primer coating solution was produced.

In the polarized film comprised of polyethylene terephthalate [produced by Mitsui Chemicals, Inc.: "POLASOLA (registered trademark)", glass transition temperature: 74° C.] (thickness: 130 microns), which has the protective film on both surfaces thereof, one of the protective film on both surfaces was peeled, and the polarized film was maintained mostly horizontally while coating the exposed surface of the polarized film with the primer coating solution using a #4 bar coater. Then, it was dried in a blower dry oven at 50° C. for 5 minutes. Next, protective film on the other surface of the obtained film was peeled and the primer coating solution was coated and dried in an identical method as the above. The obtained film was formed in a curve shape of 6C (curves) at a forming temperature of 120° C. by a heat pressing method. The polarized film was prepared by cutting the polarized film to match the mold size. This was inserted and installed inside the polarized lens casting mold (glass mold set) (front surface: 6C (curves), rear surface: 6C (curves)) shown in FIG. 2.

Meanwhile, 50.6 parts by weight of m-xylylenediisocyanate, 49.4 parts by weight of a mixture of 4,8-dimercaptomethyl-1,1-dimercapto-3,6,9-trithiaundecane, 4,7-dimercaptomethyl-1,11-dimercapto-3,6,9-trithiaundecane and 5,7-dimercaptomethyl-1,11-dimercapto-3,6,9-trithiaundecane, 0.01 parts by weight of dibutyl tin dichloride as a curing promoting agent, 0.1 parts by weight of Zelec UN (registered trademark, produced by Stepan Company) as a mold releasing agent and 0.05 parts by weight of Seesorb 709 (produced by Shipro Kasei Kaisha, Ltd.) as an ultraviolet ray absorbing agent were stirred and dissolved, degassed under reduced pressure, and provided as the monomer mixture for injection right after production. The viscosity at 20° C. after 1 hour of stirring and dissolving was 30 mPa·s.

Next, on the two spaces 24a and 24b which are divided by the glass molds 22a and 22b inside the lens casting mold and the polarized film 12, this monomer mixture was passed through a 3 μm filter and filtrated, and then passed through the tube for injection. Furthermore, the separated distance a of 24a, which is the narrowest space, was about 0.5 mm. After the injection, the closed lens casting mold 20 was placed in a hot air circulating oven, heated from 25° C. to 120° C. for 16 hours, and maintained at 120° C. for 4 hours and slowly cooled down, and then the lens casting mold was taken out from the oven. The lens was released from the lens casting mold, treated with annealing at 130° C. for 2 hours, and then the polarized lens was obtained.

The performance test result of the obtained polarized lens is shown in Table 1.

With respect to the extracted materials extracted by acetone from the coated film, component analysis of the SANPLENE IB-422 (polyester-based polyurethane resin solution, produced by Sanyo Chemical Industries, Ltd.), which is a coating agent containing a urethane-based resin, was performed by IR, NMR, and GC-MS analysis, and the main components contained polyurethane components composed of polyester diol compositions obtained from adipic acid, 1,4-butanediol, 3-methyl-1,5-pentanediol and isophorone diisocyanate.

Calculation of the composition ratio from the obtained analysis values is as below:

adipic acid: 49.8 mol %, 1,4-butanediol: 32.6 mol %, 3-methyl-1,5-pentanediol: 17.6 mol %, and isophorone diisocyanate: 22.1 mol %.

Example A2

As the coating agent containing a urethane-based resin, 100 parts by weight of SANPLENE IB-422 (polyester-based polyurethane resin solution, produced by Sanyo Chemical Industries, Ltd.) was dissolved in 330 parts by weight of a mixture solvent with a weight ratio of 2:1 of methyl ethyl ketone and isopropanol, and the primer coating solution was produced.

In the polarized film comprised of polyethylene terephthalate [produced by Mitsui Chemicals, Inc.: "POLASOLA (registered trademark)"] (thickness: 130 microns), which has the protective film on both surfaces thereof, one of the protective film on both surfaces was peeled, and the polarized film was maintained mostly horizontally while coating the exposed surface of the polarized film with the primer coating solution of Example A1 using a #4 bar coater. Then, it was dried in a blower dry oven at 50° C. for 5 minutes. Next, protective film on the other surface of the obtained film was peeled and the primer coating solution was coated and dried in an identical method as the above. The obtained film was formed in a curve shape of 2C (curves) at a forming temperature of 120° C. by a heat pressing method. The polarized film was prepared by cutting the polarized film to match the mold size. This was inserted and installed inside the polarized lens casting mold (glass mold set) (front surface: 6C (curves), rear surface: 6C (curves)) shown in FIG. 2.

Meanwhile, 50.6 parts by weight of bis(isocyanatomethyl)bicyclo-[2.2.1]-heptane (a mixture of the 2,5-isomer and the 2.6-isomer), 23.9 parts by weight of pentaerythritoltetrakis(3-mercaptopropionate) 25.5 parts by weight of 4-mercaptomethyl-1,8-dimecapto-3,6-dithiaoctane, 0.02 parts by weight of dibutyl tin dichloride as a curing promoting agent, 0.13 parts by weight of Zelec UN (registered trademark, produced by Stepan) as a mold releasing agent and 0.05 parts by weight of Seesorb 709 (produced by Shipro Kasei Kaisha, Ltd.) as an ultraviolet ray absorbing agent, were stirred and dissolved, degassed under reduced pressure, and provided as the monomer mixture for injection right after production. The viscosity at 20° C. after 1 hour of stirring and dissolving was 40 mPa·s.

Next, as in Experimental Example 1, in the two spaces 24a and 24b which are divided by the glass molds 22a and 22b inside the lens casting mold and the polarized film 12, this monomer mixture was passed through a 3 μm filter and filtrated, and then passed through the tube for injection. After the injection, the closed lens casting mold was placed in a hot air circulating oven, heated from 20° C. to 130° C. for 26 hours, and maintained at 130° C. for 4 hours and slowly cooled down, and then the lens casting mold was taken out from the oven. The lens was released from the lens casting mold, treated with annealing at 130° C. for 2 hours, and then the polarized lens was obtained.

The performance test result of the obtained polarized lens is shown in Table 1.

Example A3

The polarized film comprised of polyethylene terephthalate [produced by Mitsui Chemicals, Inc.: "POLASOLA (registered trademark)"] (thickness: 130 microns) having a protective film on one surface was formed in a curve shape of 2C (curves) at a forming temperature of 120° C. by a heat pressing method, the polarized film was cut to match the mold size, and the protective film was peeled. This polarized film was inserted and installed inside the polarized lens casting mold (glass mold set) (front surface: 2C (curves), rear surface: 6C (curves), diopter: S-5.00) shown in FIG. 2, and the polarized lens was obtained by performing the same operation as in Example A1.

The performance test result of the obtained polarized lens is shown in Table 1.

Example A4

As the coating agent containing a urethane-based resin, 100 parts by weight of SANPLENE IB-422 (polyester-based polyurethane resin solution, produced by Sanyo Chemical Industries, Ltd.) was dissolved in 330 parts by weight of a mixture solvent with a weight ratio of 2:1 of methyl ethyl ketone and isopropanol, and the primer coating solution was produced.

In the polarized film comprised of polyethylene terephthalate [produced by Mitsui Chemicals, Inc.: "POLASOLA (registered trademark)", glass transition temperature: 74° C.] (thickness: 130 microns), which has the protective film on both surfaces thereof, one of the protective film on both surfaces was peeled, and the polarized film was maintained mostly horizontally while coating the exposed surface of the polarized film with the primer coating solution using a #4 bar coater. Then, it was dried in a blower dry oven at 50° C. for 5 minutes. Next, protective film on the other surface of the obtained film was peeled and the primer coating solution was coated and dried in an identical method as the above. The obtained film was formed in a curve shape of 6C (curves) at a forming temperature of 120° C. by a heat pressing method. The polarized film was prepared by cutting the polarized film to match the mold size. This was inserted and installed inside the polarized lens casting mold (glass mold set) (front surface: 6C (curves), rear surface: 6C (curves)) shown in FIG. 2.

Meanwhile, 44.3 parts by weight of m-xylylenediisocyanate, 55.7 parts by weight of a mixture containing 1,1,3,3-tetrakis(mercaptomethylthio)propane and 4,6-bis(mercaptomethylthio)-1,3-dithian, 0.02 parts by weight of dibutyl tin dichloride as a curing promoting agent, 0.12 parts by weight of Zelec UN (registered trademark, produced by Stepan Company) as a mold releasing agent and 0.05 parts by weight of Seesorb 709 (produced by Shipro Kasei Kaisha, Ltd.) as an ultraviolet ray absorbing agent were stirred and dissolved, degassed under reduced pressure, and provided as the monomer mixture for injection right after production. The viscosity at 20° C. after 1 hour of stirring and dissolving was 30 mPa·s.

Next, on the two spaces 24a and 24b which are divided by the glass molds 22a and 22b inside the lens casting mold and the polarized film 12, this monomer mixture was passed through a 3 μm filter and filtrated, and then passed through the tube for injection. Furthermore, the separated distance a of 24a, which is the narrowest space, was about 0.5 mm. After the injection, the closed lens casting mold 20 was placed in a hot air circulating oven, heated from 25° C. to 120° C. for 16 hours, and maintained at 120° C. for 4 hours and slowly cooled down, and then the lens casting mold was taken out from the oven. The lens was released from the lens casting mold, treated with annealing at 130° C. for 2 hours, and then the polarized lens was obtained.

The performance test result of the obtained polarized lens is shown in Table 1.

Example A5

The polarized film comprised of polyethylene terephthalate [produced by Mitsui Chemicals, Inc.: "POLASOLA (registered trademark)"] (thickness: 130 microns) having a protective film on one surface was formed in a curve shape of 2C (curves) at a forming temperature of 120° C. by a heat pressing method, the polarized film was cut to match the mold size, and the protective film was peeled. This polarized film was inserted and installed inside the polarized lens casting mold (glass mold set) (front surface: 2C (curves), rear surface: 6C (curves), diopter: S-5.00) shown in FIG. 2, and the polarized lens was obtained by performing the same operation as in Example A4.

The performance test result of the obtained polarized lens is shown in Table 1.

Example A6

In the polarized film comprised of polyethylene terephthalate [produced by Mitsui Chemicals, Inc.: "POLASOLA (registered trademark)"] (thickness: 130 microns), which has protective films on both surfaces, one of protective film was peeled, and the polarized film was maintained mostly horizontally while coating the exposed surface of the polarized film with the primer coating solution of Example A1 using a #4 bar coater. Afterwards, it was dried in a blower dry oven at 50° C. for 5 minutes. Next, protective film on the other surface of the obtained film was peeled and the primer coating solution was coated on the exposed surface of the polarized film and dried in an identical method as the above. The obtained film was formed in a curve shape of 6C (curves) at a forming temperature of 80° C. by a heat pressing method, the polarized film was cut to match the mold size, and the film was peeled. This polarized film was inserted and installed inside the polarized lens casting mold (glass mold set) (front surface: 6C (curves), rear surface: 6C (curves)) shown in FIG. 2, and the polarized lens was obtained by performing the same operation as in Example A1.

The performance test result of the obtained polarized lens is shown in Table 1.

Example A7

In the polarized film comprised of polyethylene terephthalate [produced by Mitsui Chemicals, Inc.: "POLASOLA (registered trademark)"] (thickness: 130 microns), which has protective films on both surface, one of protective film was peeled, and the polarized film was maintained mostly horizontally while coating the exposed surface of the polarized film with the primer coating solution of Example A1 using a #4 bar coater. Afterwards, it was dried in a blower dry oven at 50° C. for 5 minutes. Next, protective film on the other surface of the obtained film was peeled and the primer coating solution was coated on the exposed surface of the polarized film and dried in an identical method as the above. The obtained film was formed in a curve shape of 6C (curves) at a forming temperature of 100° C. by a heat pressing method, the polarized film was cut to match the mold size, and the film was peeled. This polarized film was inserted and installed inside the polarized lens casting mold (glass mold set) (front surface: 6C (curves), rear surface: 6C (curves)) shown in FIG. 2, and the polarized lens was obtained by performing the same operation as in Example A1.

The performance test result of the obtained polarized lens is shown in Table 1.

Example A8

In the polarized film comprised of polyethylene terephthalate [produced by Mitsui Chemicals, Inc.: "POLASOLA (registered trademark)"] (thickness: 130 microns), which has protective films on both surface, one of protective film was peeled, and the polarized film was maintained mostly horizontally while coating the exposed surface of the polarized film with the primer coating solution of Example A1 using a #4 bar coater. Afterwards, it was dried in a blower dry oven at 50° C. for 5 minutes. Next, protective film on the other surface of the obtained film was peeled and the primer coating solution was coated on the exposed surface of the polarized film and dried in an identical method as the above. The obtained film was formed in a curve shape of 6C (curves) at a forming temperature of 140° C. by a heat pressing method, the polarized film was cut to match the mold size, and the film was peeled. This polarized film was inserted and installed inside the polarized lens casting mold (glass mold set) (front surface: 6C (curves), rear surface: 6C (curves)) shown in FIG. 2, and the polarized lens was obtained by performing the same operation as in Example A2.

The performance test result of the obtained polarized lens is shown in Table 1.

Example A9

In the polarized film comprised of polyethylene terephthalate [produced by Mitsui Chemicals, Inc.: "POLASOLA (registered trademark)"] (thickness: 130 microns), which has protective films on both surface, one of protective film was peeled, and the polarized film was maintained mostly horizontally while coating on the exposed surface of the polarized film with the primer coating solution of Example A1 using a #4 bar coater. Afterwards, it was dried in a blower dry oven at 50° C. for 5 minutes. Next, protective film on the other surface of the obtained film was peeled and the primer coating solution was coated on the exposed surface of the polarized film and dried in an identical method as the above. The obtained film was formed in a curve shape of 6C (curves) at a forming temperature of 180° C. by a heat pressing method, the polarized film was cut to match the mold size, and the film was peeled. This polarized film was inserted and installed inside the polarized lens casting mold (glass mold set) (front surface: 6C (curves), rear surface: 6C (curves)) shown in FIG. 2, and the polarized lens was obtained by performing the same operation as in Example A1.

The performance test result of the obtained polarized lens is shown in Table 1.

Comparative Example A1

In the polarized film comprised of polyethylene terephthalate [produced by Mitsui Chemicals, Inc.: "POLASOLA (registered trademark)"] (thickness: 130 microns) having a protective film on one surface, the protective film was peeled, formed in a curve shape of 2C (curves) at a forming temperature of 180° C. by a heat pressing method, and the polarized film was cut to match the mold size. This polarized film was inserted and installed inside the polarized lens casting mold shown in FIG. 2, and the polarized lens was obtained by performing the same operation as in Example A1.

The performance test result of the obtained polarized lens is shown in Table 1.

Comparative Example A2

In the polarized film comprised of polyethylene terephthalate [produced by Mitsui Chemicals, Inc.: "POLASOLA (registered trademark)"] (thickness: 130 microns), the protective film was peeled, and there was an attempt to formed it in a curve shape of 6C (curves) at a forming temperature of 70° C. by a heat pressing method, but the 6C (curves) shape could not be maintained even after taking it out from the heat pressing apparatus. Thus, this polarized film could not be inserted into the polarized lens casting mold shown in FIG. 2, and therefore the polarized lens could not be produced.

Comparative Example A3

A polyvinyl alcohol (KURARAYVINYLON #750 (produced by Kuraray Co., Ltd.) was dyed in an aqueous solution of a dichroic dye, stretched inside the solution, and then the film was quickly dried at room temperature, heat-treated at 40° C. for 3 minutes to obtain a polarized film with a thickness of 40 microns. The obtained polarized film was formed in a curve shape of 2C (curves) by a heat press, cut to match the mold size, placed still in a thermo-hygrostat to adjust moisture, placed in a hot air circulating oven with the temperature adjusted at 60° C. for 2 hours, and then immediately installed inside the lens casting mold (glass mold set).

Afterwards, the polarized lens was obtained by performing the same operation as in Example A1.

The performance test result of the obtained polarized lens is shown in Table 1.

TABLE 1

| | Forming Temperature (° C.) | Existence of Urethane-based Coating layer | (A) Viscosity (mPa·s) at 20° C. After 1 hour of Stirring and Dissolving | The Adhesiveness of the Polarized Film | (B) The Visibility of a Polarized film in the Lens | (C) Water resistance (length of deteriorated part from periphery to center (mm)) | | | (D) The Refractive Index of the Lens |
|---|---|---|---|---|---|---|---|---|---|
| | | | | | | After 4 Hours | After 3 Days | After 7 Days | |
| Example A1 | 120 | Yes | 30 | A | a | 0 | 0 | 0 | 1.67 |
| Example A2 | 120 | Yes | 40 | A | b | 0 | 0 | 0 | 1.60 |
| Example A3 | 120 | No | 30 | A | a | 0 | 0 | 0 | 1.67 |
| Example A4 | 120 | Yes | 30 | A | a | 0 | 0 | 0 | 1.70 |
| Example A5 | 120 | No | 30 | A | a | 0 | 0 | 0 | 1.70 |
| Example A6 | 80 | Yes | 30 | A | a | 0 | 0 | 0 | 1.67 |
| Example A7 | 100 | Yes | 30 | A | a | 0 | 0 | 0 | 1.67 |
| Example A8 | 140 | Yes | 40 | A | b | 0 | 0 | 0 | 1.60 |
| Example A9 | 180 | Yes | 30 | B | a | 0 | 0 | 0 | 1.67 |
| Comparative Example A1 | 180 | No | 30 | C | a | 0 | 0 | 0 | 1.67 |
| Comparative Example A2 | 70 | No | 30 | — | — | — | — | — | 1.67 |
| Comparative Example A3 | — | — | 30 | A | c | 0.2 | 1.5 | 3.0 | 1.67 |

From the results above, it was confirmed that the polarized lens of the present invention exhibits excellent water resistance, has a clear appearance due to dissolution of the film in the lens, there is no problem of a peel-off of the polarized film during the outer circumference polishing process of the post-process (process of shaving the edges of a lens to fit a predetermined shape), and thin-shaping is possible due to the low viscosity upon injection.

Furthermore, by comparing Examples A1 to A8 with Examples A9 and Comparative Examples A1, it was confirmed that, when the polarized film was formed at a temperature of glass transition temperature thereof+5° C. to glass transition temperature thereof+100° C., it tends to exhibit excellent adhesiveness with the plastic lens regardless of the existence of the urethane-based coating layer has been confirmed. Additionally, when comparing Examples A1 to A8 with Comparative Examples A2, it showed that use of the polarized film comprised of thermoplastic polyester in place of polyvinyl alcohol improves both the inconspicuousness and the water resistance of the polarized layer.

In other words, based on the results of Examples A1 to A9 and Comparative Examples A1 to A3, in the polarized lens of the present invention, it was confirmed that by using the polarized film comprised of thermoplastic polyester formed at a temperature of the glass transition temperature thereof+ 5° C. to the glass transition temperature thereof+100° C., adhesivity to the plastic lens tends to be particularly excellent regardless of the existence of the urethane-based coating layer, and both the inconspicuousness and the water resistance of the polarized layer tend to improve.

Additionally, based on the results of Examples A9 and Comparative Examples A1, in the polarized lens of the present invention, it was confirmed that even when the polarized film comprised of thermoplastic polyester formed at a temperature of higher than "the glass transition temperature thereof+100° C." to the melting point thereof is used, the adhesivity to the plastic lens tends to be excellent as long as it is provided with a urethane-based coating layer.

EXAMPLES NO. B

Example No. B is described below.

Reference Example B1

The glass transition temperature of the polarized film made from polyethylene terephthalate [produced by Mitsui Chemicals, Inc.: "POLASOLA (registered trademark)"] was measured by the method below.

4.30 mg of POLASOLA was cut out and used as a measurement sample. The glass transition temperature was measured by using the differential scanning calorimeter DSC-60 produced by Shimadzu Corporation, and the temperature was raised by a temperature raising speed of a heating speed of 10° C./min. The glass transition temperature of the POLASOLA from the point of inflection of the chart was 74° C. (intersection point method). Furthermore, the melting point was 259° C. (peak top).

Example B1

The polarized film comprised of polyethylene terephthalate [produced by Mitsui Chemicals, Inc.: "POLASOLA (registered trademark)"] (thickness: 130 microns) having a protective film on one surface thereof was formed in a curve shape of 2C (curve) at a forming temperature of 120° C. by a heat pressing method. After cutting the polarized film to the mold size, the protective film was peeled off. The polarized film was inserted and installed inside the polarized lens casting mold (glass mold set) (front surface: 2C (curves), rear surface: 6C (curves), diopter: S-5.00) shown in FIG. 2.

Meanwhile, 34.65 parts by weight of tolylenediisocyanate and 14.34 parts by weight of hexamethylenediisocyanate were mixed and dissolved, and further added with 0.0075 parts by weight of dimethyl tin dichloride as a curing catalyst, 0.05 parts by weight of Biosorb 583 as a ultraviolet ray absorbing agent, and 0.05 parts by weight of Zelec UN (acid phosphate ester: registered trademark, produced by Stepan Company) as an internal mold releasing agent to be mixed and dissolved at 20° C. After being dissolved, 51.01 parts by weight of 4-mercaptomethyl-1,8-dimercapto-3,6-dithiaocthane was added thereto, and mixed and dissolved to prepare a homogeneous solution (in the solution, (NCO+ NCS)/(SH+OH)=1.0/1.0). The viscosity of the homogeneous solution was 13 mPa·s. The homogeneous solution was processed to defoam at 600 Pa for 1 hour to prepare a monomer mixture.

Next, on the two air gaps 24a and 24b which are divided by the glass molds 22a and 22b inside the lens casting mold and the polarized film 12, this monomer mixture was passed through a 3 μm filter and filtrated, and then passed through the tube for injection. Furthermore, the separated distance of 24a, which is the narrowest air gap, was about 0.5 mm. After the injection, the closed lens casting mold 20 was placed in a hot air circulating oven, heated from 25° C. to 120° C. for 16 hours, and maintained at 120° C. for 4 hours and slowly cooled down, and then the lens casting mold was taken out from the oven. The lens was released from the lens casting mold, treated with annealing at 130° C. for 2 hours, and then the polarized lens was obtained.

The performance test result of the obtained polarized lens is shown in Table 2.

Example B2

To 44.45 parts by weight of tolylenediisocyanate, there were added 0.005 parts by weight of dimethyl tin dichloride as a curing catalyst, 0.05 parts by weight of Biosorb 583 as a ultraviolet ray absorbing agent and 0.05 parts by weight of Zelec UN (acid phosphate ester: registered trademark, produced by Stepan Company) as an internal mold releasing agent, followed by mixing and dissolving at 20° C. After being dissolved, 22.91 parts by weight of pentaerythritoltetrakis mercaptopropionate and 32.64 parts by weight of 4, 8 or 4, 7 or 5,7-dimercaptomethyl-1,11-dimercapto-3,6,9-trithiaundecane were added thereto, and mixed and dissolved to prepare a homogeneous solution (in the solution, (NCO+ NCS)/(SH+OH)=1.0/1.0). The viscosity of the homogeneous solution was 40 mPa·s. The homogeneous solution was processed to defoam at 600 Pa for 1 hour, filtered with a 1 μm-Teflon filter (registered trademark) to prepare a monomer mixture.

In addition, a polarized lens was obtained by performing the same operation as in Example B1 except that the monomer mixture was used.

The performance test result of the obtained polarized lens is shown in Table 2.

Example B3

40.56 parts by weight of 4,41-diphenylmethanediisocyanate and 14.68 parts by weight of hexamethylenediisocyanate were mixed and dissolved, and further added with 0.0075 parts by weight of dimethyl tin dichloride as a curing catalyst, 0.05 parts by weight of Biosorb 583 as a ultraviolet ray absorbing agent, and 0.05 parts by weight of Zelec UN (acid phosphate ester: registered trademark, produced by Stepan Company) as an internal mold releasing agent to be mixed and dissolved at 20° C. After being dissolved, 44.76 parts by weight of 4-mercaptomethyl-1,8-dimercapto-3,6-dithiaocthane was added thereto, and mixed and dissolved to prepare a homogeneous solution (in the solution, (NCO+ NCS)/(SH+OH)=1.0/1.0). The viscosity of the homogeneous solution was 23 mPa·s. The homogeneous solution was processed to defoam at 600 Pa for 1 hour, filtered with a 1 μm-Teflon filter (registered trademark) to prepare a monomer mixture.

In addition, a polarized lens was obtained by performing the same operation as in Example B1 except that the monomer mixture was used.

The performance test result of the obtained polarized lens is shown in Table 2.

Example B4

To 58.23 parts by weight of 4,4'-diphenylmethanediisocyanate, there were added 0.005 parts by weight of dimethyl tin dichloride as a curing catalyst, 0.05 parts by weight of Biosorb 583 as a ultraviolet ray absorbing agent and 0.05 parts by weight of Zelec UN (acid phosphate ester: registered trademark, produced by Stepan Company) as an internal mold releasing agent, followed by mixing and dissolving at 20° C. After being dissolved, 41.77 parts by weight of 4-mercaptomethyl-1,8-dimercapto-3,6-dithiaocthane was added thereto, and mixed and dissolved to prepare a homogeneous solution (in the solution, (NCO+NCS)/(SH+OH)=1.0/1.0). The viscosity of the homogeneous solution was 31 mPa·s. The homogeneous solution was processed to defoam at 600 Pa for 1 hour to prepare a monomer mixture.

In addition, a polarized lens was obtained by performing the same operation as in Example B1 except that the monomer mixture was used.

The performance test result of the obtained polarized lens is shown in Table 2.

Example B5

As the coating agent containing a urethane-based resin, 100 parts by weight of SANPLENE IB-422 (polyester-based polyurethane resin solution, produced by Sanyo Chemical Industries, Ltd.) was dissolved in 330 parts by weight of a mixture solvent with a weight ratio of 2:1 of methyl ethyl ketone and isopropanol, and the primer coating solution was produced.

In the polarized film comprised of polyethylene terephthalate [produced by Mitsui Chemicals, Inc.: "POLASOLA (registered trademark)", glass transition temperature: 74° C.] (thickness: 130 microns), which has the protective film on both surfaces thereof, one of the protective film on both surfaces was peeled, and the polarized film was maintained mostly horizontally while coating the exposed surface of the polarized film with the primer coating solution using a #4 bar coater. Then, it was dried in a blower dry oven at 50° C. for 5 minutes. Next, protective film on the other surface of the obtained film was peeled and the primer coating solution was coated and dried in an identical method as the above. The obtained film was formed in a curve shape of 6C (curves) at a forming temperature of 120° C. by a heat pressing method. The polarized film was prepared by cutting the polarized film to match the mold size. This was inserted and installed inside the polarized lens casting mold (glass mold set) (front surface: 6C (curves), rear surface: 6C (curves)) shown in FIG. 2.

Next, on the two spaces 24a and 24b which are divided by the glass molds 22a and 22b inside the lens casting mold and the polarized film 12, the monomer mixture of Example B1 was passed through a 3 µm filter and filtrated, and then passed through the tube for injection. Furthermore, the separated distance a of 24a, which is the narrowest space, was about 0.5 mm. After the injection, the closed lens casting mold 20 was placed in a hot air circulating oven, heated from 25° C. to 120° C. for 16 hours, and maintained at 120° C. for 4 hours and slowly cooled down, and then the lens casting mold was taken out from the oven. The lens was released from the lens casting mold, treated with annealing at 130° C. for 2 hours, and then the polarized lens was obtained.

The performance test result of the obtained polarized lens is shown in Table 2.

With respect to the extracted materials extracted by acetone from the coated film, component analysis of the SANPLENE IB-422 (polyester-based polyurethane resin solution, produced by Sanyo Chemical Industries, Ltd.), which is a coating agent containing a urethane-based resin, was performed by IR, NMR, and GC-MS analysis, and the main components contained polyurethane components composed of polyester diol compositions obtained from adipic acid, 1,4-butanediol, 3-methyl-1,5-pentanediol and isophorone diisocyanate.

Calculation of the composition ratio from the obtained analysis values is as below:
adipic acid: 49.8 mol %, 1,4-butanediol: 32.6 mol %, 3-methyl-1,5-pentanediol: 17.6 mol %, and isophorone diisocyanate: 22.1 mol %.

Example B6

As the coating agent containing a urethane-based resin, 100 parts by weight of SANPLENE IB-422 (polyester-based polyurethane resin solution, produced by Sanyo Chemical Industries, Ltd.) was dissolved in 330 parts by weight of a mixture solvent with a weight ratio of 2:1 of methyl ethyl ketone and isopropanol, and the primer coating solution was produced.

In the polarized film comprised of polyethylene terephthalate [produced by Mitsui Chemicals, Inc.: "POLASOLA (registered trademark)", glass transition temperature: 74° C.] (thickness: 130 microns), which has the protective film on both surfaces thereof, one of the protective film on both surfaces was peeled, and the polarized film was maintained mostly horizontally while coating the exposed surface of the polarized film with the primer coating solution using a #4 bar coater. Then, it was dried in a blower dry oven at 50° C. for 5 minutes. Next, protective film on the other surface of the obtained film was peeled and the primer coating solution was coated and dried in an identical method as the above. The obtained film was formed in a curve shape of 6C (curves) at a forming temperature of 120° C. by a heat pressing method. The polarized film was prepared by cutting the polarized film to match the mold size. This was inserted and installed inside the polarized lens casting mold (glass mold set) (front surface: 6C (curves), rear surface: 6C (curves)) shown in FIG. 2.

Meanwhile, 16.5 parts by weight of tolylenediisocyanate and 29.5 parts by weight of hexamethylenediisocyanate were mixed and dissolved, and further added with 0.05 parts by weight of dimethyl tin dichloride as a curing catalyst, 0.05 parts by weight of Biosorb 583 as a ultraviolet ray absorbing agent, and 0.10 parts by weight of Zelec UN (acid phosphate ester: registered trademark, produced by Stepan Company) as an internal mold releasing agent to be mixed and dissolved at 20° C. After being dissolved, 54.0 parts by weight of a mixture containing 1,1,3,3-tetrakis(mercaptomethylthio)propane and 4,6-bis(mercaptomethylthio)-1,3-dithian was added thereto, and mixed and dissolved to prepare a homogeneous solution (in the solution, (NCO+NCS)/(SH+OH) =1.0/1.0). The viscosity of the homogeneous solution was 20 mPa·s. The homogeneous solution was processed to defoam at 600 Pa for 1 hour to prepare a monomer mixture.

Next, on the two air gaps 24a and 24b which are divided by the glass molds 22a and 22b inside the lens casting mold and the polarized film 12, this monomer mixture was passed through a 3 µm filter and filtrated, and then passed through the tube for injection. Furthermore, the separated distance of 24a, which is the narrowest air gap, was about 0.5 mm. After the injection, the closed lens casting mold 20 was placed in a hot air circulating oven, heated from 25° C. to 120° C. for 16 hours, and maintained at 120° C. for 4 hours and slowly cooled down, and then the lens casting mold was taken out from the oven. The lens was released from the lens casting mold, treated with annealing at 130° C. for 2 hours, and then the polarized lens was obtained.

The performance test result of the obtained polarized lens is shown in Table 2.

Example B7

The polarized film comprised of polyethylene terephthalate [produced by Mitsui Chemicals, Inc.: "POLASOLA (registered trademark)"] (thickness: 130 microns) having a protective film on one surface thereof was formed in a curve shape of 2C (curve) at a forming temperature of 120° C. by a heat pressing method. After cutting the polarized film to the mold size, the protective film was peeled off. The polarized film was inserted and installed inside the polarized lens casting mold (glass mold set) (front surface: 2C (curves), rear surface: 6C (curves), diopter: S-5.00) shown in FIG. 2. In addition, the polarized lens was obtained by performing the same operation as in Example B6.

Example B8

In the polarized film comprised of polyethylene terephthalate [produced by Mitsui Chemicals, Inc.: "POLASOLA (registered trademark)", glass transition temperature: 74° C.] (thickness: 130 microns), which has the protective film on both surfaces thereof, one of the protective film on both surfaces was peeled, and the polarized film was maintained mostly horizontally while coating the exposed surface of the polarized film with the primer coating solution of Example B5 using a #4 bar coater. Then, it was dried in a blower dry oven at 50° C. for 5 minutes. Next, protective film on the other surface of the obtained film was peeled and the primer coating solution was coated and dried in an identical method as the above. The obtained film was formed in a curve shape of 6C (curves) at a forming temperature of 180° C. by a heat pressing method. The polarized film was prepared by cutting the polarized film to match the mold size. This was inserted and installed inside the polarized lens casting mold (glass mold set) (front surface: 6C (curves), rear surface: 6C (curves)) shown in FIG. 2.

In addition, the polarized lens was obtained by performing the same operation as in Example B1 except that the same monomer mixture as in the Example B2 was used.

The performance test result of the obtained polarized lens is shown in Table 2.

Example B9

In the polarized film comprised of polyethylene terephthalate [produced by Mitsui Chemicals, Inc.: "POLASOLA (registered trademark)", glass transition temperature: 74° C.] (thickness: 130 microns), which has the protective film on both surfaces thereof, one of the protective film on both surfaces was peeled, and the polarized film was maintained mostly horizontally while coating the exposed surface of the polarized film with the primer coating solution of Example B5 using a #4 bar coater. Then, it was dried in a blower dry oven at 50° C. for 5 minutes. Next, protective film on the other surface of the obtained film was peeled and the primer coating solution was coated and dried in an identical method as the above. The obtained film was formed in a curve shape of 6C (curves) at a forming temperature of 80° C. by a heat pressing method. The polarized film was prepared by cutting the polarized film to match the mold size. This was inserted and installed inside the polarized lens casting mold (glass mold set) (front surface: 6C (curves), rear surface: 6C (curves)) shown in FIG. 2.

In addition, the polarized lens was obtained by performing the same operation as in Example B1 except that the same monomer mixture as in the Example B1 was used.

The performance test result of the obtained polarized lens is shown in Table 2.

Example B10

In the polarized film comprised of polyethylene terephthalate [produced by Mitsui Chemicals, Inc.: "POLASOLA (registered trademark)", glass transition temperature: 74° C.] (thickness: 130 microns), which has the protective film on both surfaces thereof, one of the protective film on both surfaces was peeled, and the polarized film was maintained mostly horizontally while coating the exposed surface of the polarized film with the primer coating solution of Example B5 using a #4 bar coater. Then, it was dried in a blower dry oven at 50° C. for 5 minutes. Next, protective film on the other surface of the obtained film was peeled and the primer coating solution was coated and dried in an identical method as the above. The obtained film was formed in a curve shape of 6C (curves) at a forming temperature of 100° C. by a heat pressing method. The polarized film was prepared by cutting the polarized film to match the mold size. This was inserted and installed inside the polarized lens casting mold (glass mold set) (front surface: 6C (curves), rear surface: 6C (curves)) shown in FIG. 2.

30.68 parts by weight of tolylenediisocyanate and 15.95 parts by weight of hexamethylenediisocyanate were mixed and dissolved, and further added with 0.005 parts by weight of dimethyl tin dichloride as a curing catalyst, 0.05 parts by weight of Biosorb 583 as a ultraviolet ray absorbing agent and 0.05 parts by weight of Zelec UN (acid phosphate ester: registered trademark, produced by Stepan Company) as an internal mold releasing agent to mix and dissolve at 20° C. After being dissolved, 53.37 parts by weight of 4, 8 or 4,7 or 5,7-dimercaptomethyl-1,11-dimercapto-3,6,9-trithiaundecane was added thereto, and mixed and dissolved to prepare a homogeneous solution (in the solution, (NCO+NCS)/(SH+OH)=1.0/1.0). The viscosity of the homogeneous solution was 21 mPa·s. The homogeneous solution was processed to defoam at 600 Pa for 1 hour and filtered with a 1 μm-Teflon filter (registered trademark) to prepare a monomer mixture.

In addition, the polarized lens was obtained by performing the same operation as in the Example B1 except that the monomer mixture was used.

The performance test result of the obtained polarized lens is shown in Table 2.

Comparative Example B1

The polarized film comprised of polyethylene terephthalate [produced by Mitsui Chemicals, Inc.: "POLASOLA (registered trademark)"] (thickness: 130 microns), which has a protective film on one surface, was formed in a curve shape of 2C (curves) at a forming temperature of 180° C. by a heat pressing method. After cutting the polarized film to the mold size, the protective film was peeled off. The polarized film was inserted and installed in the polarized film casting mold (cast mold set) (front surface: 2C (curves), rear surface: 6C (curves), diopter: S-5.00) shown in FIG. 2.

In addition, the polarized lens was obtained by performing the same operation as in the Example B1 except that the monomer mixture of the Example B2 was used.

The performance test result of the obtained polarized lens is shown in Table 2.

Comparative Example B2

A polyvinyl alcohol (KURARAYVINYLON #750 (produced by Kuraray Co., Ltd.) was dyed in an aqueous solution of a dichroic dye, stretched inside the solution, and then the film was quickly dried at room temperature, heat-treated at 40° C. for 3 minutes to obtain a polarized film with a thickness of 40 microns. The obtained polarized film was formed in a curve shape of 2C (curves) by a heat press, cut to fit the mold size, placed still in a thermo-hygrostat to regulate moisture, placed in a hot air circulating oven with the temperature regulated at 60° C. for 2 hours, and then immediately installed inside the lens casting mold (glass mold set).

In addition, the polarized lens was obtained by performing the same operation as in Example B1 except that the monomer mixture of the Example B2 was used.

The performance test result of the obtained polarized lens is shown in Table 2.

Comparative Example B3

The polarized lens was obtained by performing the same operation as in Comparative Example B2 except that the same monomer mixture as in the Example B1 was used.

The performance test results of the obtained polarized lenses are shown in Table 2.

TABLE 2

|  | Forming Temperature (° C.) | Existence of Urethane-based Coating layer | Viscosity (mPa · s) at 20° C. After 1 hour of Stirring and Dissolving | (A) The Adhesiveness of the Polarized Film | (B) The Visibility of a Polarized film in the Lens | (C) Water resistance (length of deteriorated part from periphery to center (mm)) | | | (D) The Refractive Index of the Lens |
| --- | --- | --- | --- | --- | --- | --- | --- | --- | --- |
|  |  |  |  |  |  | After 4 Hours | After 3 Days | After 7 Days |  |
| Example B1 | 120 | No | 13 | A | a | 0 | 0 | 0 | 1.67 |
| Example B2 | 120 | No | 40 | A | a | 0 | 0 | 0 | 1.66 |
| Example B3 | 120 | No | 23 | A | a | 0 | 0 | 0 | 1.67 |
| Example B4 | 120 | No | 31 | A | a | 0 | 0 | 0 | 1.69 |
| Example B5 | 120 | Yes | 13 | A | a | 0 | 0 | 0 | 1.67 |
| Example B6 | 120 | Yes | 20 | A | a | 0 | 0 | 0 | 1.67 |
| Example B7 | 120 | No | 20 | A | a | 0 | 0 | 0 | 1.67 |
| Example B8 | 180 | Yes | 40 | B | a | 0 | 0 | 0 | 1.66 |
| Example B9 | 80 | Yes | 13 | A | a | 0 | 0 | 0 | 1.67 |
| Example B10 | 100 | Yes | 21 | A | a | 0 | 0 | 0 | 1.67 |
| Comparative Example B1 | 180 | No | 40 | C | a | 0 | 0 | 0 | 1.67 |
| Comparative Example B2 | — | — | 40 | A | c | 0.2 | 1.4 | 3.0 | 1.67 |
| Comparative Example B3 | — | — | 13 | A | c | 0.3 | 1.6 | 3.2 | 1.67 |

From the results above, it was confirmed that the polarized lens of the present invention exhibits excellent water resistance, has a clear appearance due to dissolution of the film in the lens, there is no problem of a peel-off of the polarized film during the outer circumference polishing process of the post-process (process of shaving the edges of a lens to fit a predetermined shape), and thin-shaping is possible due to the low viscosity upon injection.

Furthermore, by comparing Example B1 to B7, B9 and B10 with Example B8 and Comparative Example B1, it was confirmed that, when the polarized film was formed at a temperature of glass transition temperature thereof+5° C. to glass transition temperature thereof+100° C., it tends to exhibit excellent adhesiveness with the plastic lens regardless of the existence of the urethane-based coating layer has been confirmed. Additionally, when comparing Example B1 to B7, B9 and B10 with Comparative Example B2 and B3, it showed that use of the polarized film composed of thermoplastic polyester in place of polyvinyl alcohol improves both the inconspicuousness and the water resistance of the polarized film.

In other words, based on the results of Experimental Example B1 to B10 and Comparative Example B1 to B3 in the polarized lens of the present invention, it was confirmed that by using the polarized film composed of thermoplastic polyester formed at a temperature of the glass transition temperature thereof+5° C. to the glass transition temperature thereof+100° C., adhesiveness with the plastic lens tends to be particularly excellent regardless of the existence of the urethane-based coating layer, and both the inconspicuousness and the water resistance of the polarized film tend to improve.

Additionally, based on the results of Example B8 and Comparative Example B1, in the polarized lens of the present invention, it was confirmed that even when the polarized film comprised of thermoplastic polyester formed at a temperature of higher than the glass transition temperature thereof+100° C. to the melting point or lower thereof is used, the adhesiveness to the plastic lens tends to be excellent as long as it is provided with a urethane-based coating layer.

The present invention contains following embodiments:

[a1] A plastic polarized lens comprising:

a polarized film comprised of thermoplastic polyester which is formed under the condition of temperature T1 represented by the following formula:

(Glass Transition Temperature of Thermoplastic Polyester)+5° C.≦T1≦(Glass Transition Temperature of Thermoplastic Polyester)+100° C., and layers comprised of a thiourethane-based resin which are stacked on both surfaces of the polarized film, wherein the layers comprised of a thiourethane-based resin are obtained by reacting:

(A) one kind or two or more kinds of isocyanate compound(s) selected from the group consisting of a polyisocyanate compound, an isocyanate compound having an isothiocyanate group and a polyisothiocyanate compound, with (B) one kind or two or more kinds of active hydrogen compound(s) selected from the group consisting of a thiol compound having a hydroxyl group and a polythiol compound.

[a2] A plastic polarized lens comprising:

a polarized film comprised of thermoplastic polyester that layer(s) comprised of a urethane-based resin constituted by a polyhydroxy compound-derived structural unit and a polyisocyanate-derived structural unit is stacked on at least one surface of the polarized film, which is formed under the condition of temperature T2 represented by the following formula:

(Glass Transition Temperature of Thermoplastic Polyester)+100° C.<T2≦(Melting Point of Thermoplastic Polyester), and layers comprised of a thiourethane-based resin which are stacked on both surfaces of the polarized film, wherein the layers comprised of a thiourethane-based resin are obtained by reacting:

(A) one kind or two or more kinds of isocyanate compound(s) selected from the group consisting of a polyisocyanate compound, an isocyanate compound having an isothiocyanate group and a polyisothiocyanate compound, with (B) one kind or two or more kinds of active hydrogen compound(s) selected from the group consisting of a thiol compound having a hydroxyl group and a polythiol compound.

[a3] The plastic polarized lens as described in [a1], wherein layer(s) comprised of a urethane-based resin constituted by a polyhydroxy compound-derived structural unit and a polyisocyanate-derived structural unit is stacked on at least one surface of the polarized film.

[a4] The plastic polarized lens as described in [a2] or [a3], wherein
the polyhydroxy compound is one or more kind(s) selected from the group consisting of polyester diol, polyether diol, polythioether diol, polylactone diol and polyacetal diol, and
the polyisocyanate is one or more kind(s) selected from the group consisting of 1,4-tetramethylenediisocyanate, 1,6-hexamethylenediisocyanate, 1,8-octamethylenediisocyanate, 1,10-decamethylenediisocyanate, 1,4-cyclohexylenediisocyanate, tolylenediisocyanate, 4,4'-methylenebis(cyclohexyl isocyanate), 4,4'-diphenylmethanediisocyanate, isophoronediisocyanate and triphenylmethanetriisocyanate.

[a5] The plastic polarized lens as described in [a4], wherein
the polyhydroxy compound is polyester diol, and
the polyisocyanate is one or more kind(s) selected from the group consisting of 1,6-hexamethylenediisocyanate, 1,4-cyclohexylene-diisocyanate, tolylenediisocyanate, 4,4'-methylenebis(cyclohexyl isocyanate), 4,4'-diphenylmethanediisocyanate and isophoronediisocyanate.

[a6] The plastic polarized lens as described in [a5], wherein the polyester diol is polyester diol having a hydroxyl group at the terminal, which is obtained by reacting alkylenediol having a straight or branched chain, unsaturated alkylenediol having a straight or branched chain, or a mixture of diols, with adipic acid, sebacic acid, maleic acid, fumaric acid, isophthalic acid, phthalic acid, terephthalic acid or a mixture thereof.

[a7] The plastic polarized lens as described in [a5], wherein the polyisocyanate is isophorone diisocyanate.

[a8] The plastic polarized lens as described in any one of [a1] to [a7], wherein the thermoplastic polyester is polyethylene terephthalate.

[a9] The plastic polarized lens as described in any one of [a1] to [a8], wherein the isocyanate compound (A) is a diisocyanate compound, and the active hydrogen compound (B) is a polythiol compound.

[a10] The plastic polarized lens as described in any one of [a1] to [a9], wherein
the isocyanate compound (A) is one or more kind(s) selected from the group consisting of 2,5-bis(isocyanatomethyl)bicyclo-[2.2.1]-heptane, 2,6-bis(isocyanatomethyl)bicyclo-[2.2.1]-heptane and m-xylylene diisocyanates, and
the active hydrogen compound (B) is one or more kind(s) selected from the group consisting of pentaerythritol tetrakis (3-mercaptopropionate), 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane.

[a11] The plastic polarized lens as described in any one of [a1] to [a10], wherein the refractive index at e-line of the thiourethane-based resin is in the range of 1.57 to 1.70.

[a12] The plastic polarized lens as described in any one of [a1] to [a10], wherein the refractive index at e-line of the thiourethane-based resin is in the range of 1.59 to 1.70.

[a13] A method of producing a plastic polarized lens, comprising:
producing a polarized film by forming a thermoplastic polyester film under the temperature condition of glass transition temperature thereof+5° C. to glass transition temperature thereof+100° C.;
fixing the polarized film in a lens casting mold, in a state of being apart from molds;
injecting a mixture in the spaces between the molds and respective surfaces of the polarized film; and
stacking layers comprised of a thiourethane-based resin on both surfaces of the polarized film by polymerizing and curing the mixture,
wherein the mixture contains:
(A) one kind or two or more kinds of isocyanate compound(s) selected from the group consisting of a polyisocyanate compound, an isocyanate compound having an isothiocyanate group and a polyisothiocyanate compound; and
(B) one kind or two or more kinds of active hydrogen compound(s) selected from the group consisting of a thiol compound having a hydroxyl group and a polythiol compound.

[a14] A method of producing a plastic polarized lens comprising:
producing a polarized film having layer(s) comprised of a urethane-based resin constituted by a polyhydroxy compound-derived structural unit and a polyisocyanate-derived structural unit on at least one surface of the polarized film by forming a thermoplastic polyester film under the temperature condition of higher than "the glass transition temperature thereof+100° C." to melting point thereof;
fixing the polarized film in a lens casting mold, in a state of being apart from molds;
injecting a mixture in the spaces between the molds and respective surfaces of the polarized film; and
stacking layers comprised of a thiourethane-based resin on both surfaces of the polarized film by polymerizing and curing the mixture,
wherein the mixture contains:
(A) one kind or two or more kinds of isocyanate compound (s) selected from the group consisting of a polyisocyanate compound, an isocyanate compound having an isothiocyanate group and a polyisothiocyanate compound; and
(B) one kind or two or more kinds of active hydrogen compound(s) selected from the group consisting of a thiol compound having a hydroxyl group and a polythiol compound.

[a15] The method of producing a plastic polarized lens as described in [a13] or [a14], further comprising, before the producing the polarized film, stacking layer(s) comprised of a urethane-based resin constituted by a polyhydroxy compound-derived structural unit and a polyisocyanate-derived structural unit, on at least one surface of the thermoplastic polyester film.

[a16] The method of producing a plastic polarized lens as described in [a13], further comprising, after the producing the polarized film, forming layer(s) comprised of a urethane-based resin constituted by a polyhydroxy compound-derived structural unit and a polyisocyanate-derived structural unit, on at least one surface of the polarized film.

[a17] The method of producing a plastic polarized lens as described in, wherein the producing the polarized film contains
forming layer(s) comprised of a urethane-based resin constituted by a polyhydroxy compound-derived structural unit and a polyisocyanate-derived structural unit, on at least one surface of the thermoplastic polyester film which is formed under the temperature condition of higher than "the glass transition temperature thereof+100° C." to melting point thereof.

[a18] The method of producing a plastic polarized lens as described in any one of [a14] to [a17], wherein
the polyhydroxy compound is one or more kind(s) selected from the group consisting of polyester diol, polyether diol, polythioether diol, polylactone diol and polyacetal diol, and
the polyisocyanate is one or more kind(s) selected from the group consisting of 1,4-tetramethylene diisocyanate, 1,6-hexamethylene diisocyanate, 1,8-octamethylene diisocyanate, 1,10-decamethylene diisocyanate, 1,4-cyclohexylene diisocyanate, tolylene diisocyanate, 4,4'-methylene bis(cyclohexyl isocyanate), 4,4'-diphenylmethane diisocyanate, isophorone diisocyanate and triphenylmethane triisocyanate.

[a19] The method of producing a plastic polarized lens as described in [a18], wherein
the polyhydroxy compound is polyester diol, and
the polyisocyanate is one or more kind(s) selected from the group consisting of 1,6-hexamethylene diisocyanate, 1,4-cyclohexylene diisocyanate, tolylene diisocyanate, 4,4'-methylene bis(cyclohexyl isocyanate), 4,4'-diphenylmethane diisocyanate and isophorone diisocyanate.

[a20] The method of producing a plastic polarized lens as described in [a19], wherein the polyester diol is polyester diol having a hydroxyl group at the terminal, which is obtained by reacting alkylenediol having a straight or branched chain, unsaturated alkylenediol having a straight or branched chain, or a mixture thereof, with adipic acid, sebacic acid, maleic acid, fumaric acid, isophthalic acid, phthalic acid, terephthalic acid or a mixture thereof.

[a21] The method of producing a plastic polarized lens as described in [a19], wherein the polyisocyanate is isophorone diisocyanate.

[a22] The method of producing a plastic polarized lens as described in any one of [a13] to [a21], wherein the thermoplastic polyester is polyethylene terephthalate.

[a23] The method of producing a plastic polarized lens as described in any one of [a13] to [a22], wherein the isocyanate compound (A) is a diisocyanate compound, and the active hydrogen compound (B) is a polythiol compound.

[a24] The method of producing a plastic polarized lens as described in any one of [a13] to [a23], wherein
the isocyanate compound (A) is one kind or two or more kinds selected from the group consisting of 2,5-bis(isocyanatomethyl)bicyclo-[2.2.1]-heptane, 2,6-bis(isocyanatomethyl)bicyclo-[2.2.1]-heptane and m-xylylene diisocyanate, and
the active hydrogen compound (B) is a polythiol compound of one kind or two or more kinds selected from the group consisting of pentaerythritol tetrakis(3-mercaptopropionate), 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane.

The method of producing a plastic polarized lens as described in any one of [a13] to [a24], wherein, in the injecting the mixture, the viscosity of the mixture of the isocyanate compound (A) and the active hydrogen compound (B) at 20° C. is 200 mPa·s or less.

Furthermore, the present invention contains following embodiments:

[b1] A plastic polarized lens comprising:
a polarized film comprised of thermoplastic polyester which is formed under the condition of temperature T1 represented by the following formula:

(Glass Transition Temperature of Thermoplastic Polyester)+5° C.≦$T1$≦(Glass Transition Temperature of Thermoplastic Polyester)+100° C., and layers comprised of a thiourethane-based resin which are stacked on both surfaces of the polarized film,
wherein the layers comprised of a thiourethane-based resin obtained by reacting a polymerizable composition containing:
aromatic isocyanate; and
one or more kind(s) of polythiol selected from 4-mercaptomethyl-1,8-dimercapto-3,6-dithiaoctane, 4,8 or 4,7 or 5,7-dimercaptomethyl-1,11-dimercapto-3,6,9-trithiaundecane, pentaerythritol tetrakismercapto acetate, pentaerythritol tetrakismercapto propionate, 2,5-bis(mercaptomethyl)-1,4-dithian and bis(mercaptoethyl)sulfide.

[b2] A plastic polarized lens comprising:
a polarized film comprised of thermoplastic polyester that layer(s) comprised of a urethane-based resin constituted by a polyhydroxy compound-derived structural unit and a polyisocyanate-derived structural unit is stacked on at least one surface of the polarized film, which is formed under the condition of temperature T2 represented by the following formula:

(Glass Transition Temperature of Thermoplastic Polyester)+100° C.≦$T2$≦(Melting Point of Thermoplastic Polyester), and layers comprised of a thiourethane-based resin which are stacked on both surfaces of the polarized film,
wherein the layers comprised of a thiourethane-based resin are obtained by reacting a polymerizable composition containing:
aromatic isocyanate; and
one or more kind(s) of polythiol selected from 4-mercaptomethyl-1,8-dimercapto-3,6-dithiaoctane, 4,8 or 4, 7 or 5,7-dimercaptomethyl-1,11-dimercapto-3,6,9-trithiaundecane, pentaerythritol tetrakismercapto acetate, pentaerythritol tetrakismercapto propionate, 2,5-bis(mercaptomethyl)-1,4-dithian, bis(mercaptoethyl)sulfide.

[b3] The plastic polarized lens as described in [b1], wherein layer(s) comprised of a urethane-based resin constituted by a polyhydroxy compound-derived structural unit and a polyisocyanate-derived structural unit is stacked on at least one surface of the polarized film.

[b4] The plastic polarized lens as described in [b2] or [b3], wherein
the polyhydroxy compound is one or more kind(s) selected from the group consisting of polyester diol, polyether diol, polythioether diol, polylactone diol and polyacetal diol, and
the polyisocyanate is one or more kind(s) selected from the group consisting of 1,4-tetramethylenediisocyanate, 1,6-hexamethylenediisocyanate, 1,8-octamethylenediisocyanate, 1,10-decamethylenediisocyanate, 1,4-cyclohexylenediisocyanate, tolylenediisocyanate, 4,4'-methylenebis(cyclohexyl isocyanate), 4,4'-diphenylmethanediisocyanate, isophoronediisocyanate and triphenylmethanetriisocyanate.

[b5] The plastic polarized lens as described in [b4], wherein
the polyhydroxy compound is polyester diol, and
the polyisocyanate is one or more kind(s) selected from the group consisting of 1,6-hexamethylenediisocyanate, 1,4-cyclohexylene-diisocyanate, tolylenediisocyanate, 4,4'-methylenebis(cyclohexyl isocyanate), 4,4'-diphenylmethanediisocyanate and isophoronediisocyanate.

[b6] The plastic polarized lens as described in [b5], wherein
the polyester diol is polyester diol having a hydroxyl group at the terminal, which is obtained by reacting alkylenediol having a straight or branched chain, unsaturated alkylenediol having a straight or branched chain, or a mixture of diols, with adipic acid, sebacic acid, maleic acid, fumaric acid, isophthalic acid, phthalic acid, terephthalic acid or a mixture thereof.

[b7] The plastic polarized lens as described in [b5], wherein the polyisocyanate is isophorone diisocyanate.

[b8] The plastic polarized lens as described in any one of [b1] to [b7], wherein the thermoplastic polyester is polyethylene terephthalate.

[b9] The plastic polarized lens as described in any one of [b1] to [b8], wherein the polymerizable composition further includes hexamethylenediisocyanate.

[b10] The plastic polarized lens as described in any one of [b1] to [b9], wherein the aromatic isocyanate is one or more kind(s) of compound selected from tolylenediisocyanate and diphenylmethanediisocyanate.

[b11] A method of producing a plastic polarized lens, comprising:
producing a polarized film by forming a thermoplastic polyester film under the temperature condition of glass transition temperature thereof+5° C. to glass transition temperature thereof+100° C.;
fixing the polarized film in a lens casting mold, in a state of being apart from molds;
injecting a polymerizable composition in the spaces between the molds and respective surfaces of the polarized film; and
stacking layers comprised of a thiourethane-based resin on both surfaces of the polarized film by polymerizing and curing the polymerizable composition,
wherein the polymerizable composition contains:
aromatic isocyanate; and
one or more kind(s) of polythiol selected from 4-mercaptomethyl-1,8-dimercapto-3,6-dithiaoctane, 4,8 or 4, 7 or 5,7-dimercaptomethyl-1,11-dimercapto-3,6,9-trithiaundecane, pentaerythritol tetrakismercapto acetate, pentaerythritol tetrakismercapto propionate, 2,5-bis(mercaptomethyl)-1,4-dithian and bis(mercaptoethyl)sulfide.

[b12] A method of producing a plastic polarized lens comprising:
producing a polarized film having layer(s) comprised of a urethane-based resin constituted by a polyhydroxy compound-derived structural unit and a polyisocyanate-derived structural unit on at least one surface of the polarized film by forming a thermoplastic polyester film under the temperature condition of higher than "the glass transition temperature thereof+100° C." to melting point thereof;
fixing the polarized film in a lens casting mold, in a state of being apart from molds;
injecting a polymerizable composition in the spaces between the molds and respective surfaces of the polarized film; and
stacking layers comprised of a thiourethane-based resin on both surfaces of the polarized film by polymerizing and curing the polymerizable composition,
wherein the polymerizable composition contains:
aromatic isocyanate; and
one or more kind(s) of polythiol selected from 4-mercaptomethyl-1,8-dimercapto-3,6-dithiaoctane, 4,8 or 4,7 or 5,7-dimercaptomethyl-1,11-dimercapto-3,6,9-trithiaundecane, pentaerythritol tetrakismercapto acetate, pentaerythritol tetrakismercapto propionate, 2,5-bis(mercaptomethyl)-1,4-dithian and bis(mercaptoethyl)sulfide.

[b13] The method of producing a plastic polarized lens as described in [b11] or [b12], further comprising, before the producing the polarized film,
stacking layer(s) comprised of a urethane-based resin constituted by a polyhydroxy compound-derived structural unit and a polyisocyanate-derived structural unit, on at least one surface of the thermoplastic polyester film.

[b14] The method of producing a plastic polarized lens as described in [b11], further comprising, after the producing the polarized film,
forming layer(s) comprised of a urethane-based resin constituted by a polyhydroxy compound-derived structural unit and a polyisocyanate-derived structural unit, on at least one surface of the polarized film.

[b15] The method of producing a plastic polarized lens as described in [b12], wherein the producing the polarized film contains
forming layer(s) comprised of a urethane-based resin constituted by a polyhydroxy compound-derived structural unit and a polyisocyanate-derived structural unit, on at least one surface of the thermoplastic polyester film which is formed under the temperature condition of higher than "the glass transition temperature thereof+100° C." to melting point thereof.

[b16] The method of producing a plastic polarized lens as described in any one of [b12] to [b15], wherein
the polyhydroxy compound is one or more kind(s) selected from the group consisting of polyester diol, polyether diol, polythioether diol, polylactone diol and polyacetal diol, and
the polyisocyanate is one or more kind(s) selected from the group consisting of 1,4-tetramethylene diisocyanate, 1,6-hexamethylene diisocyanate, 1,8-octamethylene diisocyanate, 1,10-decamethylene diisocyanate, 1,4-cyclohexylene diisocyanate, tolylene diisocyanate, 4,4'-methylene bis(cyclohexyl isocyanate) 4,4'-diphenylmethane diisocyanate, isophorone diisocyanate and triphenylmethane triisocyanate.

[b17] The method of producing a plastic polarized lens as described in [b16], wherein
the polyhydroxy compound is polyester diol, and
the polyisocyanate is one or more kind(s) selected from the group consisting of 1,6-hexamethylene diisocyanate, 1,4-cyclohexylene diisocyanate, tolylene diisocyanate, 4,4'-methylene bis(cyclohexyl isocyanate) 4,4'-diphenylmethane diisocyanate and isophorone diisocyanate.

[b18] The method of producing a plastic polarized lens as described in [b17], wherein the polyester diol is polyester diol having a hydroxyl group at the terminal, which is obtained by reacting alkylenediol having a straight or branched chain, unsaturated alkylenediol having a straight or branched chain, or a mixture thereof, with adipic acid, sebacic acid, maleic acid, fumaric acid, isophthalic acid, phthalic acid, terephthalic acid or a mixture thereof.

[b19] The method of producing a plastic polarized lens as described in [b17], wherein the polyisocyanate is isophorone diisocyanate.

[b20] The method of producing a plastic polarized lens as described in any one of [b11] to [b19], wherein the thermoplastic polyester is polyethylene terephthalate.

[b21] The method of producing a plastic polarized lens as described in any one of [b11] to [b20], wherein the polymerizable composition further contains hexamethylenediisocyanate.

[b22] The method of producing a plastic polarized lens as described in any one of [b11] to [b21], wherein the aromatic isocyanate is one or more kind(s) of compound selected from tolyenediisocyanate and diphenylmethanediisocyanate.

What is claimed is:

1. A plastic polarized lens comprising:
a polarized film comprised of thermoplastic polyester which is formed under the condition of temperature T1 represented by the following formula:

(Glass Transition Temperature of Thermoplastic Polyester)+5° C.≦T1≦(Glass Transition Temperature of Thermoplastic Polyester)+100° C., and layers comprised of a thiourethane-based resin which are stacked on both surfaces of said polarized film,
wherein said layers comprised of a thiourethane-based resin are obtained by reacting a polymerizable composition containing:
(A) one kind or two or more kinds of isocyanate compound(s) selected from the group consisting of a polyisocyanate compound, an isocyanate compound having an isothiocyanate group and a polyisothiocyanate compound, with
(B) one kind or two or more kinds of active hydrogen compound(s) selected from the group consisting of a thiol compound having a hydroxyl group and a polythiol compound.

2. The plastic polarized lens as claimed in claim 1, wherein
(A) said isocyanate compound is an aromatic isocyanate, and
(B) said active hydrogen compound is one or more kind(s) of polythiol selected from the group consisting of 4-mercaptomethyl-1,8-dimercapto-3,6-dithiaoctane, 4,8 or 4,7 or 5,7-dimercaptomethyl-1,11-dimercapto-3,6,9-trithiaundecane, pentaerythritol tetrakismercapto acetate, pentaerythritol tetrakismercapto propionate, 2,5-bis(mercaptomethyl)-1,4-dithian, bis(mercaptoethyl)sulfide, 1,1,3,3-tetrakis(mercaptomethylthio)propane, 4,6-bis(mercaptomethylthio)-1,3-dithiane and 2-(2,2-bis(mercaptomethylthio)ethyl)-1,3-dithiethane.

3. A plastic polarized lens comprising:
a polarized film comprised of thermoplastic polyester, layer(s) comprised of a urethane-based resin constituted by a polyhydroxy compound-derived structural unit and a polyisocyanate-derived structural unit is stacked on at least one surface of said polarized film, and which is formed under the condition of temperature T2 represented by the following formula:

(Glass Transition Temperature of Thermoplastic Polyester)+100° C.≦T2≦(Melting Point of Thermoplastic Polyester), and layers comprised of a thiourethane-based resin which are stacked on the both surfaces of said polarized film that said layer(s) comprised of a urethane-based resin is stacked on at least one surface thereof,
wherein said layers comprised of a thiourethane-based resin are obtained by reacting a polymerizable composition containing:
(A) one kind or two or more kinds of isocyanate compound(s) selected from the group consisting of a polyisocyanate compound, an isocyanate compound having an isothiocyanate group and a polyisothiocyanate compound, with
(B) one kind or two or more kinds of active hydrogen compound(s) selected from the group consisting of a thiol compound having a hydroxyl group and a polythiol compound.

4. The plastic polarized lens as claimed in claim 3, wherein
(A) said isocyanate compound is an aromatic isocyanate, and
(B) said active hydrogen compound is one or more kind(s) of polythiol selected from the group consisting of 4-mercaptomethyl-1,8-dimercapto-3,6-dithiaoctane, 4,8 or 4,7 or 5,7-dimercaptomethyl-1,11-dimercapto-3,6,9-trithiaundecane, pentaerythritol tetrakismercapto acetate, pentaerythritol tetrakismercapto propionate, 2,5-bis(mercaptomethyl)-1,4-dithian and bis(mercaptoethyl)sulfide, 1,1,3,3-tetrakis(mercaptomethylthio)propane, 4,6-bis(mercaptomethylthio)-1,3-dithiane and 2-(2,2-bis(mercaptomethylthio)ethyl)-1,3-dithiethane.

5. The plastic polarized lens as claimed in claim 1 further comprises layer(s) comprised of a urethane-based resin constituted by a polyhydroxy compound-derived structural unit and a polyisocyanate-derived structural unit is stacked on at least one surface of said polarized film.

6. The plastic polarized lens as claimed in claim 5, wherein
said polyhydroxy compound is one or more kind(s) selected from the group consisting of polyester diol, polyether diol, polythioether diol, polylactone diol and polyacetal diol, and
said polyisocyanate which constitutes said urethane-based resin is one or more kind(s) selected from the group consisting of 1,4-tetramethylenediisocyanate, 1,6-hexamethylenediisocyanate, 1,8-octamethylenediisocyanate, 1,10-decamethylenediisocyanate, 1,4-cyclohexylenediisocyanate, tolylenediisocyanate, 4,4'-methylenebis(cyclohexyl isocyanate), 4,4'-diphenylmethanediisocyanate, isophoronediisocyanate and triphenylmethanetriisocyanate.

7. The plastic polarized lens as claimed in claim 3, wherein
said polyhydroxy compound is one or more kind(s) selected from the group consisting of polyester diol, polyether diol, polythioether diol, polylactone diol and polyacetal diol, and
said polyisocyanate which constitutes said urethane-based rein is one or more kind(s) selected from the group consisting of 1,4-tetramethylenediisocyanate, 1,6-hexamethylenediisocyanate, 1,8-octamethylenediisocyanate, 1,10-decamethylenediisocyanate, 1,4-cyclohexylenediisocyanate, tolylenediisocyanate, 4,4'-methylenebis(cyclohexyl isocyanate), 4,4'-diphenylmethanediisocyanate, isophoronediisocyanate and triphenylmethanetriisocyanate.

8. The plastic polarized lens as claimed in claim 6, wherein
said polyhydroxy compound is polyester diol, and
said polyisocyanate which constitutes said urethane-based resin is one, or more kind(s) selected from the group consisting of 1,6-hexamethylenediisocyanate, 1,4-cyclohexylene-diisocyanate, tolylenediisocyanate, 4,4'-methylenebis(cyclohexyl isocyanate), 4,4'-diphenylmethanediisocyanate and isophoronediisocyanate.

9. The plastic polarized lens as claimed in claim 7, wherein
said polyhydroxy compound is polyester diol, and
said polyisocyanate which constitutes said urethane-based resin is one or more kind(s) selected from the group consisting of 1,6-hexamethylenediisocyanate, 1,4-cyclohexylene-diisocyanate, tolylenediisocyanate, 4,4'-methylenebis(cyclohexyl isocyanate), 4,4'-diphenylmethanediisocyanate and isophoronediisocyanate.

10. The plastic polarized lens as claimed in claim 8, wherein
said polyester diol is polyester diol having a hydroxyl group at the terminal, which is obtained by reacting alkylenediol having a straight or branched chain, unsaturated alkylenediol having a straight or branched chain, or a mixture of diols, with adipic acid, sebacic acid, maleic acid, fumaric acid, isophthalic acid, phthalic acid, terephthalic acid or a mixture thereof.

11. The plastic polarized lens as claimed in claim 9, wherein
said polyester diol is polyester diol having a hydroxyl group at the terminal, which is obtained by reacting alkylenediol having a straight or branched chain, unsaturated alkylenediol having a straight or branched chain, or a mixture of diols, with adipic acid, sebacic acid, maleic acid, fumaric acid, isophthalic acid, phthalic acid, terephthalic acid or a mixture thereof.

12. The plastic polarized lens as claimed in claim 8, wherein said polyisocyanate which constitutes said urethane-based resin is isophorone diisocyanate.

13. The plastic polarized lens as claimed in claim 9, wherein said polyisocyanate which constitutes said urethane-based resin is isophorone diisocyanate.

14. The plastic polarized lens as claimed in claim 1, wherein said thermoplastic polyester is polyethylene terephthalate.

15. The plastic polarized lens as claimed in claim 3, wherein said thermoplastic polyester is polyethylene terephthalate.

16. The plastic polarized lens as claimed in claim 1, wherein (A) said isocyanate compound is a diisocyanate compound, and (B) said active hydrogen compound is a polythiol compound.

17. The plastic polarized lens as claimed in claim 3, wherein (A) said isocyanate compound is a diisocyanate compound, and (B) said active hydrogen compound is a polythiol compound.

18. The plastic polarized lens as claimed in claim 1, wherein
(A) said isocyanate compound is one or more kind(s) selected from the group consisting of 2,5-bis(isocyanatomethyl)bicyclo-[2.2.1]-heptane, 2,6-bis(isocyanatomethyl)bicyclo-[2.2.1]-heptane and m-xylylene diisocyanates, and
(B) said active hydrogen compound is one or more kind(s) selected from the group consisting of pentaerythritol tetrakis(3-mercaptopropionate), 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 1,1,3,3-tetrakis(mercaptomethylthio)propane, 4,6-bis(mercaptomethylthio)-1,3-dithiane and 2-(2,2-bis(mercaptomethylthio)ethyl)-1,3-dithiethane.

19. The plastic polarized lens as claimed in claim 3, wherein
(A) said isocyanate compound is one or more kind(s) selected from the group consisting of 2,5-bis(isocyanatomethyl)bicyclo-[2.2.1]-heptane, 2,6-bis(isocyanatomethyl)bicyclo-[2.2.1]-heptane and m-xylylene diisocyanates, and
(B) said active hydrogen compound is one or more kind(s) selected from the group consisting of pentaerythritol tetrakis(3-mercaptopropionate), 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 1,1,3,3-tetrakis(mercaptomethylthio)propane, 4,6-bis(mercaptomethylthio)-1,3-dithiane and 2-(2,2-bis(mercaptomethylthio)ethyl)-1,3-dithiethane.

20. The plastic polarized lens as claimed in claim 1, wherein the refractive index at e-line of said thiourethane-based resin is in the range of 1.57 to 1.70.

21. The plastic polarized lens as claimed in claim 3, wherein the refractive index at e-line of said thiourethane-based resin is in the range of 1.57 to 1.70.

22. The plastic polarized lens as claimed in claim 1, wherein the refractive index at e-line of said thiourethane-based resin is in the range of 1.59 to 1.70.

23. The plastic polarized lens as claimed in claim 3, wherein the refractive index at e-line of said thiourethane-based resin is in the range of 1.59 to 1.70.

24. The plastic polarized lens as claimed in claim 2, wherein said polymerizable composition further contains hexamethylenediisocyanate.

25. The plastic polarized lens as claimed in claim 4, wherein said polymerizable composition further contains hexamethylenediisocyanate.

26. The plastic polarized lens as claimed in claim 2, wherein
said aromatic isocyanate is one or more kind(s) of compound selected from tolylenediisocyanate and diphenylmethanediisocyanate.

27. The plastic polarized lens as claimed in claim 4, wherein
said aromatic isocyanate is one or more kind(s) of compound selected from tolylenediisocyanate and diphenylmethanediisocyanate.

28. A method of producing a plastic polarized lens, comprising:
producing a polarized film by forming a thermoplastic polyester film under the temperature condition of glass transition temperature thereof+5° C. to glass transition temperature thereof+100° C.;
fixing said polarized film in a lens casting mold, in a state that both surfaces of said polarized film is apart from molds;
injecting a polymerizable composition in the spaces between said molds and both surfaces of said polarized film; and
stacking layers comprised of a thiourethane-based resin on both surfaces of said polarized film by polymerizing and curing said polymerization composition,
wherein said polymerizable composition contains:
(A) one kind or two or more kinds of isocyanate compound(s) selected from the group consisting of a polyisocyanate compound, an isocyanate compound having an isothiocyanate group and a polyisothiocyanate compound; and
(B) one kind or two or more kinds of active hydrogen compound(s) selected from the group consisting of a thiol compound having a hydroxyl group and a polythiol compound.

29. A method of producing a plastic polarized lens, comprising:
producing a polarized film having layer(s) comprised of a urethane-based resin constituted by a polyhydroxy compound-derived structural unit and a polyisocyanate-derived structural unit on at least one surface of said polarized film by forming a thermoplastic polyester film under the temperature condition of higher than "the glass transition temperature thereof+100° C." to melting point thereof;

fixing said polarized film in a lens casting mold, in a state that both surfaces of said polarized film is apart from molds;

injecting a polymerizable composition in a lens casting mold, in a state that both surfaces of said polarized film is apart from molds; and stacking layers comprised of a thiourethane-based resin on both surfaces of said polarized film by polymerizing and curing said polymerization composition, wherein said polymerizable composition contains:

(A) one kind or two or more kinds of isocyanate compound(s) selected from the group consisting of a polyisocyanate compound, an isocyanate compound having an isothiocyanate group and a polyisothiocyanate compound; and (B) one kind or two or more kinds of active hydrogen compound(s) selected from the group consisting of a thiol compound having a hydroxyl group and a polythiol compound.

30. The method of producing a plastic polarized lens as claimed in claim 28, further comprising, before said producing said polarized film, stacking layer(s) comprised of a urethane-based resin constituted by a polyhydroxy compound-derived structural unit and a polyisocyanate-derived structural unit, on at least one surface of said thermoplastic polyester film.

31. The method of producing a plastic polarized lens as claimed in claim 29, further comprising, before said producing said polarized film, stacking layer(s) comprised of a urethane-based resin constituted by a polyhydroxy compound-derived structural unit and a polyisocyanate-derived structural unit, on at least one surface of said thermoplastic polyester film.

32. The method of producing a plastic polarized lens as claimed in claim 28, further comprising, after said producing said polarized film, forming layer(s) comprised of a urethane-based resin constituted by a polyhydroxy compound-derived structural unit and a polyisocyanate-derived structural unit, on at least one surface of said polarized film.

33. The method of producing a plastic polarized lens as claimed in claim 29, further comprising, after said producing said polarized film, forming layer(s) comprised of a urethane-based resin constituted by a polyhydroxy compound-derived structural unit and a polyisocyanate-derived structural unit, on at least one surface of said polarized film.

34. The method of producing a plastic polarized lens as claimed in claim 28, wherein said producing said polarized film contains forming layer(s) comprised of a urethane-based resin constituted by a polyhydroxy compound-derived structural unit and a polyisocyanate-derived structural unit, on at least one surface of said thermoplastic polyester film which is formed under the temperature condition of higher than "the glass transition temperature thereof+100° C." to melting point thereof.

35. The method of producing a plastic polarized lens as claimed in claim 29, wherein said producing said polarized film contains forming layer(s) comprised of a urethane-based resin constituted by a polyhydroxy compound-derived structural unit and a polyisocyanate-derived structural unit, on at least one surface of said thermoplastic polyester film which is formed under the temperature condition of higher than "the glass transition temperature thereof+100° C." to melting point thereof.

36. The method of producing a plastic polarized lens as claimed in claim 28, wherein said thermoplastic polyester is polyethylene terephthalate.

37. The method of producing a plastic polarized lens as claimed in claim 29, wherein said thermoplastic polyester is polyethylene terephthalate.

38. A polarized film comprised of thermoplastic polyester which is formed under the condition of temperature $T1$ represented by the following formula:

$$\text{(Glass Transition Temperature of Thermoplastic Polyester)}+5°\text{ C.}\leq T1\leq\text{(Glass Transition Temperature of Thermoplastic Polyester)}+100°\text{ C.}$$

39. A polarized film comprised of thermoplastic polyester, which layer(s) comprised of a urethane-based resin constituted by a polyhydroxy compound-derived structural unit and a polyisocyanate-derived structural unit is stacked on at least one surface of said polarized film, and which is formed under the condition of temperature $T2$ represented by the following formula:

$$\text{(Glass Transition Temperature of Thermoplastic Polyester)}+100°\text{ C.}<T2\leq\text{(Melting Point of Thermoplastic Polyester).}$$

40. The polarized film comprised of thermoplastic polyester as claimed in claim 38 further comprises layer(s) comprised of a urethane-based resin constituted by a polyhydroxy compound-derived structural unit and a polyisocyanate-derived structural unit is stacked on at least one surface of said polarized film.

41. The polarized film comprised of thermoplastic polyester as claimed in claim 39, wherein said polyhydroxy compound is one or more kind(s) selected from the group consisting of polyester diol, polyether diol, polythioether diol, polylactone diol and polyacetal diol, and said polyisocyanate which constitutes said urethane-based resin is one or more kind(s) selected from the group consisting of 1,4-tetramethylenediisocyanate, 1,6-hexamethylenediisocyanate, 1,8-octamethylenediisocyanate, 1,10-decamethylenediisocyanate, 1,4-cyclohexylenediisocyanate, tolylenediisocyanate, 4,4'-methylenebis(cyclohexyl isocyanate), 4,4'-diphenylmethanediisocyanate, isophoronediisocyanate and triphenylmethanetriisocyanate.

\* \* \* \* \*